US011202314B2

(12) United States Patent
Xin et al.

(10) Patent No.: US 11,202,314 B2
(45) Date of Patent: Dec. 14, 2021

(54) IMMEDIATE RETRANSMISSION SCHEME FOR REAL TIME APPLICATIONS

(71) Applicant: SONY CORPORATION, Tokyo (JP)

(72) Inventors: Liangxiao Xin, San Jose, CA (US); Mohamed Abouelseoud, San Francisco, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 99 days.

(21) Appl. No.: 16/584,821

(22) Filed: Sep. 26, 2019

(65) Prior Publication Data

US 2020/0404704 A1 Dec. 24, 2020

Related U.S. Application Data

(60) Provisional application No. 62/862,776, filed on Jun. 18, 2019.

(51) Int. Cl.
 *H04L 1/00* (2006.01)
 *H04W 74/08* (2009.01)
 (Continued)

(52) U.S. Cl.
 CPC ....... *H04W 74/0808* (2013.01); *H04L 1/0003* (2013.01); *H04L 1/1819* (2013.01);
 (Continued)

(58) Field of Classification Search
 CPC .................................................. H04W 74/0808
 See application file for complete search history.

(56) References Cited

U.S. PATENT DOCUMENTS 6,680,922 B1 * 1/2004 Jorgensen ............... H04L 47/10
 370/328
7,286,551 B2 * 10/2007 Park .................. H04L 29/06027
 370/412
(Continued)

FOREIGN PATENT DOCUMENTS

KR 20040028055 A 4/2004

OTHER PUBLICATIONS

Wei, Yi-Hung et al., "RT-WiFi: Real-Time High Speed Communication Protocol for Wireless Cyber-Physical Control Applications", Conference Paper, 2013 IEEE 34th Real-Time Systems Symposium, Dec. 3-6, 2013, pp. 140-149. (Year: 2013).*
(Continued)

*Primary Examiner* — Parth Patel
(74) *Attorney, Agent, or Firm* — O'Banion & Ritchey LLP; John P. O'Banion

(57) ABSTRACT

A wireless communication circuit configured for communicating over a wireless local area network (WLAN) in its reception area to communicate real-time application (RTA) packets as well as non-real time (non-RTA) packets. RTA packet retransmission is performed with lower latency in response to performing an immediate retransmission scheme that can bypass the need to contend for channel access, and/or without waiting for notifications back from a receiver before channel access. In other instances the RTA packets contend for retransmission access without a contention time window increase.

25 Claims, 36 Drawing Sheets

(51) Int. Cl.
    *H04L 1/18*     (2006.01)
    *H04L 5/00*     (2006.01)
    *H04W 84/12*     (2009.01)

(52) U.S. Cl.
    CPC .......... *H04L 1/1896* (2013.01); *H04L 5/0055* (2013.01); *H04W 84/12* (2013.01)

(56) References Cited

U.S. PATENT DOCUMENTS

| | | | | |
|---|---|---|---|---|
| 7,502,818 | B2* | 3/2009 | Kohno | H04L 1/0009 709/203 |
| 7,564,782 | B2* | 7/2009 | Futenma | H04L 29/06 370/230 |
| 8,036,122 | B2* | 10/2011 | Laha | H04L 65/80 370/235 |
| 8,483,140 | B1* | 7/2013 | Gazzard | H04W 4/00 370/329 |
| 8,503,340 | B1* | 8/2013 | Xu | H04W 84/12 370/310 |
| 8,780,733 | B2* | 7/2014 | Jeon | H04L 1/1812 370/242 |
| RE46,206 | E* | 11/2016 | Jorgensen | H04W 12/03 |
| 9,623,326 | B2* | 4/2017 | Perlman | H04N 21/2402 |
| 10,785,791 | B1* | 9/2020 | Eyuboglu | H04L 1/1851 |
| 2004/0264488 | A1* | 12/2004 | Yoon | H04L 47/14 370/412 |
| 2006/0190610 | A1* | 8/2006 | Motegi | H04L 1/1877 709/228 |
| 2007/0160060 | A1* | 7/2007 | Dalmases | H04L 12/64 370/395.4 |
| 2008/0171550 | A1* | 7/2008 | Zhao | H04W 74/02 455/445 |
| 2009/0137254 | A1* | 5/2009 | Vukovic | H04W 72/0413 455/452.1 |
| 2010/0115366 | A1* | 5/2010 | Wang | H04L 1/1887 714/748 |
| 2011/0070907 | A1* | 3/2011 | Chou | H04B 7/022 455/507 |
| 2015/0055458 | A1* | 2/2015 | Wakuda | H04L 12/1881 370/230 |
| 2017/0039245 | A1* | 2/2017 | Wholey, III | G06F 16/9024 |
| 2018/0007683 | A1* | 1/2018 | You | H04W 72/0413 |
| 2018/0234881 | A1* | 8/2018 | Hosseini | H04L 1/1864 |
| 2018/0242304 | A1* | 8/2018 | Rong | H04W 72/048 |
| 2019/0020572 | A1* | 1/2019 | Hu | H04L 45/08 |
| 2019/0029037 | A1* | 1/2019 | Wang | H04W 72/042 |
| 2019/0068326 | A1* | 2/2019 | Sonobe | H04L 1/0018 |
| 2019/0132013 | A1* | 5/2019 | Sharma | H04W 88/182 |
| 2019/0141731 | A1* | 5/2019 | Yoshimoto | H04W 72/12 |
| 2019/0208041 | A1* | 7/2019 | Jaganathan | H04L 69/161 |
| 2019/0260522 | A1* | 8/2019 | Zhang | H04L 1/1893 |
| 2020/0015111 | A1* | 1/2020 | Martinez | H04L 47/12 |
| 2020/0053427 | A1* | 2/2020 | Yamagishi | H04N 21/26258 |
| 2020/0145345 | A1* | 5/2020 | Finkelstein | H04L 47/58 |
| 2020/0260345 | A1* | 8/2020 | Phuyal | H04W 72/0446 |
| 2020/0313805 | A1* | 10/2020 | Park | H04L 1/1887 |
| 2020/0344800 | A1* | 10/2020 | Reuche | H04W 28/0268 |
| 2020/0396625 | A1* | 12/2020 | Sethuraman | H04W 52/0209 |
| 2020/0396768 | A1* | 12/2020 | Abouelseoud | H04W 74/0816 |
| 2020/0404704 | A1* | 12/2020 | Xin | H04L 1/0003 |
| 2021/0007016 | A1* | 1/2021 | Xin | H04L 47/722 |
| 2021/0007137 | A1* | 1/2021 | Abouelseoud | H04W 74/0808 |
| 2021/0029750 | A1* | 1/2021 | Xin | H04W 74/0808 |

OTHER PUBLICATIONS

Wei, Yi-Hung et al., "RT-WiFi: Real-Time High Speed Communication Protocol for Wireless Cyber-Physical Control Applications", Conference Paper, 2013 IEEE 34th Real-Time Systems Symposium, Dec. 3-6, 2013, pp. 140-149.

* cited by examiner

HE-MU | 8µs L-STF | 8µs L-LTF | 4µs L-SIG | 4µs RL-SIG | 8µs HE-SIG-A | 16µs HE-SIG-B | 4µs HE-STF | HE-LTFs | Data | PE

FIG. 7
(Prior Art)

HE-TB | 8µs L-STF | 8µs L-LTF | 4µs L-SIG | 4µs RL-SIG | 8µs HE-SIG-A | 8µs HE-STF | HE-LTFs | Data | PE

FIG. 8
(Prior Art)

Trigger frame | Frame Control | Duration | RA | TA | Common Info | User Info | ... | User Info | FCS

FIG. 9
(Prior Art)

Common Info field

| Trigger Type | Length | Cascading Indication | CS Required | BW | GI And LTF Type | MU MIMO LTF Mode | Number of HE-LTF Symbols | STBC |
|---|---|---|---|---|---|---|---|---|
| LDPC Extra Symbol Segment | AP TX Power | Packet Extension | Spatial Reuse | Doppler | HE-SIG-A Reserved | Reserved | Trigger dependent user info | |

FIG. 10 (Prior Art)

User Info field

| AID12 | RU Allocation | Coding Type | MCS | DCM | SS Allocation | Target RSSI | Reserved | Trigger dependent common info |
|---|---|---|---|---|---|---|---|---|

FIG. 11 (Prior Art)

MU-BAR variant: | BAR control | BAR info |

FIG. 12 (Prior Art)

BA frame: | Frame Control | Duration | RA | TA | BA control | BA info | FCS |

FIG. 13 (Prior Art)

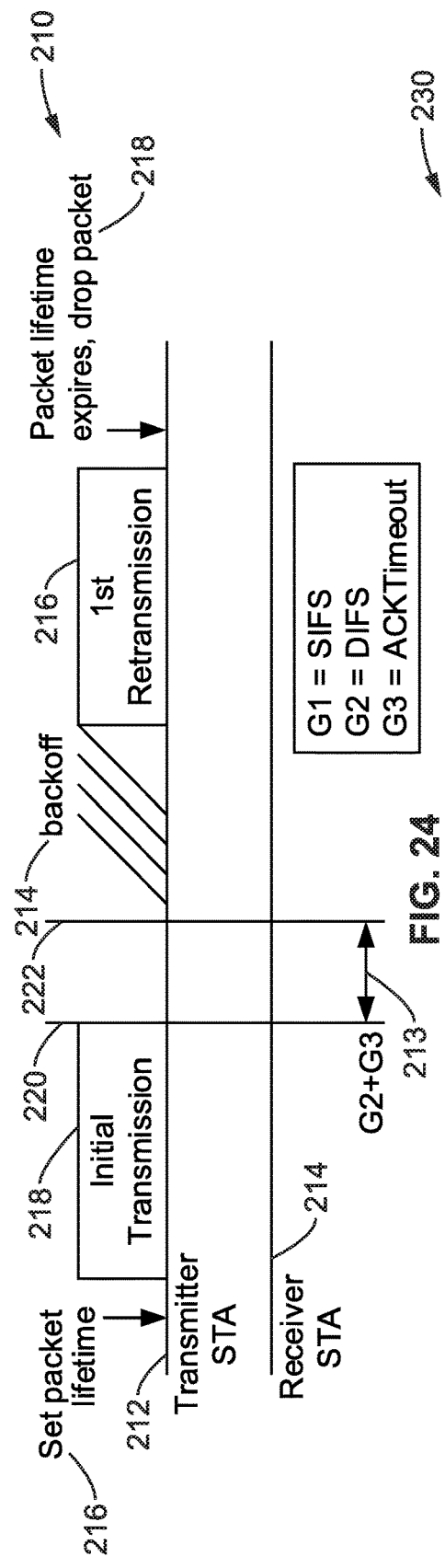
FIG. 24
FIG. 25
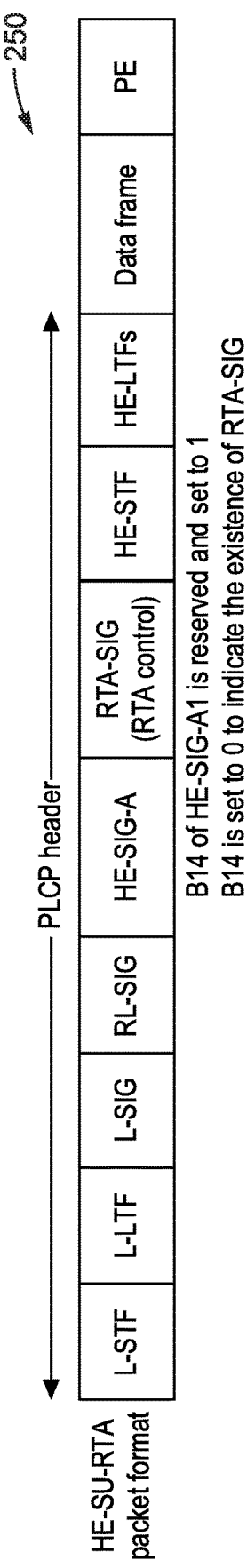
FIG. 26

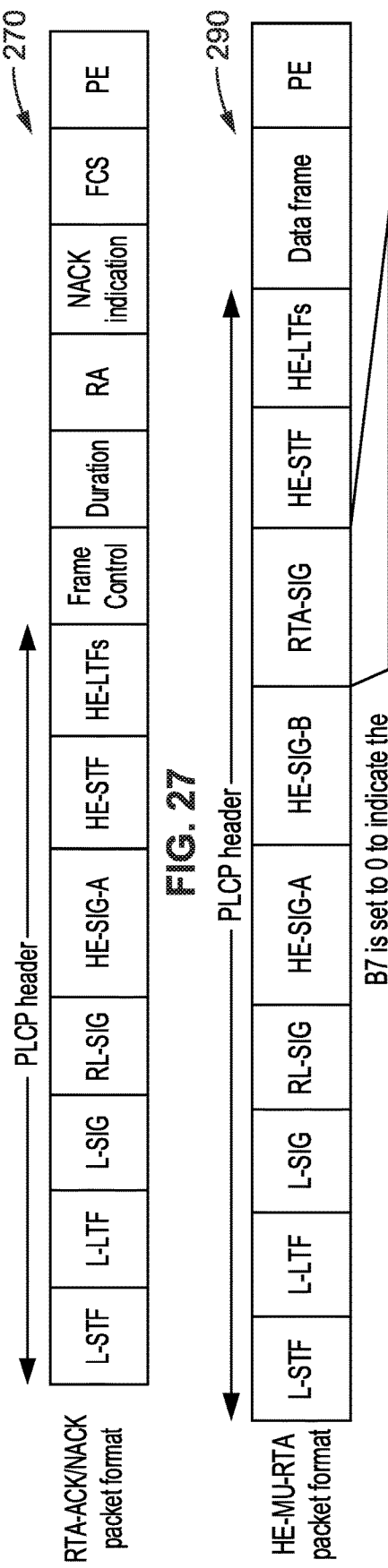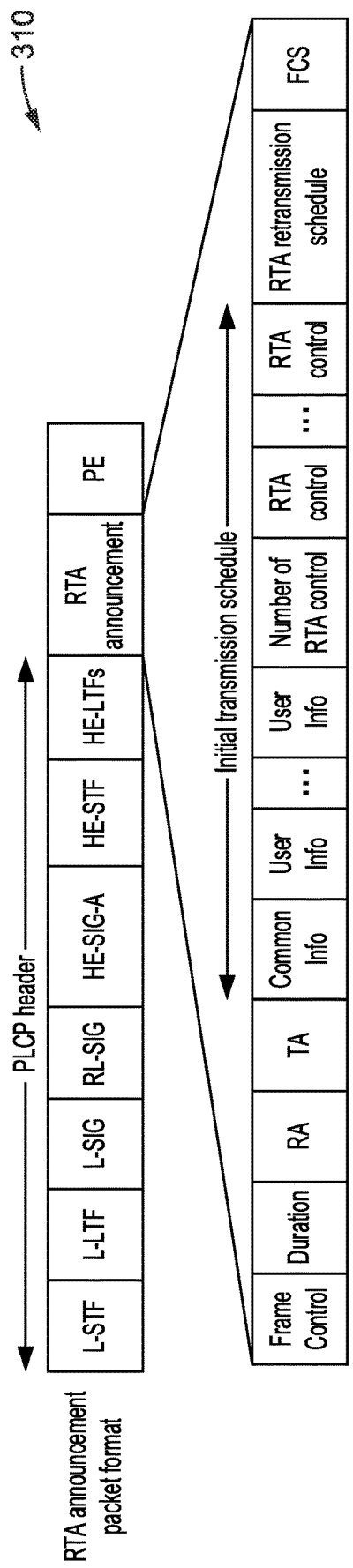

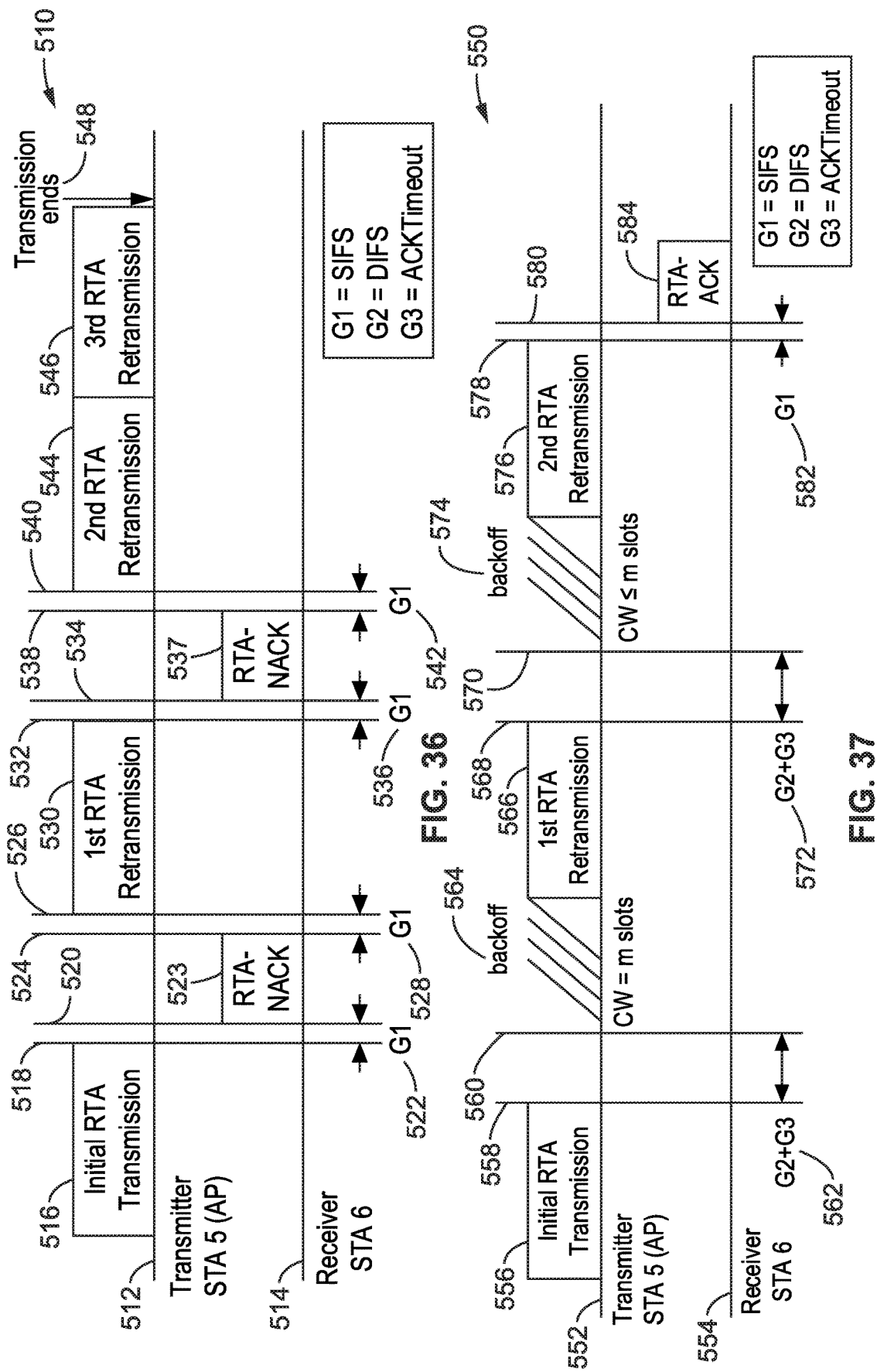

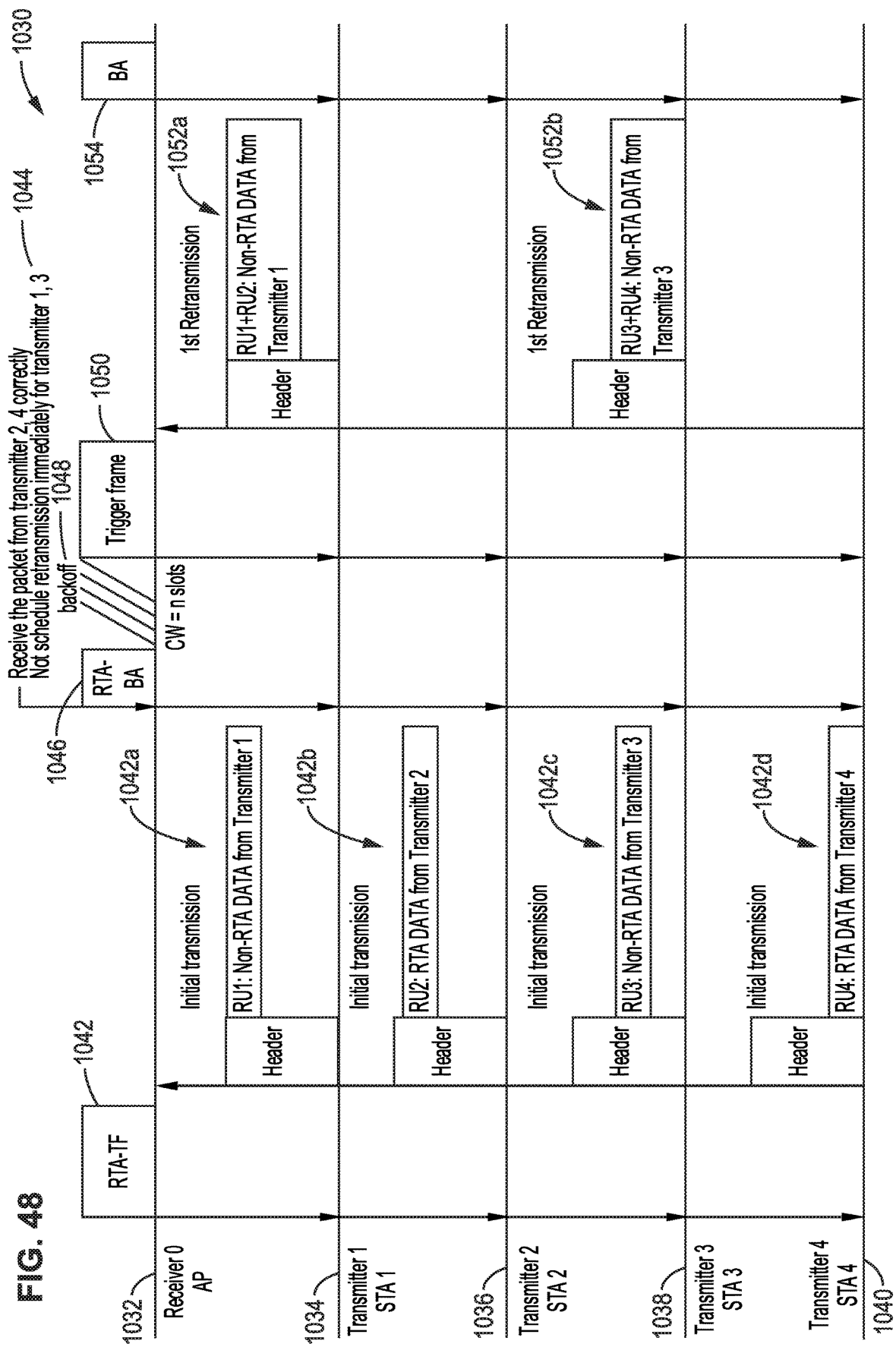

IMMEDIATE RETRANSMISSION SCHEME FOR REAL TIME APPLICATIONS

CROSS-REFERENCE TO RELATED APPLICATIONS

This application claims priority to, and the benefit of, U.S. provisional patent application Ser. No. 62/862,776 filed on Jun. 18, 2019, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication stations, and more particularly to wireless local area network (WLAN) stations communicating a combination of real time and non-real time traffic.

2. Background Discussion

Current wireless technologies using Carrier Sense Multiple Access/Collision Avoidance (CSMA/CA) focus on high overall network throughput, however they lack low latency capability for properly supporting real time applications (RTAs).

A RTA requires low latency communication and uses best effort communication. The data generated from the RTA is called RTA traffic and is packetized as RTA packets at the transmitter station (STA), while the data generated from a non-time sensitive application is called non-RTA traffic and is packetized as non-RTA packets at the transmitter STA.

RTA packets require low latency due to a high timeliness requirement (real-time) on packet delivery. The RTA packet is valid only if it can be delivered within a certain period of time.

Due to the random channel access scenario, a STA needs to sense and contend for channel access before transmitting each packet. Although obtaining a short channel contention time accelerates channel access, it increases the probability of packet collision. The delay inherent in packet collisions is still significant due to the channel contention time required for each retransmission. To avoid packet collisions and improve packet delivery success rates, an STA retransmits the packet following a longer channel contention period after a packet collision, which further delays the packet.

Accordingly, a need exists for enhanced handling of real time application (RTA) packets. The present disclosure fulfills that need and provides additional benefits over previous technologies.

BRIEF SUMMARY

An enhanced WLAN communication apparatus/method for eliminating channel contention delays for each retransmission of a real time application (RTA) packet. In the immediate retransmission scheme, a station (STA) node retransmits RTA packets with minimum channel contention time to reduce the delay of the packets.

The task of applying an immediate retransmission scheme for RTA packets in CSMA/CA systems is more challenging due to the coexistence of both RTA traffic and non-RTA traffic. The challenge in this process can be summarized as: (a) identifying RTA packets from non-RTA packets; (b) gaining channel access for the RTA packet with minimal contention; and (c) communicating the RTA packet (initial transmission and any needed retransmissions) before its lifetime expires.

The disclosed immediate retransmission scheme for RTA packets considers the time-validity element of RTA traffic and minimizes packet latency in a wireless network where both RTA and non-RTA traffic coexist. Existing technologies fail to perform retransmissions that meet the timeliness requirement of many RTA packets.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 7 is a data field diagram for a HE-MU PPDU frame.

FIG. 8 is a data field diagram for a HE-TB PPDU frame.

FIG. 9 is a data field diagram for a trigger frame.

FIG. 10 is a data field diagram for a common information field of a trigger frame.

FIG. 11 is a data field diagram for a user information field of a trigger frame.

FIG. 12 is a data field diagram for a trigger dependent user information field for MU-BAR.

FIG. 13 is a data field diagram for a block ACK (BA) frame.

FIG. 24 is a communication sequence diagram showing RTA packet dropped in response to expired packet lifetime arising according to at least one embodiment of the present disclosure.

FIG. 25 is a data field diagram of an RTA control field according to at least one embodiment of the present disclosure.

FIG. 26 is a data field diagram of an HE-SU-RTA packet format according to at least one embodiment of the present disclosure.

FIG. 27 is a data field diagram of an RTA-ACK/NACK packet format for notification in single user (SU) mode according to at least one embodiment of the present disclosure.

FIG. 28 is a data field diagram of an HE-MU-RTA packet format according to at least one embodiment of the present disclosure.

FIG. 29 is a data field diagram of fields within an RTA announcement trigger frame according to at least one embodiment of the present disclosure.

FIG. 36 is a communication sequence diagram showing RTA packet retransmission without contention after a failed initial transmission according to at least one embodiment of the present disclosure.

FIG. 37 is a communication sequence diagram showing RTA packet retransmission without increasing the contention window according to at least one embodiment of the present disclosure.

FIG. 48 is a communication sequence diagram for non-RTA packet retransmission in multi-user (MU) uplink OFDMA according to at least one embodiment of the present disclosure.

DETAILED DESCRIPTION

1.1. Retransmission Scheme in CSMA/CA Systems

In WLAN systems, IEEE 802.11 uses carrier sense multiple access collision avoidance (CSMA/CA) to allow wireless stations (STAs) to have channel access for packet transmission and retransmission.

Figure 1:
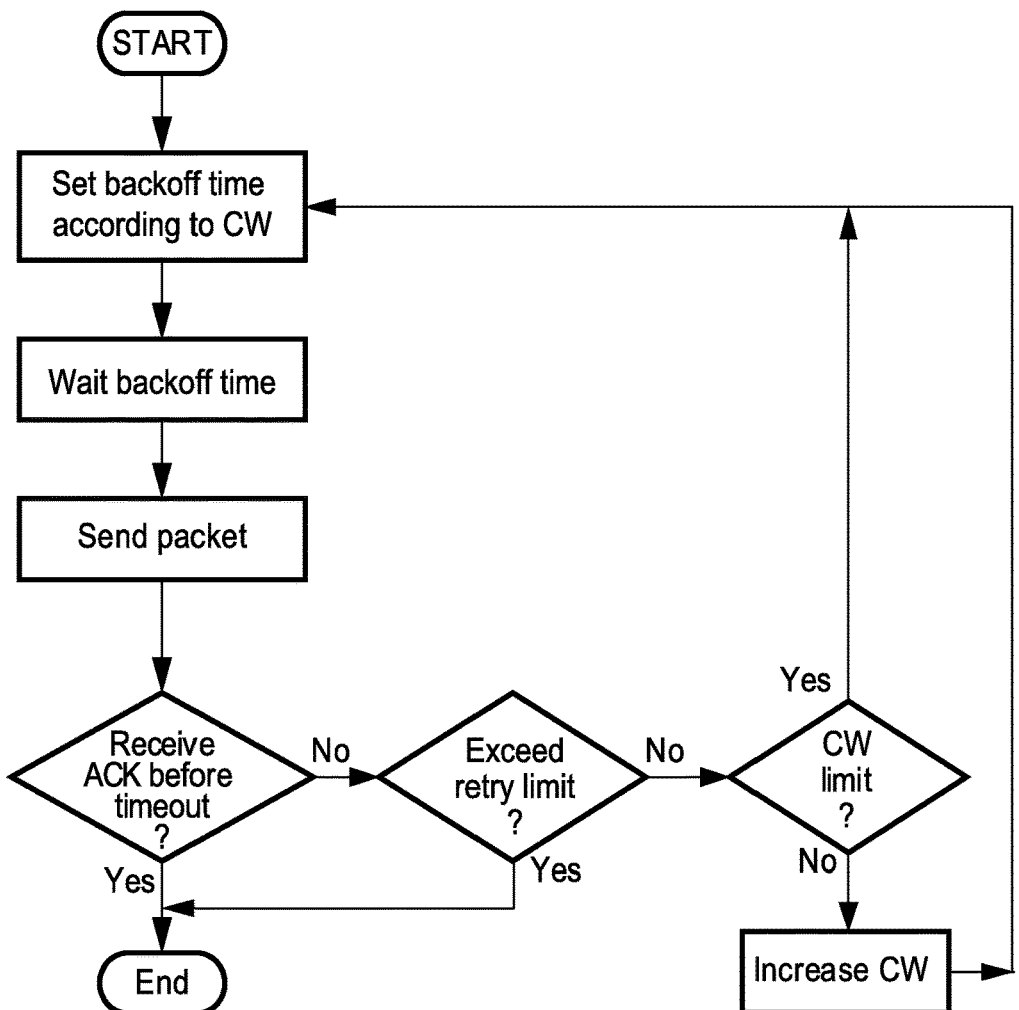
FIG. 1 is a flow diagram of retransmission under CSMA/CA.

FIG. 1 illustrates an example of the CSMA/CA retransmission scheme. In a CSMA/CA system the process is performed before each transmission and retransmission, wherein the STA has to sense the channel and set a backoff time to contend for channel access. The backoff time is decided by a uniform random variable between zero and the size of the contention window (CW). After the STA waits for the backoff time and senses that the channel is idle, it sends a packet. Retransmission of the packet is required if the STA does not receive an ACK before timeout. Otherwise, the transmission is considered to have succeeded.

When retransmission is required, the STA checks the number of retransmissions of the packet, and if the number of retransmissions exceeds the retry limit, then the packet is dropped and no retransmission is scheduled. Otherwise, one or more retransmissions are scheduled. If retransmission is scheduled, then another backoff time is needed to contend for channel access for this retransmission. If the size of contention window does not reach the upper contention window limit (CW limit), then the STA increases CW and execution returns to the top so the STA sets another backoff time depending on the new size of the contention window (CW). The STA waits the backoff time for retransmission and so on.

Figure 2:
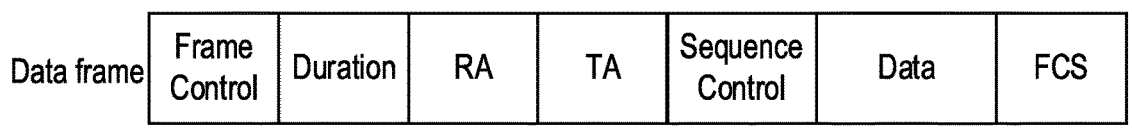
FIG. 2 is a data field diagram for a WLAN data frame.

FIG. 2 illustrates the data frame format in a regular WLAN system. A frame control field indicates the type of frame. A duration field contains network allocation vector (NAV) information used for CSMA/CA channel access. An recipient address (RA) field contains the address of the frame recipient. A transmitter address (TA) field contains the address of the STA that transmits the frame. A sequence control field contains the fragment number and the sequence number of packet.

Figure 3:
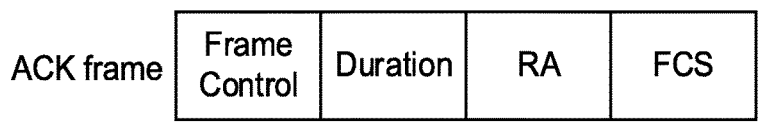
FIG. 3 is a data field diagram for a WLAN ACK frame.

FIG. 3 illustrates an acknowledgement (ACK) data frame format in regular WLAN systems. A frame control field indicates the type of frame. A duration field contains NAV information used for CSMA/CA channel access. An RA field contains the address of the recipient of the frame.

Figure 4:
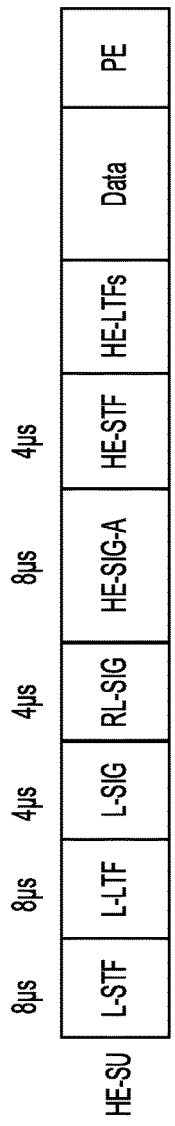
FIG. 4 is a data field diagram for a HE-SU PPDU frame.

FIG. 4 illustrates an HE single user (SU) PPDU format in IEEE 802.11ax as used for single user transmission in IEEE 802.11ax. It will be noted that PPDU stands for Physical layer convergence procedure Protocol Data Unit. A PPDU frame contains a PSDU plus a PHY header as well as a preamble. The HE-SU PPDU frame contains the following fields: (a) L-STF: non-HT short training field; (b) L-LTF: non-HT long training field; (c) L-SIG: non-HT SIGNAL field; (d) RL-SIG: repeated non-HT SIGNAL field; (e) HE-SIG-A: HE SIGNAL A field; (f) HE-STF: HE short training field; (g) HE-LTF: HE long training field; (h) Data: the data field carrying the PSDUs; and (i) PE: packet extension field.

Figure 5:
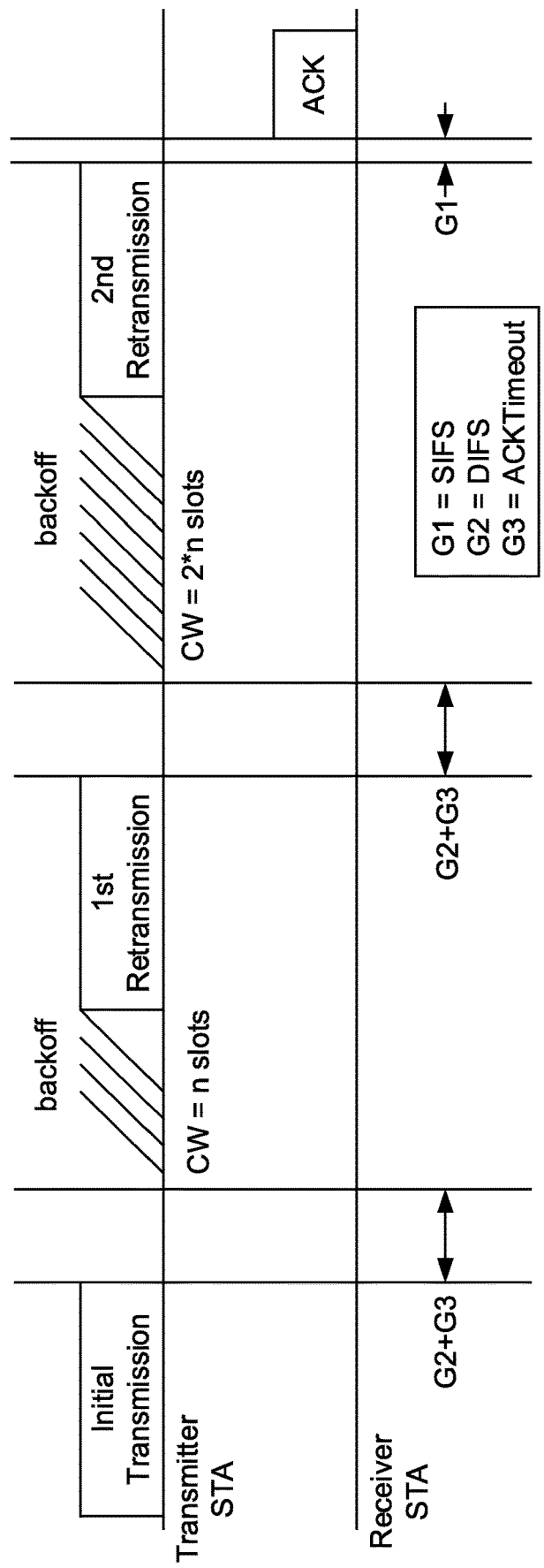
FIG. 5 is a communication sequence diagram for retransmissions in CSMA/CA using a double sized contention window.

FIG. 5 illustrates the scenario of using a double sized contention window for retransmissions in CSMA/CA, in which the backoff time is increased due to retransmission. The data frame and the ACK frame use the formats as shown in FIG. 2 and FIG. 3, respectively. The frames are packetized using the packet format as shown in FIG. 4. After the transmitter transmits the initial transmission of a packet, it does not receive the ACK before timeout. Then, it sets another backoff time, whereby the size of the contention window is n slots. After waiting for the backoff time, the transmitter STA retransmits the packet for the first time. However, this retransmission also fails in this example. The transmitter STA needs to retransmit the packet and sets backoff time to again contend for channel access. This time, the size of the contention window is doubled, which is 2*n slots, due to the retransmission. The expected backoff time is also doubled by the contention window size. The second retransmission succeeds since it receives an ACK before timeout.

Figure 6:
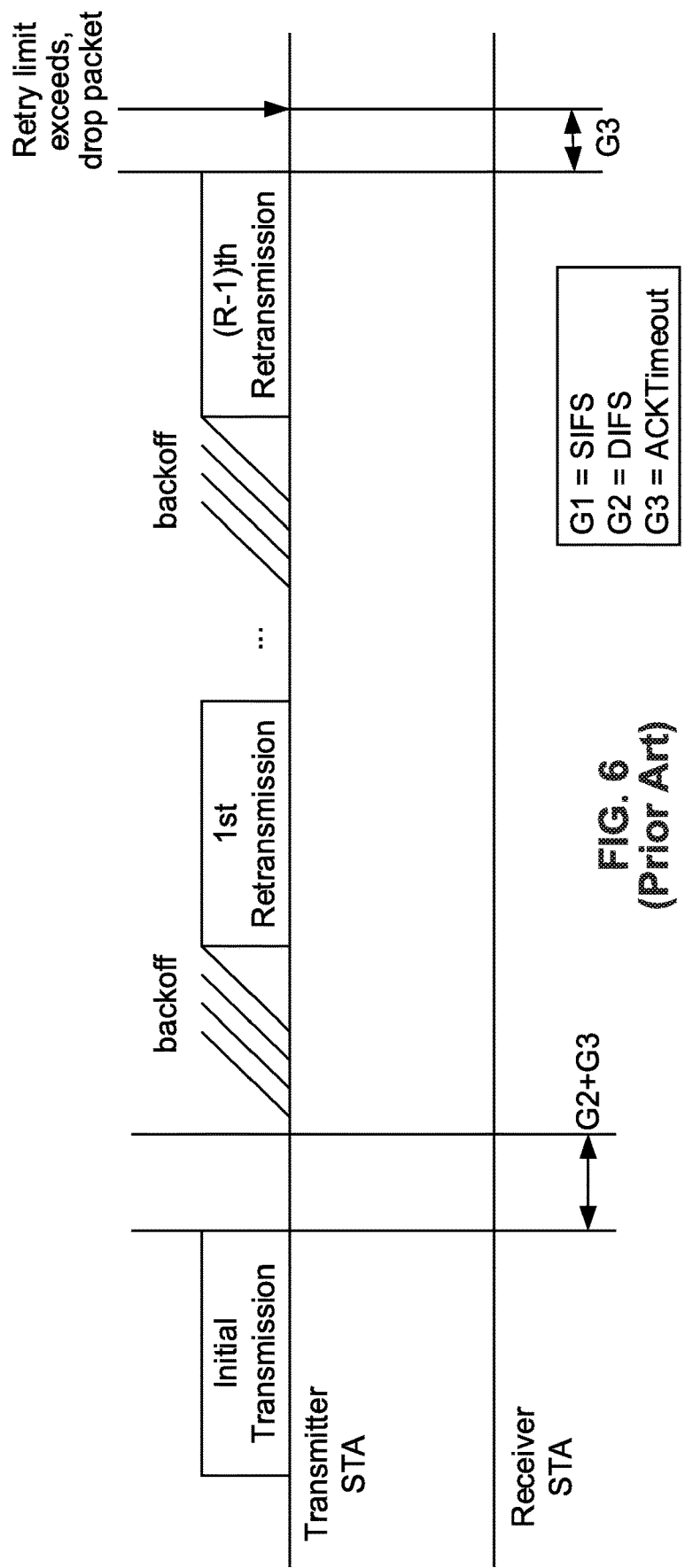
FIG. 6 is a communication sequence diagram for retransmissions in CSMA/CA in which a packet is dropped in response to retry limit.

FIG. 6 illustrates the scenario of a packet dropped due to the retry limit in CSMA/CA, this example showing that the packet is dropped after the number of retransmission exceeds the retry limit. Let us denote the retry limit by R. The data frame and the ACK frame use the formats as shown in FIG. 2 and FIG. 3, respectively. The frames are packetized using the packet format as shown in FIG. 4. As shown in the FIG. 6, after the initial transmission of a packet fails, the transmitter STA retransmits that packet multiple times. However, none of the retransmissions succeed. After retransmitting R times (including the initial transmission), the number of retransmissions exceeds the retry limit. The transmitter STA stops retransmitting that packet and that packet is dropped.

1.2. Multi-User Transmission

Multi-user transmission is available in wireless networks, such as IEEE 802.11. Since IEEE 802.11ax, the network supports multi-user transmission in both uplink and downlink modes. Multi-user transmission in IEEE 802.11ax includes MIMO mode and OFDMA mode, which can be utilized separately or together.

IEEE 802.11ax uses the multi-user transmission packet formats, such as shown in FIG. 1 and FIG. 2, to transmit data in multi-user mode. When multiple users transmit or receive a multi-user transmission packet, all the users share the same Physical Layer Convergence Protocol (PLCP) header of the multi-user transmission packet. Then, each user transmits or receives the data carried by the multi-user transmission packet using separate resource block, including resource unit (RU) allocation, MCS and so forth.

IEEE 802.11ax defines multiple PLCP protocol data unit (PPDU) formats to transmit packets in different multi-user transmission scenarios, which are listed below.

FIG. 7 illustrates an HE multi-user (MU) PPDU format in IEEE 802.11ax used for downlink multi-user transmission. Compared with the single user PPDU format as shown in FIG. 4, this adds the HE-SIG-B field into its format which provides a separate resource block allocation information to each user.

FIG. 8 illustrates an HE Trigger-based (TB) PPDU format used for uplink multi-user transmission. The fields in the HE TB PPDU format are identical to those in the HE single user PPDU format, except that the HE-STF field is 8 μs.

FIG. 9 illustrates the content of a trigger frame format in IEEE 802.11ax. A frame control field indicates the type of the frame. A duration field contains NAV information used for CSMA/CA channel access. An RA field contains the address of the recipient of the frame. A TA field contains the address of the STA that transmitted the frame.

FIG. 10 illustrates a common info field, which includes the information for all allocated STAs.

FIG. 11 illustrates a user Info field including the information for each STA.

The common info field and the user info field provide the separate resource block allocation information to each user.

FIG. 12 illustrates a trigger dependent user info field in trigger frame for the multiple-user (MU) block ACK request (BAR). The trigger frame as shown in FIG. 9 could be transmitted as a multi-user block ACK request (MU-BAR) by setting the trigger type in the common info field to "2". When the trigger frame is MU-BAR, the content of the trigger dependent user info field (as shown in FIG. 11) in trigger frame is as shown in FIG. 12.

FIG. 13 illustrates the contents of a block ACK (BA) frame format in regular WLAN systems. A frame control field indicates the type of frame. A duration field contains NAV information used for CSMA/CA channel access. An RA field contains the address of the recipient of the frame. A TA field contains addresses of the STA that transmits the frame. A BA control field indicates the policy of the block ACK. A BA info field contains the feedback of the transmission.

Figure 14:
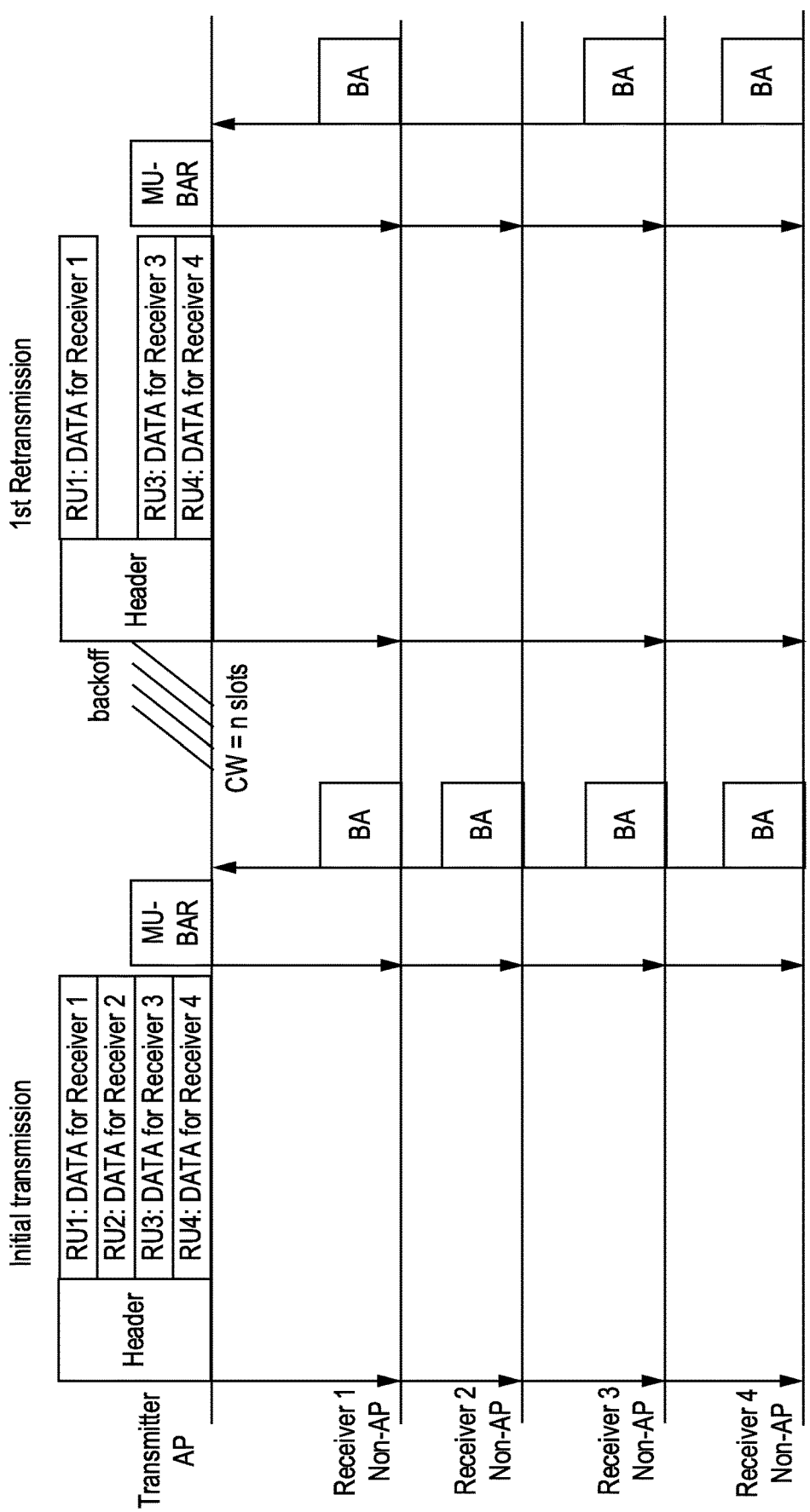
FIG. 14 is a communication sequence diagram for retransmissions in CSMA/CA in the downlink of an OFDMA system.

FIG. 14 illustrates a CSMA/CA retransmission scheme in the downlink of OFDMA systems, as an example of downlink multi-user transmission using OFDMA. The transmitter AP transmits data to its receivers 1, 2, 3 and 4 using the HE MU PPDU format. After finishing the initial transmission, the AP sends a multi-user Block ACK request (MU-BAR) to all the receivers. The receivers then send block ACK (BA) back to the AP. According to the content in the BAs, the AP decides whether to retransmit the packets to receivers 1, 3, and 4. It contends for the channel and waits the backoff time. The first retransmission occurs after the AP gains channel access.

Figure 15:
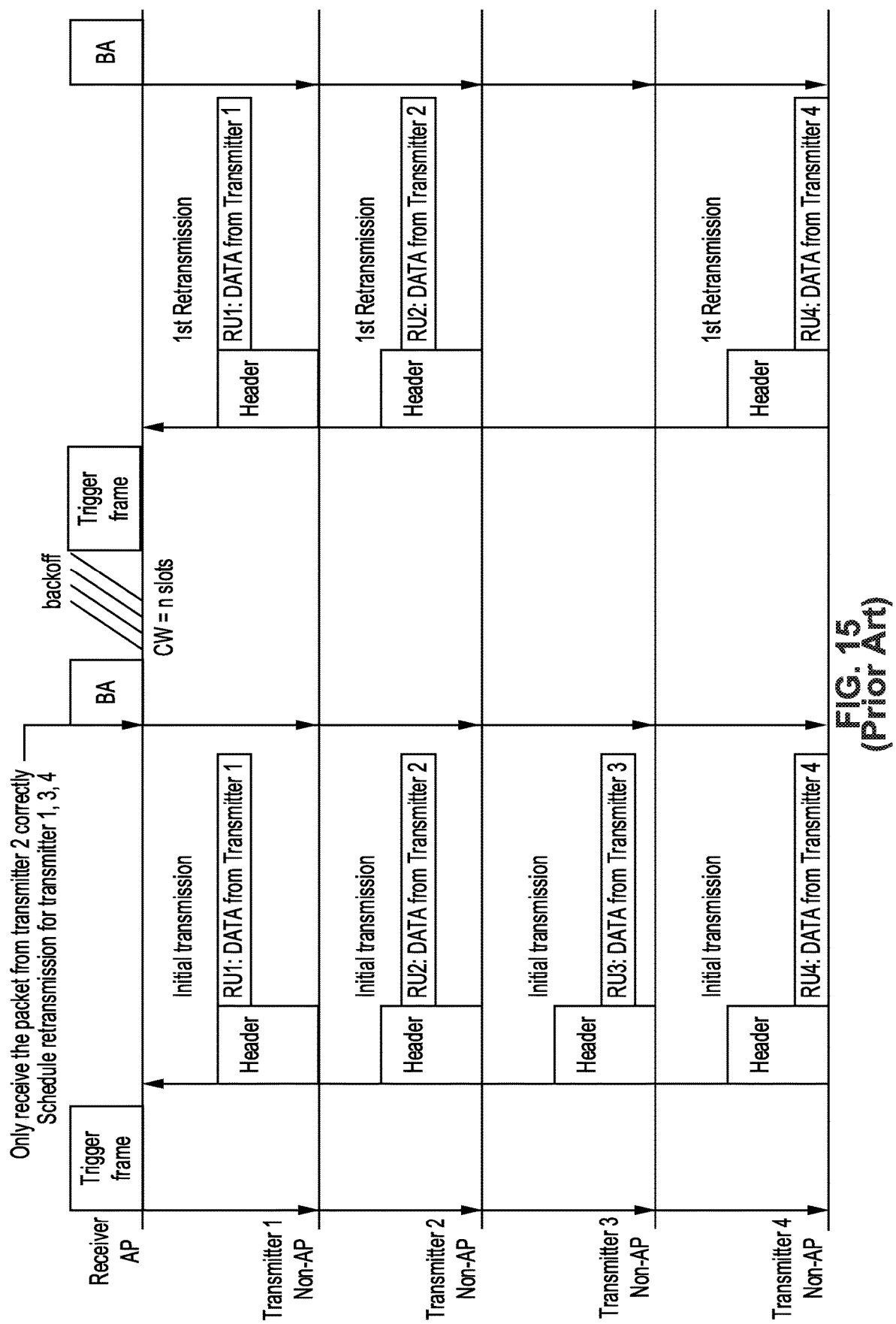
FIG. 15 is a communication sequence diagram for retransmissions in CSMA/CA in the uplink of an OFDMA system.

FIG. 15 illustrates a CSMA/CA retransmission scheme in the uplink of OFDMA systems, showing an example of uplink multi-user transmission using OFDMA. The AP first sends a trigger frame to all the transmitters 1, 2, 3, and 4. The transmitters receive the trigger frame and start the initial transmission using the resource block allocated by the trigger frame. The multi-user transmission packet uses the HE-TB PPDU format. The AP receives the packet from the transmitters and sends a BA frame to report the correctness of the transmission. Here, only the packet carrying the data from transmitter 2 is received correctly. The retransmission needs to be scheduled for transmitters 1, 3, and 4. The AP contends for the channel and waits the backoff time to gain the channel access. Then, the retransmission proceeds in the same manner as the initial transmission.

2. Problem Statement

Current wireless communication systems using CSMA/CA do not identify whether packets are RTA packets or non-RTA packets, and all the packets are handled utilizing the same retransmission scheme under CSMA/CA. The retransmission scheme in CSMA/CA aims to reduce the probability of packet collision while the latency of the packet is not the main concern. As shown in the sections discussing existing IEEE 802.11 protocols, each retransmission requires a STA to contend for the channel with an extended contention window that adds significant delay to packet transmission.

The retransmission scheme in CSMA/CA does not take the timeliness of the packet into consideration. As shown for existing systems, the transmitter STA retransmits the packet until either it is received by the receiver STA or until retransmissions exceed the retry limit. However, the RTA packet has a lifetime within which it must be transmitted. That is, the RTA packet has to be transmitted or retransmitted within a certain time.

The retransmission scheme of CSMA/CA in multi-user transmission is more complicated. The RTA traffic and non-RTA traffic can be integrated in the same multi-user transmission packet. When the multi-user transmission packet contains both RTA traffic and non-RTA traffic, the retransmission of that packet may contain the RTA traffic or not, which has an impact on the retransmission schedule. The retransmission scheme using multi-user transmissions, such as OFDMA, gives more flexibility of resource allocation in packet retransmissions.

3. Outline of Contributions of the Present Disclosure

By utilizing the disclosed technology, STAs are able to identify the RTA packet and non-RTA packet. The disclosed technology takes the timeliness of RTA traffic into consideration, as the RTA packet has a given lifetime to be transmitted. The STAs schedule the retransmission of RTA packet based on the lifetime of the RTA packet.

The disclosed technology separates the retransmission scheme for RTA packets from non-RTA packets, and uses the regular retransmission scheme defined in CSMA/CA for non-RTA packets.

The disclosed technology defines an immediate retransmission scheme for RTA traffic to minimize channel contention time. In some use cases, the channel contention time is eliminated altogether. By using this scheme, the delay of RTA packets is reduced.

The disclosed technology is compatible with OFDMA systems. By operating the resource unit (RU) allocation with other adaptive machines, such as rate control, the transmission gains more diversity effect to improve the packet delivery rate.

4. Example Embodiments 4.1. STA Hardware Configuration

Figure 16:
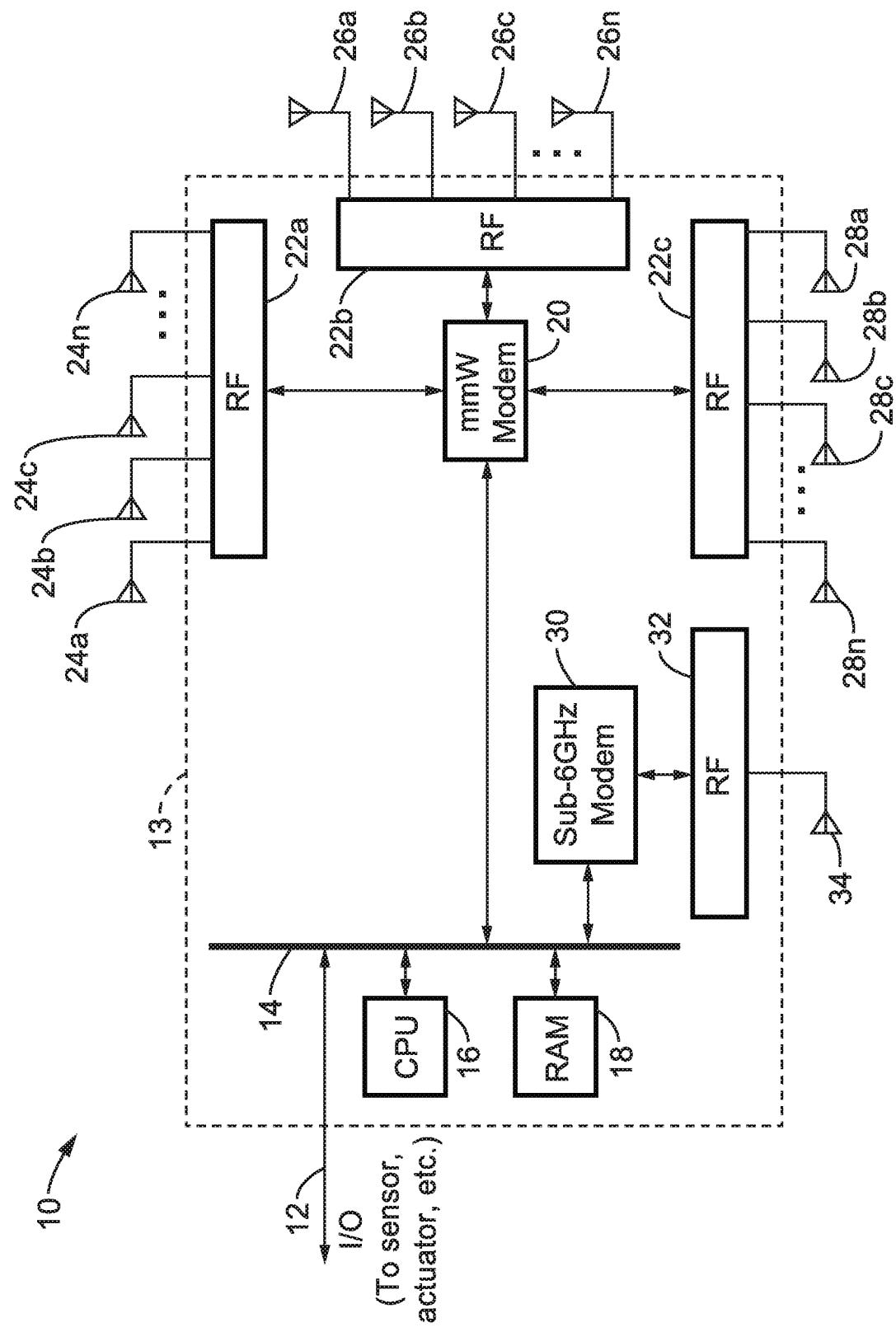
FIG. 16 is a block diagram of station (STA) hardware according to at least one embodiment of the present disclosure.

FIG. 16 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination, access point (AP) and so forth); depending on what role it is playing in the current communication context.

The STA may be configured with a single modem and single radio-frequency (RF) circuitry, or it may be configured with multiple modems and multiple RF circuits as depicted by way of example and not limitation in FIG. 16.

In this example, the host machine is shown configured with a millimeter-wave (mmW) modem 20 coupled to radio-frequency (RF) circuitry 22a, 22b, 22c to a plurality of antennas 24a-24n, 26a-26n, 28a-28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to a discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

It is seen therefore, that the host machine accommodates a modem which transmit/receives data frames with neighboring STAs. The modem is connected to at least one RF module to generate and receive physical signals. The RF module(s) include a frequency converter, array antenna controller, and other circuitry as necessary. The RF module(s) are connected to multiple antennas which are controlled to perform beamforming for transmission and reception. In this way, the STA can transmit signals using multiple sets of beam patterns.

4.2. Example STA Topology for Consideration

Figure 17:
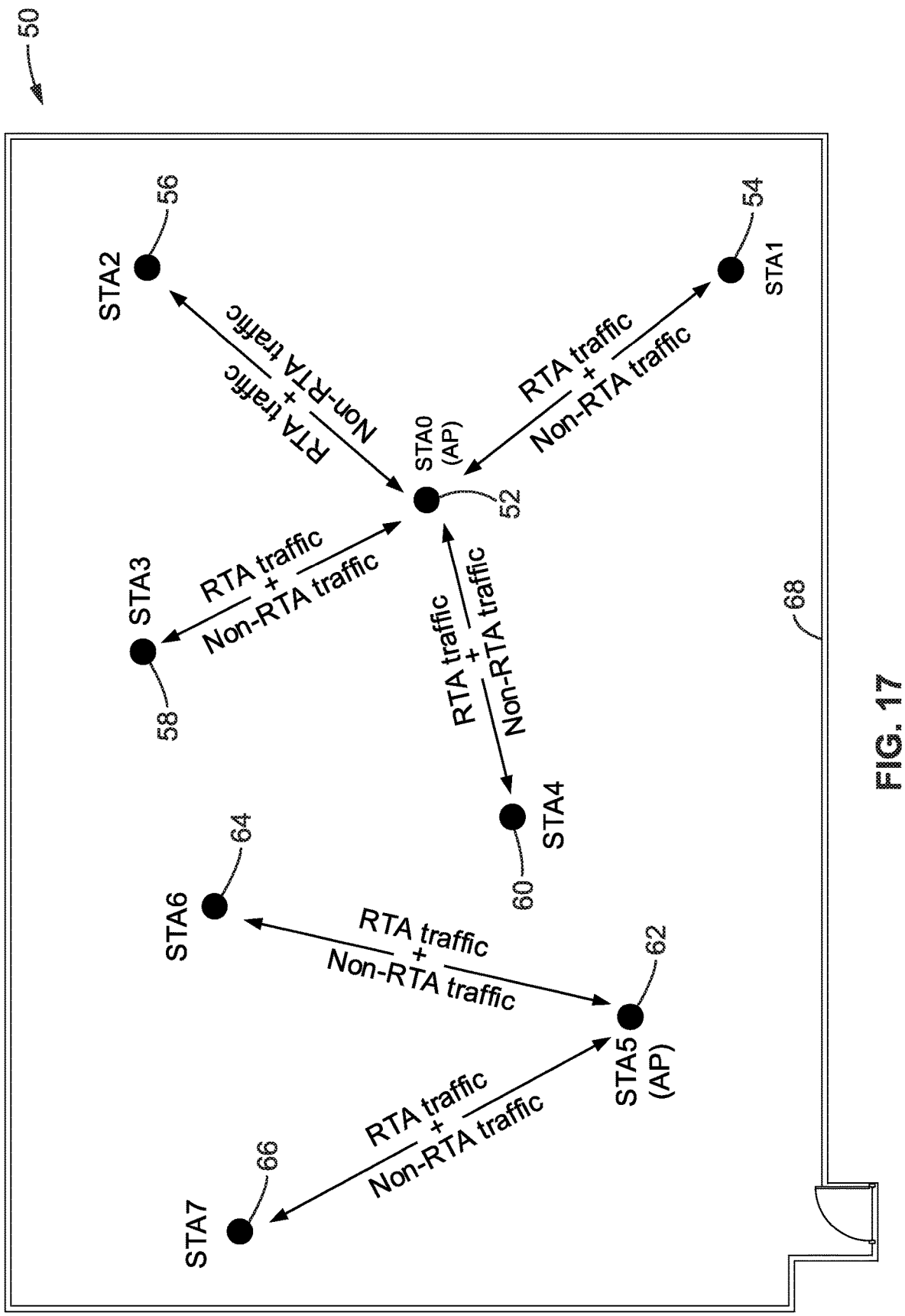
FIG. 17 is a network topology diagram showing a topological example addressed according to at least one embodiment of the present disclosure.

FIG. 17 illustrates an example network topology (scenario) 50 as an aid to explaining the goal of the disclosed technology. By way of example and not limitation, this example assumes there are 8 STAs consisting of two Basic Service Sets (BSSs) in a meeting room. Each STA can communicate with the other STAs in the same BSS. All STAs use CSMA/CA for random channel access. A first BSS depicts STA0 52 operating as an access point (AP) and non-AP stations STA1 54, STA2 56, STA3 58 and STA4 60. A second BSS depicts STA5 62 as AP along with STA6 64, STA7 66.

All STAs in this example are considered to support (run) both applications requiring low latency communication and applications that utilize best effort communication. The data generated from the application requiring low latency communication is called Real Time Application (RTA) traffic and will be packetized as RTA packets at the transmitter STA. Also, the data generated from the non-time sensitive applications are called non-RTA traffic and are packetized as non-RTA packets at the transmitter STA. As a consequence, the transmitter STA generates both RTA traffic and non-RTA traffic for communication. The location of the STAs and their transmission links are as shown in this example network topology figure.

When the STA transmits a non-RTA packet, the STA can follow the regular CSMA/CA scheme. When the STA transmits an RTA packet and that packet collides, the STA schedules packet retransmission with minimum channel contention. One goal of the disclosed technology is to reduce latency of RTA traffic.

4.3. STA Layer Model

Figure 18:
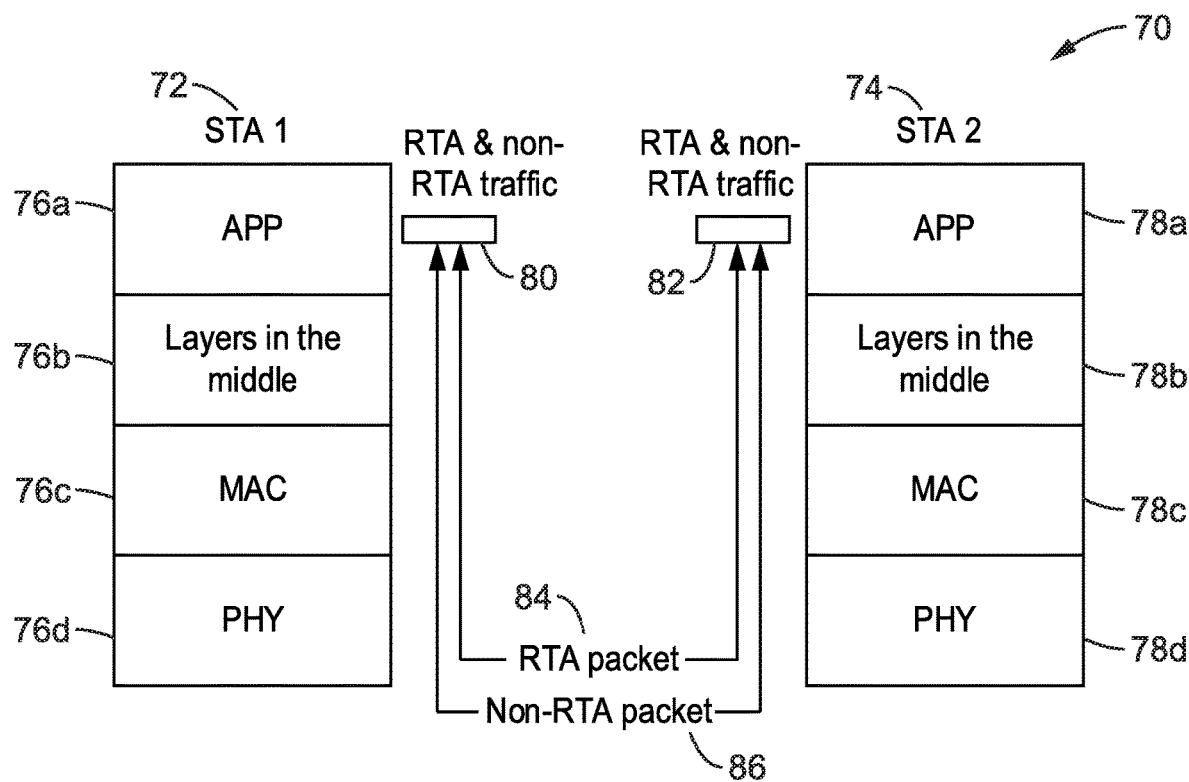
FIG. 18 is a layered communication diagram for RTA and non-RTA traffic communication in an open systems interconnection (OSI) model according to at least one embodiment of the present disclosure.

FIG. 18 illustrates an example embodiment 70 of RTA and non-RTA traffic communication in OSI model. In this section, the STA layer model for traffic communication is explained. As shown in this example two STAs, STA1 72 and STA2 74 generate RTA traffic and non-RTA traffic 80, 82 and communicate with each other with RTA packets 84 and non-RTA packets 86. The overall process is explained below.

Both RTA traffic and non-RTA traffic are generated by the APP layer 76a, 78a of the transmitter STA. The APP layer of the transmitter STA passes the RTA traffic and non-RTA traffic to the MAC layer 76c, 78c via (through) layers in the middle 76b, 78b. The MAC layer 76c, 78c and the PHY layer 76d, 78d append additional signal fields in the MAC header and PLCP header to the packet, and the packets are transmitted over the PHY layer of the network.

The receiver STA receives the packets at the PHY layer, decodes and sends them to its MAC layer if the packets are decoded correctly, after which the data is fed to its APP layer through (via) layers in the middle.

4.4. Mechanism for Identifying RTA and Non-RTA Packets

The disclosed technology classifies the packets in the wireless communication system as being either RTA or non-RTA. RTA packets use an immediate retransmission scheme for packet retransmissions while non-RTA packets may use the regular CSMA/CA scheme. To that end, the STA identifies the RTA packet and non-RTA packet at the MAC layer. This process is described in this section.

According to the STA layer model shown in FIG. 18, it is possible that the MAC layer of the transmitter STA identifies the RTA traffic and non-RTA traffic from the upper layers and packetizes them into RTA packets and non-RTA packets, respectively. This section provides the details of how the transmitter STA identifies the RTA traffic using prior negotiation.

According to the STA layer model shown in FIG. 18, the transmitter STA transmits the packets to the receiver STA over the PHY layer of the network. When the receiver STA receives the packet at the MAC layer, it is able to identify the RTA packet and non-RTA packet based on the information embedded in the MAC header or PLCP header. This section provides the details on how the receiver STA identifies the RTA packet based on the PLCP or MAC header information.

The RTA traffic has to be communicated within a given lifetime to assure the validity of the data. In other words, if the RTA traffic is not received by the receiver before this lifetime expires, the RTA traffic is invalid and can be discarded. The STA packetizes the RTA traffic into RTA packets for transmitting through the PHY layer. Hence, the RTA packet also has a lifetime for the transmission. This section provides the details of how the STA copes with the lifetime expiration of the RTA packet.

4.4.1. Prior Negotiation

Often, RTAs generate traffic periodically, just as with connection-oriented communication. RTA connection-oriented communications established by an application between STAs is called an RTA session. It is possible that STAs can have multiple RTA sessions in the network. Each STA according to the present disclosure is able to manage those RTA sessions properly.

Before an RTA session starts transmitting RTA traffic, a prior negotiation occurs between the transmitter STA and the receiver STA to establish the connection. During the prior negotiation, the transmitter STA and the receiver STA record the RTA session with the RTA session identifying information that can be used for identifying the RTA traffic at the MAC layer of the transmitter side and the RTA packet at the MAC layer of the receiver side.

As was shown in FIG. 18, when the APP layer passes the traffic to the MAC layer on the transmitter side, the layers in the middle add header information to the traffic. When the MAC layer of the transmitter STA receives traffic from the upper layers, it extracts the header information from the upper layers and looks up (searches) the RTA session records created by the prior negotiation. If the header information matches one RTA session in the records, the traffic is RTA; otherwise, the traffic is considered non-RTA. The header information that could be used for identifying RTA traffic is listed in Table 1. In this section, the details of the prior negotiation are described.

According to the prior negotiation results, it is also possible that the receiver STA classifies the RTA and non-RTA packet by the channel resource for packet transmission, such as time, frequency, and other metrics. When a packet is received using the channel resource that is granted for an RTA packet, then the STA identifies it as an RTA packet.

Otherwise, that packet is a non-RTA packet. This scenario will be used when the packet is transmitted in multi-user uplink mode as explained in Section 4.6.2.2.

Figure 19:
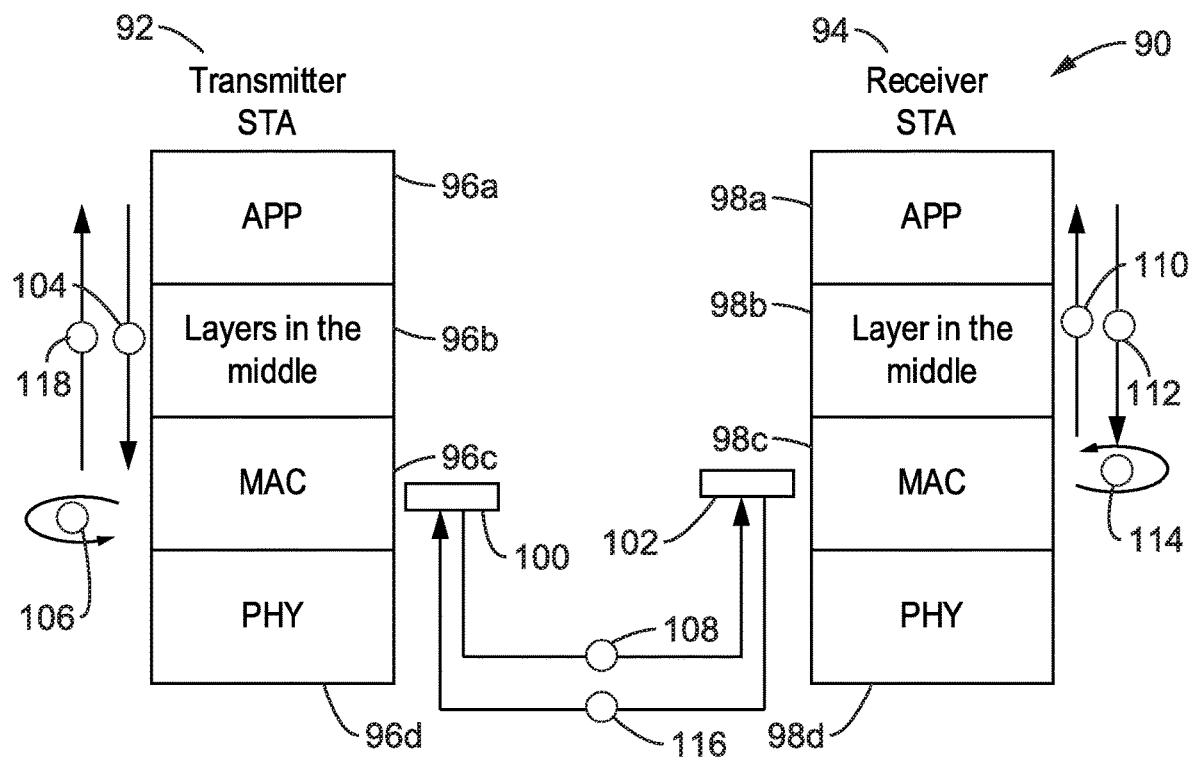
FIG. 19 is a layered communication diagram showing prior negotiation for RTA traffic communications according to at least one embodiment of the present disclosure.

FIG. 19 illustrates an example embodiment 90 of prior negotiation for an RTA traffic packet at transmitter side 100 and receiver side 102. It should be appreciated that one prior negotiation establishes one RTA session and could be used for all the RTA packets generated by that RTA session. The figure shows prior negotiation for establishing an RTA session between two STAs in a STA layer model as was seen in FIG. 18. A transmitter STA 92 is shown having layers APP 96a, layers in the middle 96b, MAC layer 96c and PHY layer 96d with a receiver STA 94 having the same layers APP 98a, layers in the middle 98b, MAC layer 98c and PHY layer 98d. The process of the prior negotiation is explained below.

Referring to FIG. 19, the following steps are seen. The APP layer 96a of transmitter 92 requests 104 a resource (e.g., time, channel) negotiation. Thus, on the transmitter STA side, the APP layer starts an RTA session and requests a negotiation of the channel resources, such as time and bandwidth, for its RTA traffic transmission. This negotiation request is transmitted from the management entity in the APP layer to the management entity residing in the MAC layer.

The MAC layer of the transmitter STA receives the negotiation request from the upper layer and checks 106 resource availability on its side. Also, it records the RTA session identifying information provided by the upper layers for identifying RTA traffic in the session. The record of the identifying information could be picked from the information listed in Table 1, such as TCP/UDP port number, the type of service, etc. It may deny the request from the upper layer if the resource is unavailable, or re-negotiate with the upper layer.

If the MAC layer of the transmitter STA finds the resource available, it sends 108 a negotiation request frame to the MAC layer of the receiver STA. The negotiation frame contains the identifying information of the RTA session so that the receiver can record and use it afterwards. The negotiation frame is similar to the packet format shown in Section 4.5.2.

After the MAC layer of the receiver STA receives the negotiation request frame, it first informs 110 its APP layer to get ready for receiving RTA packets by sending a negotiation request from the management entity in the MAC layer to the management entity in the APP layer. The negotiation may fail if the APP layer is not available for RTA transmission.

The APP layer of the receiver grants the availability of resources at its layer and sends 112 this information from the management entity in the APP layer to the management entity resides in the MAC layer.

Then, the MAC layer of the receiver STA checks 114 the resource availability on its side. The MAC layer can deny or re-negotiate if the resource is unavailable. The MAC layer of the receiver STA collects all the negotiation information on its side and reports it 116 to the MAC layer of the transmitter.

The MAC layer of the transmitter receives the negotiation result and forwards it 118 to its APP layer. If the negotiation succeeds, the APP layer can start to transmit RTA traffic using the resource granted by the both STAs.

According to the RTA session records created by the prior negotiation, the MAC layer of the transmitter STA identifies the RTA traffic and non-RTA traffic by the header information from the upper layers. When the APP layer generates RTA traffic, the RTA traffic is passed to its MAC layer with the header information provided by the layers in the middle. By looking up the RTA session records created by the prior negotiation, the transmitter STA is able to use that header information to identify the RTA traffic and packetizes the RTA traffic into RTA packet at the MAC layer.

Figure 20:
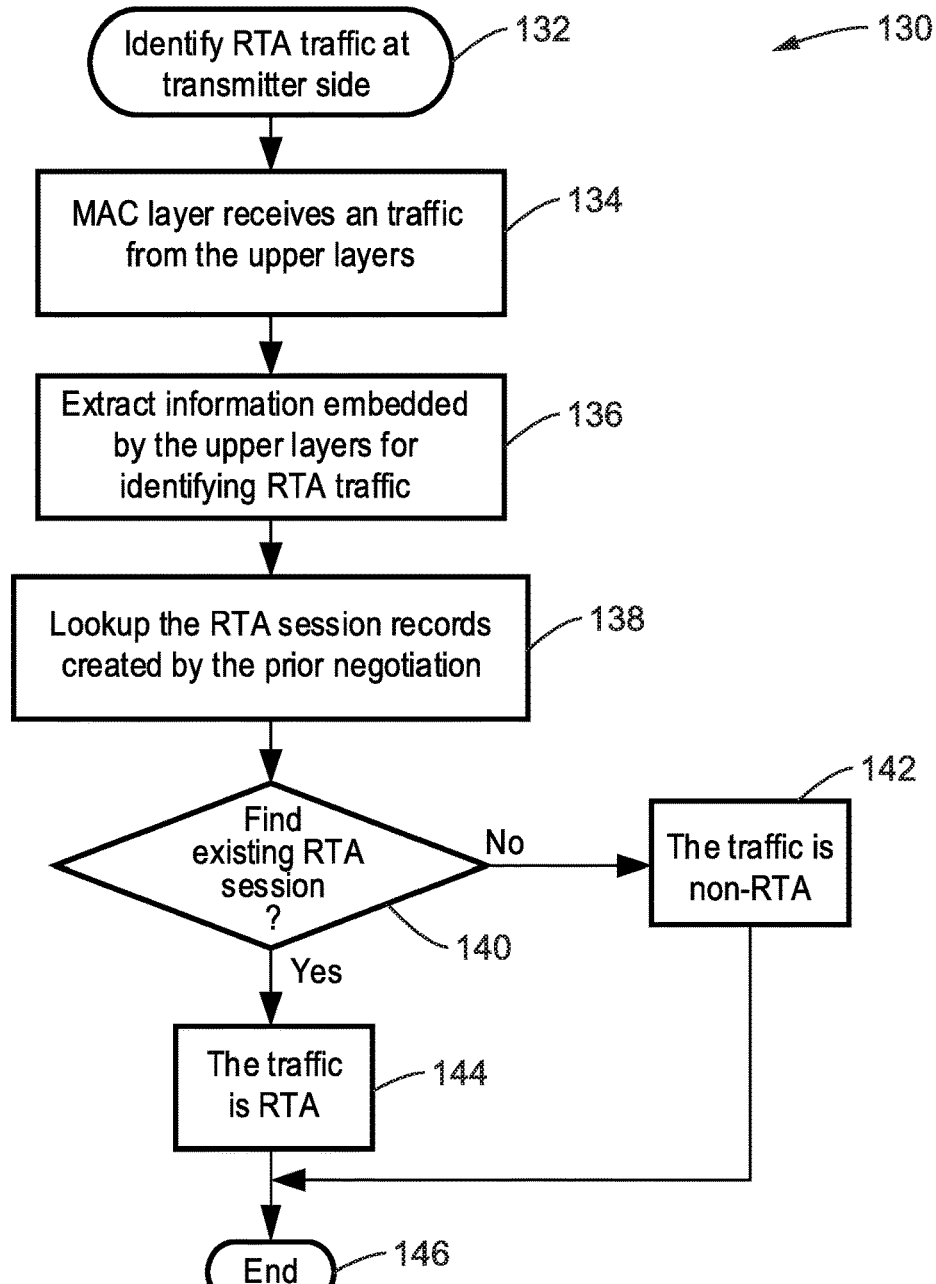
FIG. 20 is a flow diagram of identifying an RTA packet on the transmitter side according to at least one embodiment of the present disclosure.

FIG. 20 illustrates an example embodiment 130 of identifying RTA packet traffic on the transmitter side. The routine starts 132 and the MAC layer of the transmitter STA receives traffic 134 from the upper layer. The MAC layer extracts 136 information embedded by the upper layer for identifying RTA traffic, and is checking the header information of the upper layers, such as the type of service and the TCP/UDP port number.

The MAC layer of the transmitter STA compares 138 the header information from the upper layers with the RTA session records created by the prior negotiation. A check 140 is made on the header information. If the header information from the upper layers matches one RTA session in the record, then block 144 is reached with the traffic determined to be RTA traffic, otherwise block 142 is reached with the traffic being non-RTA traffic. After which processing ends 146.

4.4.2. Packet Header Information

Figure 21:
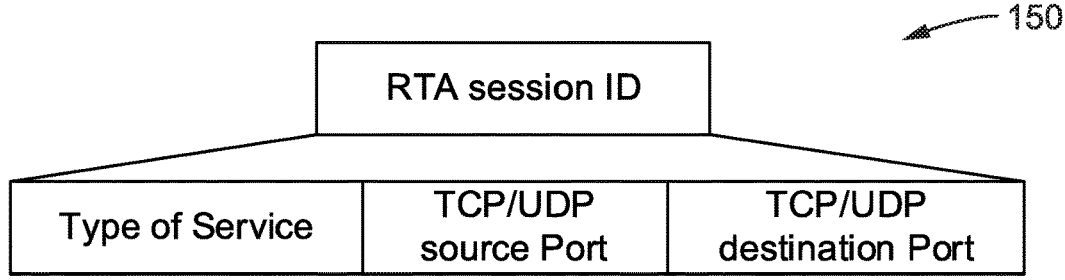
FIG. 21 is a data field diagram for fields within RTA session identification according to at least one embodiment of the present disclosure.

FIG. 21 illustrates an example embodiment 150 of an RTA session identifying information format. When the transmitter STA generates RTA packets, it adds additional signal fields in the PLCP or MAC header. When the additional signal field contains the RTA session identifying information, the receiver STA can use the RTA session identifying information in the PLCP or the MAC header to distinguish at the MAC layer between an RTA packet and a non-RTA packet. One example of the RTA session identifying information is shown in the figure.

Figure 22:
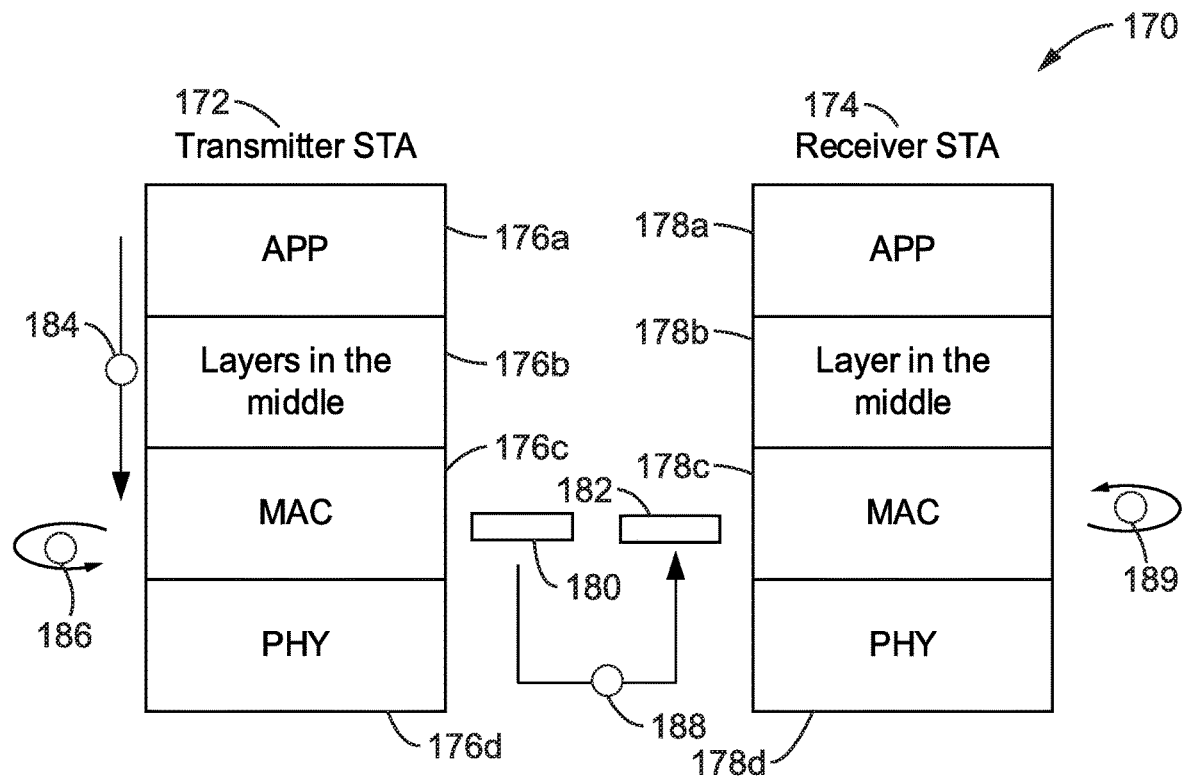
FIG. 22 is a layered communication diagram showing header information exchange between the APP layer and MAC layer according to at least one embodiment of the present disclosure.

FIG. 22 illustrates an example embodiment 170 of header information exchange 180, 182 between APP layer and MAC layer. A transmitter STA 172 is seen with APP layer 176a, layers in the middle 176b, MAC layer 176c, and PHY layer 176d. A receiver STA 174 is seen with the same layers APP layer 178a, layers in the middle 178b, MAC layer 178c, and PHY layer 178d.

The figure depicts details of how this process works between two STAs in the STA layer model. The APP layer of the transmitter STA generates 184 RTA traffic and passes it to the MAC layer. When the traffic is passed through the layers in the middle, the header information, such as the type of service field and the TCP/UDP port numbers is added to the traffic.

When the MAC layer of the transmitter STA receives the RTA traffic from the upper layer, it extracts the header information, such as the type of service and the TCP/UDP port numbers from the traffic. By looking up the RTA session records created by the prior art, the MAC layer identifies 186 the traffic is RTA.

Then the MAC layer of the transmitter STA packetizes the traffic into an RTA packet 180 and embeds the type of service and the TCP/UDP port numbers in the MAC header or the PLCP header as the RTA session identifying information. One example of the RTA session identifying information was shown in FIG. 21. Next, the transmitter STA sends 188 the RTA packet to the receiver STA which receives packet 182.

When the receiver STA receives the RTA packet at its MAC layer, it can identify 189 the RTA packet based on the RTA session identifying information in the PLCP or the MAC header.

Figure 23:
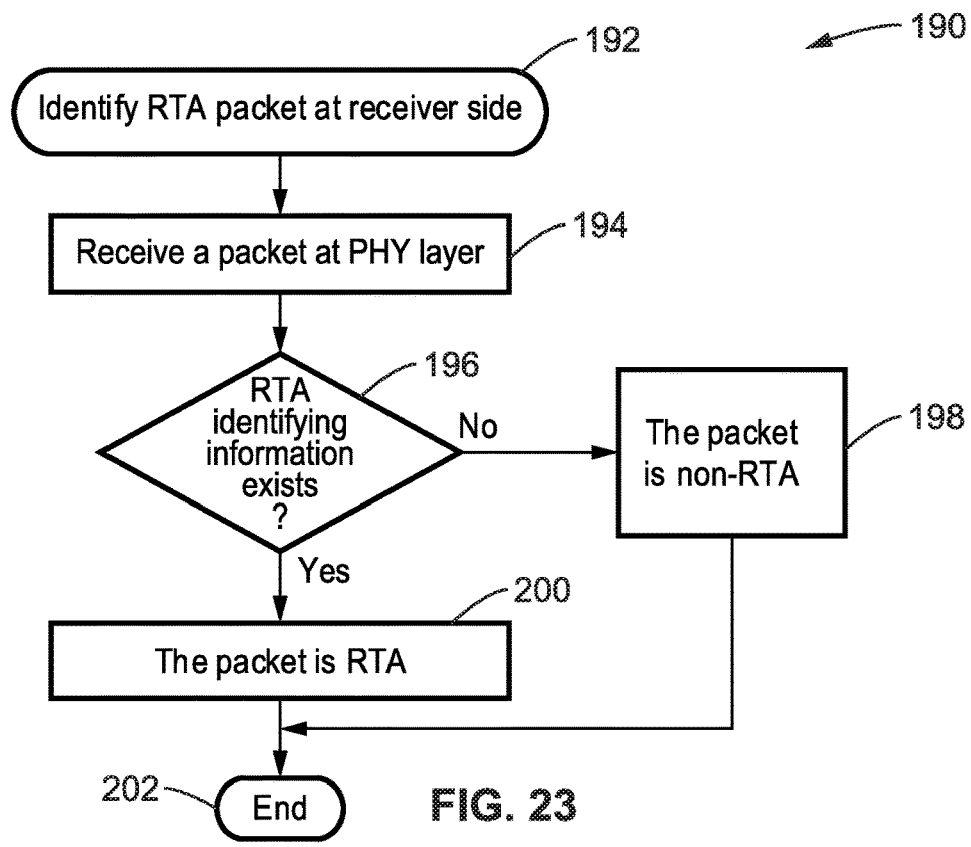
FIG. 23 is a flow diagram of identifying an RTA packet on the receiver side according to at least one embodiment of the present disclosure.

FIG. 23 illustrates an example embodiment 190 of a process for identifying an RTA packet on the receiver side at the MAC layer. The process starts 192 and the receiver receives a packet at the PHY layer 194. As explained in FIG. 22, the MAC header or the PLCP header of RTA packets includes the identifying information of a RTA session. Referring again to FIG. 23 a check is made 196 to determine if the identifying information exists. If the identifying information exists then execution moves to block 200 as the receiver STA has determined that the packet is an RTA packet. Otherwise, if the information does not exist then execution moves from block 196 to 198, as it has been determined that the packet is a non-RTA packet. After which the process ends 202.

4.4.3. RTA Packet Lifetime Expiration

Originally, as shown in FIG. 6 the packet stops retransmission when the number of retransmissions of that packet exceeds the retry limit. The packet is dropped after that. In contrast, the RTA packet has a limited lifetime for being transmitted. When the lifetime of the RTA packet expires, the retransmission of that RTA packet stops and the packet is dropped.

The RTA traffic has a lifetime which represents the time during which the information of the packet (traffic) is considered valid. The lifetime of the RTA packet is used to ensure the RTA traffic carried by the packet is valid when the packet is received by the receiver STA. Therefore, the lifetime of the RTA packet should not be longer than the lifetime of the RTA traffic. In the simplest case, those two lifetimes can be set to the same value.

FIG. 24 illustrates an example embodiment 210 of an RTA packet being dropped due to an expired packet lifetime, in particular in the case of when the retransmission of an RTA packet is not scheduled due to the expiration of the packet lifetime. The figure depicts a transmitter STA 212 and receiver STA 214. When the transmitter STA transmits an RTA packet, it sets a lifetime 216 to transmit that packet. An initial transmission is seen 218. In the figure the value G1 represents short interframe spaces (SIFS), G2 represents DCF interframe spaces (DIFS) and G3 represents ACK Timeout. Before performing any retransmitting of the RTA packet, the transmitter STA checks whether the lifetime of the packet expires. The retransmission is not scheduled and that packet is dropped if the lifetime has expired. In this example, the transmitter after the period 213 (G2+G3) between events 220 and 222, performs a backoff 214, then the STA transmits a first retransmission 216 since the packet lifetime is not expired. After that, it checks the packet lifetime and it is found in this example that it has expired 218, so it stops retransmitting and drops the packet.

On the receiver side, the RTA packet could be stored in the buffer before the packet lifetime expires. When the packet lifetime expires, the receiver should delete that packet from the buffer since the RTA traffic in the packet is no longer valid.

4.5. RTA Packet Format 4.5.1. RTA Packet Control Field

The RTA control field can be used for identifying RTA packets, the prior negotiations, and the retransmission schedule. In the immediate retransmission scheme, the RTA control field is used for three purposes.

The receiver STA could send ACK or NACK to inform the transmitter STA of the correctness of the received packet based on the RTA control field information. The RTA control field contains the retransmission schedule information for RTA packets. The RTA control field decides the type of Hybrid Automatic Repeat Request (Hybrid ARQ or HARQ) used for the RTA packet. When a packet is transmitted multiple times (i.e., retransmission), the receiver STA can store the received signal of the multiple packet transmissions in the buffer. The HARQ applies the error detection and correction method to the received signal of the packet with the same packet ID and decodes the packet successfully.

FIG. 25 illustrates an example embodiment 230 of the content of an RTA field having the following subfields. (a) Length is the length of the RTA control field. (b) Source address is the address of the transmitter STA. (c) Destination address is the address of the receiver STA. It could also be the address of the receiver STA, AID, or other types of identification information. (d) Packet ID is the identification of the packet. The packets having the same packet ID carry the same RTA traffic in the packets. (e) Notification request is a one bit indication of whether notification is requested by the transmitter STA. When this bit is set to a first state (e.g., logic "1"), the notification is requested after the packet transmission finishes, and the receiver STA sends the notification back to the transmitter STA to report the correctness of the packet transmission; otherwise, the bit is set to a second state (e.g., logic "0"). (f) A field, a one bit field in this example, is called More Retransmission which indicates whether another retransmission is scheduled after this transmission. Setting the bit to a first state (e.g., logic "1") indicates there is a retransmission; otherwise, the bit is set to a second state (e.g., logic "0"). (g) Traffic type indicates the types of traffic could be RTA traffic, no-RTA traffic or other types of traffic. (h) RTA session ID is the identifying information of RTA session, which could use the information as listed in Table 1. (i) Priority value indicates the priority of RTA traffic. (j) Bandwidth requirement indicates the bandwidth required for an RTA transmission. (k) Packet Lifetime indicates the lifetime to the expiration time of this packet. (l) Periodic Time is a periodic time of the RTA traffic generating packet. (m) HARQ type is an indication of the hybrid ARQ (HARQ) type that is used. The HARQ operation can also be disabled by setting this field.

The transmitter STA sends an RTA control field to inform the receiver STA of the RTA packet arrival and its retransmission scheme. There are two methods to exchange the RTA control field information between STAs.

The RTA control field is carried by the PLCP header of the RTA data packet. The RTA control field is transmitted by a trigger frame before transmitting the RTA data packet. The transmitter STA can embed the RTA control field in the PLCP header of the RTA packets. The benefit of using the PLCP header is that of gaining the highest probability of decoding the RTA control field successfully by the receiver STA. This is because the PLCP header has the best resilience to noise and interference during the transmission. By embedding the RTA control field in the PLCP header, the receiver can often still obtain RTA control information even when the MAC frame cannot be decoded successfully.

4.5.2. Single User Data Packet

FIG. 26 illustrates an example embodiment 250 of an HE-SU-RTA packet format for RTA data transmission in single user mode. The fields L-STF, L-LTF, L-SIG, RL-SIG, HE-SIG-A, HE-STF, HE-LTF, PE are identical to the regular HE-SU PPDU format shown in FIG. 4. Bit 14 of the HE-SIG-A1 is reserved and set to a first state (e.g., logic "1") in the regular format. In this case, this bit is set to a second state (e.g., logic "0") to indicate the existence of RTA-SIG field. In single user mode, the RTA-SIG field contains only one RTA control field. The data frame uses the same format as shown in FIG. 2.

4.5.3. Single User Notification Packet

FIG. 27 illustrates an example embodiment 270 of a RTA-ACK/NACK packet frame format for notification in single user mode. This packet format is used as the notification packet in the single user mode to report the correctness of the RTA single user data packet transmission.

The fields L-STF, L-LTF, L-SIG, RL-SIG, HE-SIG-A, HE-STF, HE-LTF, PE are identical to the regular HE-SU PPDU format shown in FIG. 4. (a) A frame Control field indicates the type of frame. (b) A duration field contains NAV information used for CSMA/CA channel access. (c) An RA field contains the address for the recipient of the frame. (d) A NACK (Not-ACKnowledge) indication field is a one bit indication of whether the notification frame is ACK or NACK. Setting the bit to a first state (e.g., logic "1") indicates the notification frame is NACK and the packet is not received correctly; otherwise, the bit is set to a second state (e.g., logic "0") indicating the notification frame is ACK (ACKnowledged).

4.5.4 Multi-User Data Packet

FIG. 28 illustrates an example embodiment 290 of a HE-MU-RTA packet format for transmitting multi-user transmission packets in multi-user downlink mode. The fields L-STF, L-LTF, L-SIG, RL-SIG, HE-SIG-A, HE-SIG-B, HE-STF, HE-LTF, PE are the same as in the regular HE-MU PPDU format shown in FIG. 7. Note that HE-SIG-B field provides the separate resource block allocation information to each user. Bit 7 of the HE-SIG-A2 is reserved and set to a first state (e.g., logic "1") in the regular format. In this case this bit is set to a second state (e.g., logic "0") to indicate the existence of an RTA-SIG field.

In multi-user mode, the RTA-SIG field contains multiple RTA control fields. The number of RTA control field indicates the number of RTA control fields in the RTA-SIG field. The data frame uses the same format as shown in FIG. 2. The data frame carries the RTA traffic and non-RTA traffic for each user.

4.5.5. RTA Announcement Trigger Frame

When gaining channel access to transmit a multi-user transmission packet carrying RTA traffic, one STA can transmit an RTA announcement trigger frame (RTA-TF) to the other STAs before transmitting RTA packets. The RTA-TF contains the RTA control information to inform the STAs of the receiving rule for the following RTA packet transmissions.

FIG. 29 illustrates an example embodiment 310 of an RTA announcement trigger frame (RTA-TF) for RTA data transmission in multi-user mode. The RTA-TF embeds the RTA control field in its MAC frame as shown in the figure. The RTA-TF is able to carry the retransmission schedule for the packet. The RTA-TF can be used for requesting RTA traffic from a specific RTA session. By parsing the RTA session information (e.g., the RTA session ID field in the RTA control field), the receiver STA requests the RTA traffic from a specific RTA session.

The retransmission schedule carried by an RTA-TF is valid only for the RTA packet retransmissions in the same channel access period; so that every time the STA contends and gains channel access for RTA traffic, the RTA-TF is to be re-sent.

Since the retransmission schedule with the RTA control field is transmitted before RTA packet transmission, the RTA packets can use the regular HE-TB packet format as shown in FIG. 8. As explained in Section 4.4.1, the receiver STA regards the packets which are received using the channel resource granted for RTA session as being RTA packets. The fields L-STF, L-LTF, L-SIG, RL-SIG, HE-SIG-A, HE-STF, HE-LTF, PE are identical to the regular HE-TB PPDU format shown in FIG. 8.

The RTA announcement field represents the MAC frame of the packet. The frame control field indicates the type of frame. A duration field contains network allocation vector (NAV) information used for CSMA/CA channel access. An RA field contains the address of a frame recipient. A TA field contains the address of the STA transmitting the frame. The following fields represent the initial transmission schedule for the packet.

The common info field and the user info fields are identical to FIG. 10 and FIG. 11, respectively. These two fields contain separate resource block allocation information. The number of RTA control field indicates the number of RTA control fields following this field. An RTA control field was shown in FIG. 25.

Figures 30, 31:
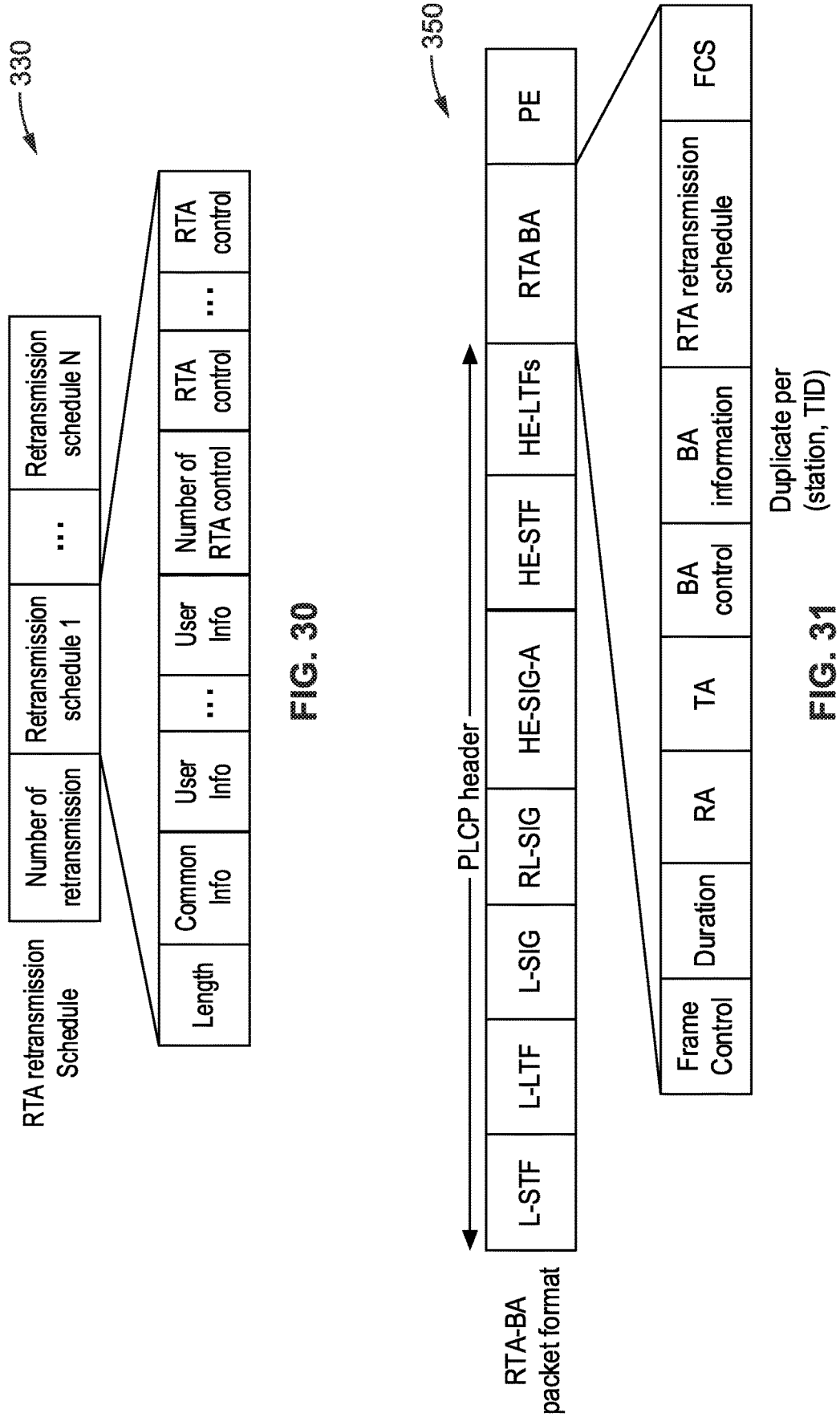
FIG. 30 is a data field diagram of RTA retransmission schedule fields according to at least one embodiment of the present disclosure.
FIG. 31 is a data field diagram of RTA-BA packet format according to at least one embodiment of the present disclosure.

FIG. 30 illustrates an example embodiment 330 of an RTA retransmission schedule field. A number of retransmissions field indicates the number of retransmission schedules included in this field. A retransmission schedule field provides a retransmission schedule for each time. The length value inside the field indicates the length of the schedule field. The common info field and the user info fields are identical to that shown in FIG. 10 and FIG. 11, respectively. The number of RTA control field indicates the number of the RTA control fields following this field. The RTA control field was shown in FIG. 25.

The RTA-TF can indicate whether the RTA packet transmission is from the transmitter or the receiver by parsing the source address field and the destination address field of the RTA control field in the frame. When the receiver sends RTA-TF, only the transmitter needs to transmit packets following the transmission and retransmission schedule in the RTA announcement field. When the transmitter sends the RTA-TF, it waits until it receives the ACK from the receiver, then it transmits the RTA packets following the transmission schedule in the RTA announcement field.

4.5.6. Multi-User Notification Frame

In at least one embodiment the RTA retransmission schedule as shown in FIG. 30 is embedded in a block ACK frame when more retransmissions need to be scheduled after STAs finish the transmission and retransmission schedule in the RTA-TF.

FIG. 31 illustrates an example embodiment 350 of the contents of the RTA block ACK frame (RTA-BA). The fields L-STF, L-LTF, L-SIG, RL-SIG, HE-SIG-A, HE-STF, HE-LTF, PE are identical to the regular HE-TB PPDU format shown in FIG. 8. The RTA BA field represents the MAC frame of the packet. A frame control field indicates the type of the frame. A duration field contains NAV information used for CSMA/CA channel access. An RA field contains the address of the recipient of the frame. A TA field contains addresses of the STA that transmits the frame. A BA control field indicates the policy of the block ACK. A BA information field contains the feedback of the transmission.

4.6. Immediate Retransmission Scheme

In this section, the process of packet transmission and retransmissions is described in scenarios in which RTA traffic and non-RTA traffic coexist and consider both single user and multi-user modes.

4.6.1. Single User Mode 4.6.1.1. Flowchart of RTA Packet Sending in SU Mode

Figure 32A:
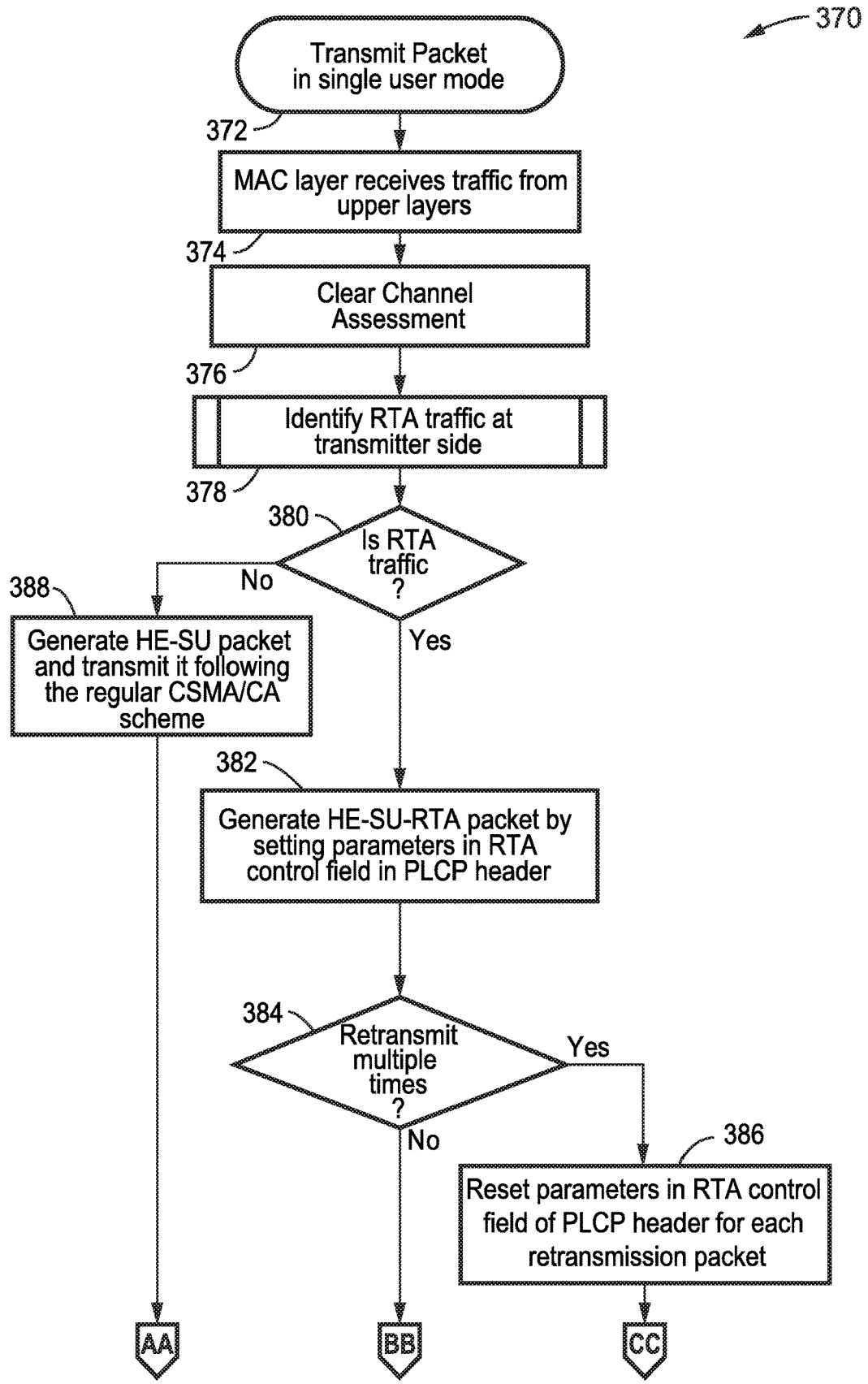
FIG. 32A and FIG. 32B is a flow diagram for transmitting RTA and non-RTA packets in single user mode according to at least one embodiment of the present disclosure.
Figure 32B:
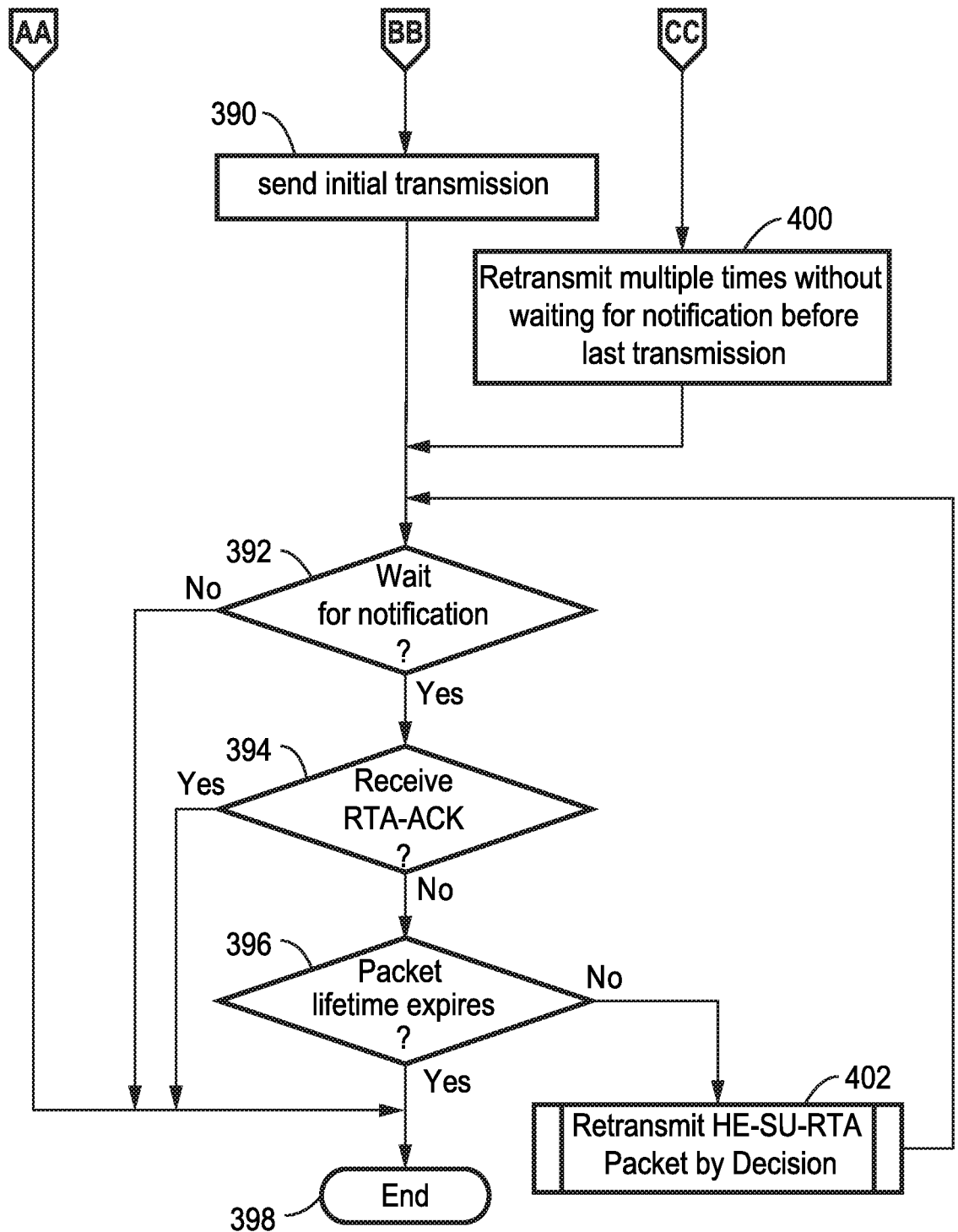

FIG. 32A and FIG. 32B illustrate an example embodiment 370 of the actions that a transmitter STA takes when the immediate retransmission scheme is applied to the STA in single user mode. The process starts 372 for transmitting a packet in single user mode, and then the MAC layer of the STA first waits 374 for traffic arrival from the upper layers. It then runs 376 a clear channel assessment process to gain channel access for packet transmission. Before transmitting the packet, the MAC layer of the transmitter STA identifies 378 whether the traffic is RTA or non-RTA by checking the header information from the upper layers. This process could for example follow the flowchart as shown in FIG. 20. If the header information matches one of the existing RTA session records created by the prior negotiation, this traffic is regarded as RTA traffic. If the header information does not match any existing RTA session, this traffic is regarded as non-RTA traffic.

If the check at block 380 determines that the traffic is non-RTA then execution moves to block 388 and the transmitter STA transmits the packet using regular HE-SU packet format and following a regular CSMA/CA scheme before ending the routine in block 398 in FIG. 32B. If the traffic is RTA, execution moves from block 380 in FIG. 32A to block 382 and the transmitter STA generates an HE-SU-RTA packet to transmit the traffic. When generating the HE-SU-RTA packet, the transmitter STA sets the parameters in the RTA control field of the PLCP header. Then, the transmitter STA determines 384 whether to retransmit that RTA packet multiple times right after the initial transmission.

If the transmitter STA determines to transmit the packet multiple times then execution moves to block 386, it resets the parameters in the RTA control field of the PLCP header for each retransmission so that the receiver STA can know the retransmission schedule, with execution moving to block 400 in FIG. 32B. For instance, the More Retransmission field would be set to "1" and the notification request field would be set to "0" in all the transmissions except the last retransmission, while the more retransmission field of the last retransmission would be set to "0". The notification request field of the last retransmission would be set based on the decision made by the transmitter STA. According to the setting of the RTA control field information in the PLCP header, the transmitter STA in block 400 of FIG. 32B does not wait for any notification from the receiver STA until the last packet retransmission finishes. Otherwise, if it is determined at block 384 of FIG. 32A not to transmit multiple times, then execution moves to block 390 of FIG. 32B with the transmitter STA finishing the initial packet transmission.

In either of the cases of RTA traffic, execution will move from either block 390 or 400 to block 392 in determining whether the transmitter STA will wait for a notification, i.e., RTA-ACK or RTA-NACK, after either multiple transmissions or the initial transmission. This information could be shared between the transmitter and the receiver by setting the notification request field in the last transmission of the HE-SU-RTA packet. If the transmitter STA does not wait for a notification, the transmission of this packet ends and process reaches end 398. Otherwise, the transmitter STA waits for the notification from the receiver STA and moves to block 394 to determine if the transmitter STA receives an RTA-ACK before timeout, If it does receive the RTA-ACK then packet transmission succeeded and execution reaches end 398, with no retransmission being needed. However, if the STA does not receive the ACK, then block 396 is reached which checks the lifetime of the RTA packet. If the packet lifetime expires, then no retransmission is needed, and the packet is dropped with the process ending 398. Otherwise, block 402 is reached with the retransmission scheduled with minimum contention time, after which execution moves back to block 392.

Figure 33:
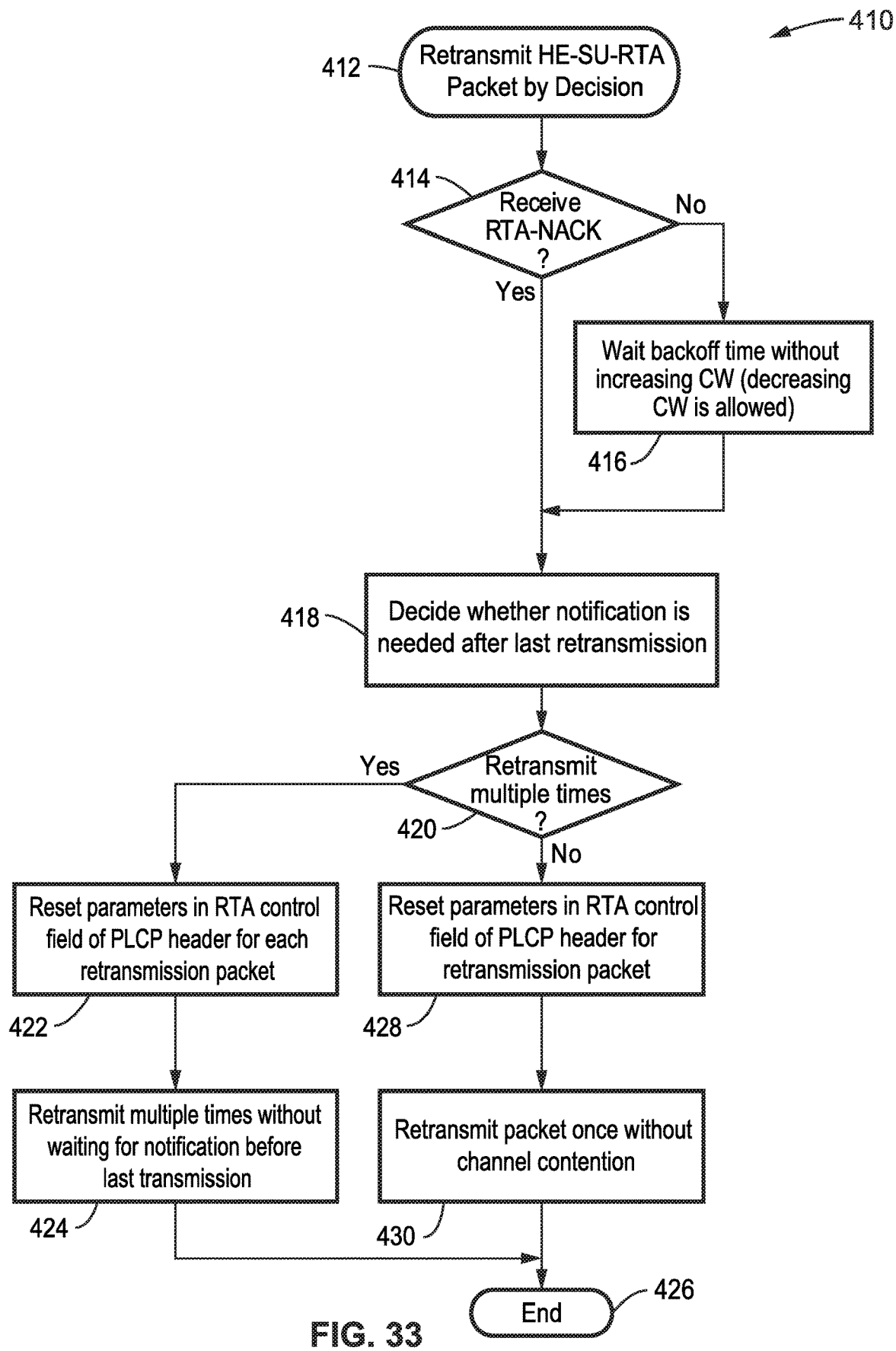
FIG. 33 is a flow diagram for RTA packet retransmission in single user (SU) mode according to at least one embodiment of the present disclosure.

FIG. 33 illustrates an example embodiment 410 for a retransmission scheme for an RTA packet in single user mode. The figure describes the details of how to schedule the retransmissions for RTA packets using the same HE-SU-RTA packet format as shown in block 402 of FIG. 32B. The process starts 412 in FIG. 33 and a check performed 414 on whether an RTA-NACK is received. If the RTA-NACK is not received before timeout then the transmitter STA sets the backoff time for contending for channel access and the contention window (CW) that decides the amount of backoff time is not increased as in the regular CSMA/CA scheme, but is allowed to decrease. The transmitter STA then waits 416 the backoff time according to the contention window size, after which execution reaches block 418. If it is determined at block 414 that an RTA-NACK is received then execution moves directly to block 418 since the transmitter STA keeps occupying the channel, so the transmitter STA retransmits the RTA packet immediately without channel contention.

After gaining channel access, the transmitter STA determines whether notification is required 418 after the last retransmission. This information can be embedded in the PLCP header of the last transmission by setting the notification request field in the RTA control field as was explained in reference to FIG. 25. Then the transmitter STA determines 420 whether to retransmit the packet multiple times or only once. If the transmitter STA decides to retransmit multiple times, execution reaches block 422 and the STA resets the parameters of the RTA control field in the PLCP header for each retransmission packet. Then at block 424 the transmitter STA does not wait for any notification from the receiver STA until the last packet retransmission finishes, with the more retransmission field being set to "1" and the notification request field being set to "0" in all the retransmissions except the last one. The more retransmission field of the last retransmission would be set to "0". The notification request field of the last retransmission would be set based on the decision made in block 418. The process ends at block 426

However, if in block 420 the STA decides to retransmit once, then at block 428 it sets the parameter in the RTA control field of the PLCP header for the retransmission and then it retransmits 430 the packet without channel contention, and the process ends 426. The notification request field of the retransmission would be set based on the decision made at block 418.

Figure 34A:
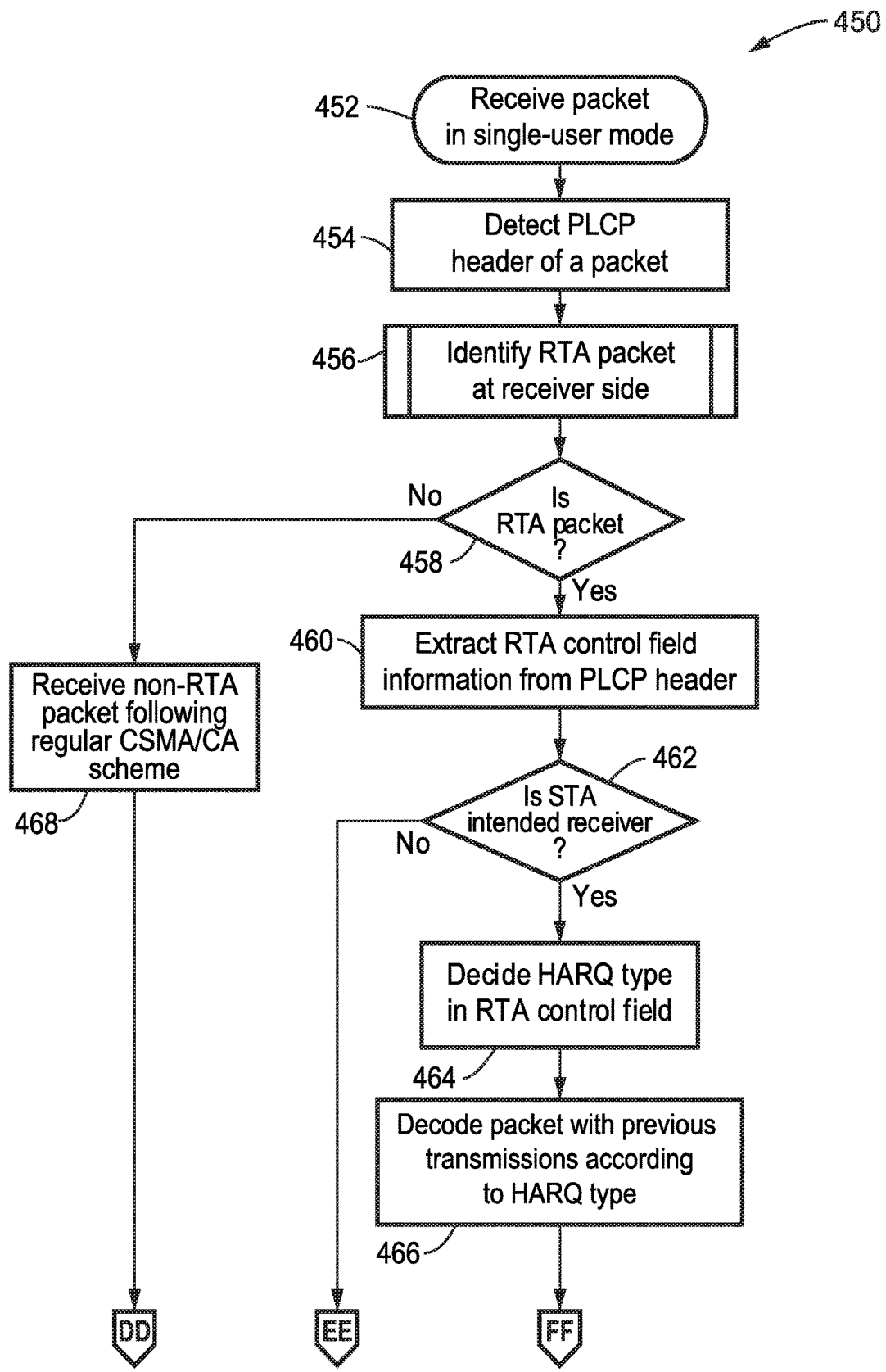
FIG. 34A and FIG. 34B is a flow diagram for receiving RTA and non-RTA packets in single user (SU) mode according to at least one embodiment of the present disclosure.
Figure 34B:
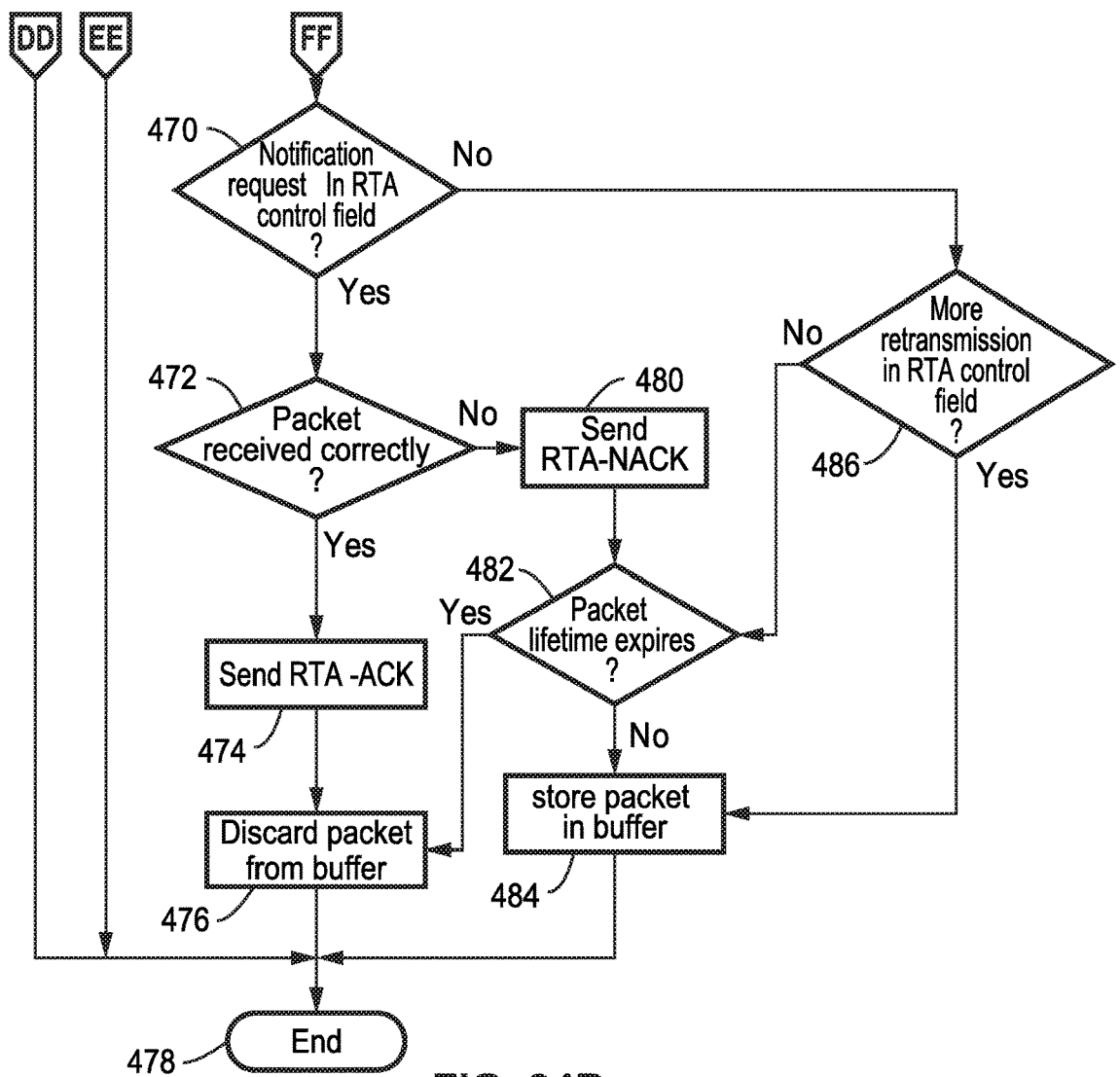

FIG. 34A and FIG. 34B illustrates an example embodiment 450 of a process for receiving RTA and non-RTA packets in single user mode. The figure describes details of how the STA receives a packet in single user mode 452. When a transmitter STA sends an RTA packet, it embeds the RTA control field information in the PLCP header using the HE-SU-RTA packet format as shown in FIG. 26. When the receiver STA receives that packet in single user mode, it first detects 454 in FIG. 34A the PCLP header of the packet at the PHY layer. The receiver STA identifies 456 whether this packet is RTA or non-RTA according to the existence of the RTA control field in its PLCP header; according to the process explained for FIG. 23. If the RTA control field does not exist, then it is determined 458 that the packet is a non-RTA packet with execution reaching block 468 and it is received following the regular CSMA/CA scheme, and execution ends 478 in FIG. 34B.

Otherwise, if the RTA control field exists, the packet is determined to be an RTA packet at block 458 and execution reaches block 460 with the STA extracting information in the RTA control filed from the RTA-SIG field in the PLCP header. According to the source and destination addresses, the STA determines 462 whether it is the intended receiver of the packet. If the STA is not the intended receiver, the process ends 478 in FIG. 34B and it drops the packet.

However, if it is determined at block 462 in FIG. 34A that the receiver STA is the intended receiver, then in block 464 it parses the HARQ type field in the RTA control field to decide which type of HARQ is used for decoding this packet; although HARQ could be disabled at this step. Once the receiver STA knows the type of HARQ, it applies the HARQ to decoding 466 the packet with the previous transmissions of that packet before reaching block 470 in FIG. 34B. The previous transmissions of that packet are stored in the buffer. They have the same packet ID of the current transmission packet.

After decoding the packet, the receiver STA checks 470 in FIG. 34B the notification request field in RTA control field. If the notification request field is found in the RTA control field to be set to "1", then a check 472 is performed on whether the packet was received correctly. If it was received correctly, then at block 474 an RTA-ACK notification is sent back to the transmitter STA and the packet is discarded 476 from the buffer before the process ends 478.

Otherwise, if at block 472 it is determined that the packet was not received correctly, then the receiver STA sends an RTA-NACK 480 and checks 482 packet lifetime. If packet lifetime has expired, then execution moves to block 476 and it discards the packet from the buffer before ending 478. Otherwise, if block 482 determines that the packet lifetime has not expired, then it stores 484 the packet in the buffer for decoding in the future and the process ends.

Returning to block 470, if the notification request field in RTA control field is set to "0", then the receiver STA does not send a notification, and checks 486 the more retransmission field in RTA control field. If it is determined that there are more retransmissions, then it reaches block 484 and stores the packet in the buffer for decoding in the future. Otherwise, if there are no more retransmissions, then execution reaches block 482, as discussed above, which checks packet lifetime to decide whether to discard the packet from the buffer or to store the packet in the buffer.

4.6.1.2. Examples

In this section, multiple examples are provided to explain the process of the retransmission scheme for RTA packets in single user mode. All the examples use the network topology shown in FIG. 17. The RTA packets can utilize the HE-SU-RTA packet format as shown in FIG. 26. The notification packet can use the RTA-ACK/NACK packet format as shown in FIG. 27.

Figure 35:
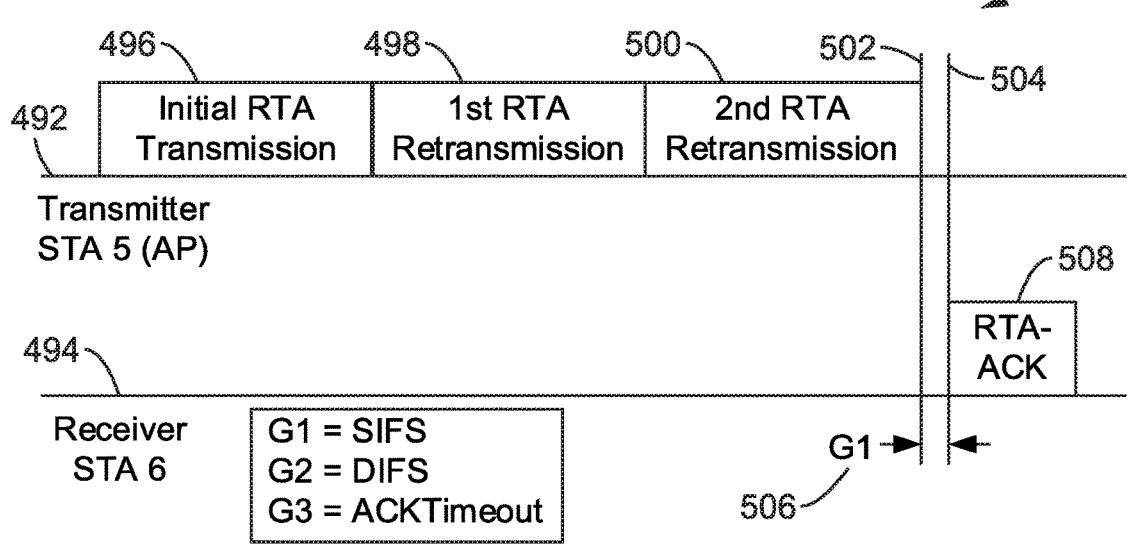
FIG. 35 is a communication sequence diagram showing RTA packet retransmission without contention after initial transmission according to at least one embodiment of the present disclosure.

FIG. 35 illustrates an example embodiment 490 of an RTA retransmission process performed without contention after the initial transmission. Thus, the diagram depicts an immediate retransmission of an RTA packet after the initial transmission is performed in single user mode. The figure depicts the communications between a transmitter 492 as STA5 (AP), and a receiver 494 as STAG.

As shown in 384, 386, 400, 392, and 394 of FIGS. 32A and 32B, this scenario occurs when the STA decides to retransmit the RTA packet multiple times. The transmitter STA resets the parameters of the RTA control field in the PLCP header of each retransmission packet and retransmits them consequently without waiting for notification before the last transmission. The notification is requested after the last packet retransmission and the transmission ends after receiving the RTA-ACK. It should be appreciated that when a STA transmits an RTA packet multiple times consecutively, it is possible to add an interframe space, such as SIFS, between two sequential packet transmissions, such as between an initial RTA transmission and a first RTA retransmission.

The transmitter STA uses the HE-SU-RTA packet format as shown in FIG. 26 to transmit RTA packets. The RTA control field information is embedded in the PLCP header of the RTA packet which controls the retransmission scheme.

In the example of FIG. 35 the initial RTA transmission 496 and first RTA transmissions 498 set the notification request field to "0" and the more retransmission field to "1" in the RTA control field to indicate that more retransmissions follows the current transmission and notification is not requested. The second RTA transmission 500 sets the notification request field to "1" and the more retransmission field to "0" to indicate that no more retransmissions follow and that notification is requested. According to the information of those fields, the receiver STA would not send notification back to the transmitter STA until the end 502 of second RTA transmission 500.

According to the source address and the destination address in the RTA control field, the receiver STA determines whether it is the intended receiver and stores the packet transmission signal in the buffer. It will be noted that those packet transmission signals would be removed from the buffer if the lifetime in the RTA control field expires.

According to the HARQ type field embedded in the RTA control field of the packet PLCP header, the receiver STA can use the received signal of the three packet transmissions with the same packet ID in the RTA control field to decode the packet.

Then, as shown in the example, after a short interframe space (SIFS) G1 506 the receiver STA sends 508 an RTA-ACK frame at time 504 to report the correctness of packet transmission as requested by second RTA transmission 500. If the packet has an error, the receiver STA would send an RTA-NACK frame instead.

FIG. 36 illustrates an example embodiment 510 of an immediate RTA retransmission in single user mode without contention after the initial transmission fails. This example explains how RTA packet retransmissions are scheduled dynamically between a transmitter 512 exemplified as STA5 (AP) and a receiver 514 exemplifies as STAG, according to the notification feedback.

The RTA packet uses the HE-SU-RTA packet format as shown in FIG. 26 to transmit RTA packets. The RTA control field information is embedded in the PLCP header of the RTA packet which controls the retransmission scheme. The initial RTA transmission follows the flowchart as shown in (390, 392, 394, 396, and 402) of FIG. 32A and FIG. 32B.

Referring again to FIG. 36, the transmitter STA sends the initial transmission 516, which ends 518. After delay G1 522 the receiver starts 520 transmitting a notification, but it will be noted that instead of an RTA-ACK the receiver STA transmits an RTA-NACK 523 whose transmission ends 524. The transmitter STA checks the lifetime of the packet. Since the lifetime of the packet is not expired, the transmitter STA after SIFS delay G1 528 starts 526 transmitting a first RTA retransmission 530 of the packet, which completes 532.

Then the transmitter STA uses the retransmission scheme as shown in blocks 414, 418, 420, 428, and 430 of FIG. 33. Referring again to FIG. 36, since the transmitter STA receives the RTA-NACK for the initial RTA transmission from the receiver STA, the channel is kept occupied.

The first transmission ends 532, a G1 delay 536 takes place then receiver transmits 534 another RTA-NACK 537, which ends 538. The RTA-NACK is received by the transmitter showing that this first RTA retransmission also failed as did the initial RTA transmission.

After SIFS delay G1 542, the transmitter STA immediately starts 540 a second RTA retransmission 544. This time, the transmitter STA decides to retransmit multiple times 544, 546 (twice in this example) without waiting for the notification as explained in blocks 418, 420, 422, and 424 of FIG. 33.

Referring again to FIG. 36, after the last RTA retransmission (third retransmission in this example) the transmissions ends 548 if the notification request field in the RTA control field is set to "0" in the 3rd RTA retransmission.

The receiver STA decodes the packet using HARQ whose type is indicated in the PLCP header of the packet. In at least one embodiment the receiver STA stores all the received packet transmissions in the buffer for decoding using the HARQ. Every time the receiver STA receives an RTA packet, it can proceed to decode it in relation to the previous transmissions which are stored in the buffer.

FIG. 37 illustrates an example embodiment 550 of RTA retransmission without increasing the size (duration) of the contention window. The example depicts RTA retransmission when the notification is not received as expected. Communications are depicted between a transmitter 552, exemplified as AP STA5, and a receiver 554 exemplified as STAG. Originally, as shown in FIG. 5 for conventional 802.11, when the transmitter STA contends for channel access to perform the retransmission, the contention window is increased and prolongs the backoff time of channel contention. In this instance the disclosed retransmission scheme the transmitter STA does not increase the contention window since this is an RTA packet retransmission, and in fact the disclosure is configured to allow the contention window to be decreased toward more rapidly gaining channel access.

In the example of FIG. 37, the RTA packets use the HE-SU-RTA packet format as shown in FIG. 26. Referring to FIG. 37, when the transmitter STA sends the initial RTA packet 556, it sets the notification request field to "1" in the PLCP header. Then after transmission ends 558, the transmitter STA would expect a notification from the receiver STA after transmitting the packet.

As shown in blocks 414 and 416 of FIG. 33, the channel contention for RTA packet retransmission occurs when the notification is not received by the transmitter STA while it sets the notification request field to "1" in the PLCP header of the packet.

So in FIG. 37 after time 558 of initial transmission 556, there is no response over the combination period G2 (DIFS) plus G3 (ACKTimeout) 562, which ends 560. Backoff 564 is performed followed by a first RTA retransmission 566, which ends 568. Again there is no response over period G2+G3 572, at the end 570 of which the transmitter immediately performs another backoff 574, and performs a second RTA retransmission 576, that ends 578. Thus, in this example, two retransmissions are scheduled with channel contention. The contention window of the second RTA retransmission can be less or equal to the contention window of the first retransmission. In this example, after G1 (SIFS) delay 582 the receiver starts transmitting 580 an RTA-ACK 584 as it has received second RTA retransmission 576.

The size of the contention window for RTA retransmission can be preset by (predetermined in response to) prior negotiation as shown in Section 4.4.1. Those parameters can also be calculated dynamically according to channel condition, the packet lifetime, and similar condition metrics.

Figure 38:
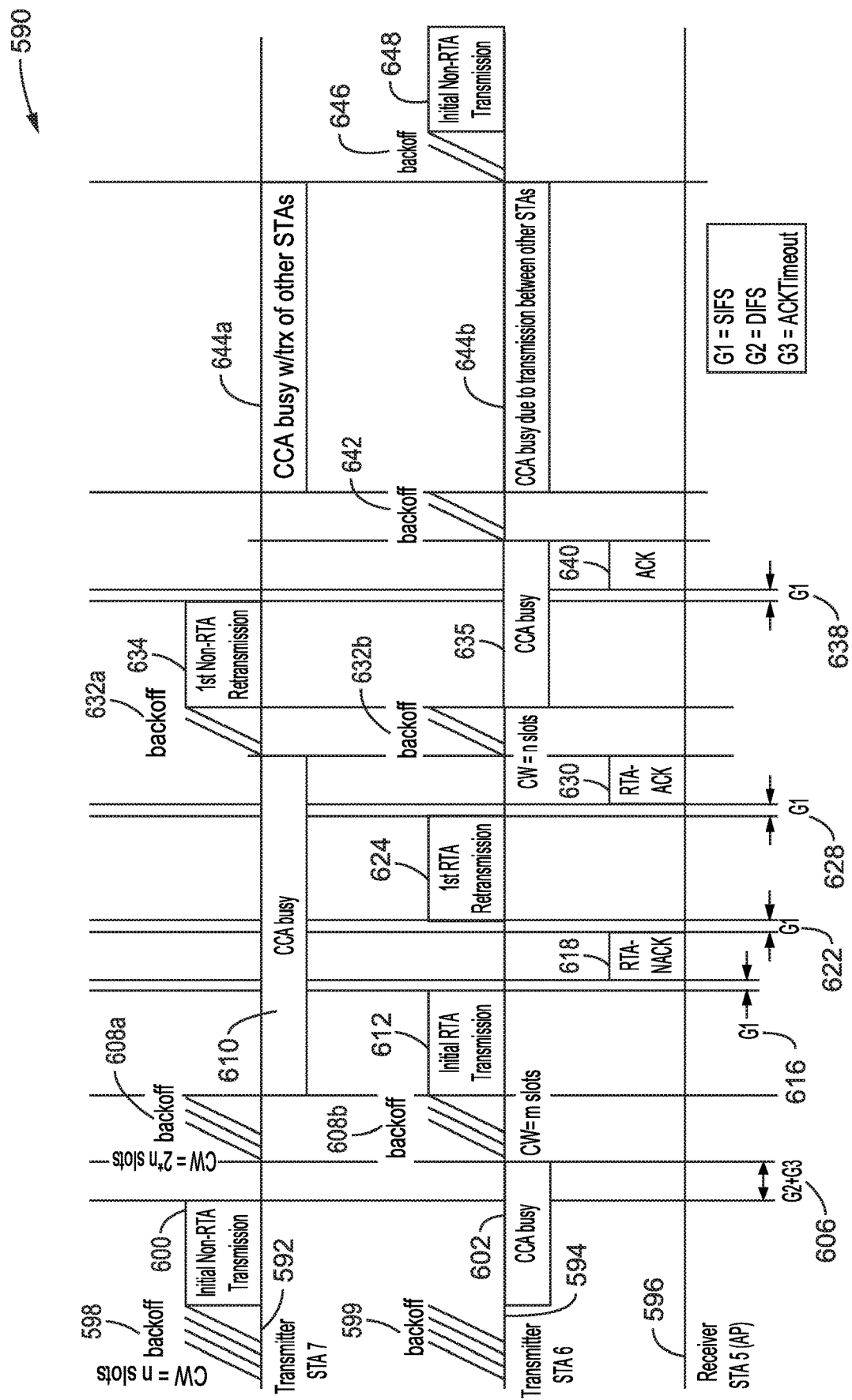
FIG. 38 is a communication sequence diagram for mixed retransmissions in single user (SU) mode according to at least one embodiment of the present disclosure.

FIG. 38 illustrates an example embodiment 590 of a retransmission scheme for mixed traffic in single user mode, when a network has both RTA and non-RTA packets to transmit. This example describes how multiple STAs, exemplified as transmitter STA7 592, transmitter STA6 594 and receiver STA5 596, handles the retransmission schemes for RTA and non-RTA packets.

As explained for blocks 378, 380, 388, and 382 in FIG. 32A and FIG. 32B, the STA distinguishes RTA traffic and non-RTA traffic and generates RTA packets and non-RTA packets, respectively. When the STA transmits an RTA packet, it embeds the RTA control information in its PLCP header using HE-SU-RTA packet format as shown in FIG. 26. The receiver STA also can recognize that the packet is an RTA packet based on the existence of the RTA control field in the received packet.

When the transmitter STA transmits an RTA or non-RTA packet, it contends for the channel. As shown in FIG. 38, transmitter STA 6 594 and STA 7 592 contend for channel access (backoffs seen 598, 599) for the initial transmission of the RTA packet and non-RTA packet, respectively.

When one transmitter STA is transmitting, the other STAs sense the channel state and set CCA busy. In this example, after backoff 598 (CW set to n slots), transmitter STA 7 gains channel access and transmits the initial non-RTA transmission 600, the transmitter STA 6 senses the channel and sets CCA busy 602. The receiver is unresponsive over interval G2+G3 606, with both STA7 and STA6 contending for the channel performing backoffs 608a (CW set to 2×n slots), 608b (CW set to m slots), respectively. Thus, as retransmission is required for non-RTA packet 600, the transmitter STA7 592 re-contends for the channel with its contention window doubled (CW set to 2×n slots). This follows the regular CSMA/CA retransmission scheme.

In this case STA6 obtains the channel, since it has the shorter backoff set based on it attempting to send an RTA packet, and starts an initial RTA transmission 612, then transmitter STA7 senses the channel and sets CCA busy 610. A G1 (SIFS) period 616 is seen, after which an RTA-NACK 618 is transmitted by receiver STA5 (AP) 596. After delay G1 interval 622 transmitter STA6 594 has received RTA-NACK 618 and immediately commences a first RTA retransmission 624 without contention, while transmitter STA7 592 is still in CCA busy state 610. After delay 628 receiver STA5 596 sends RTA-ACK 630, indicating it received the transmission. Thus, when transmitter STA6 594 transmitted RTA packet 612 it followed the immediate retransmission scheme in sending first RTA retransmission 624.

The retransmission scheme switches by packet, so it is seen that after RTA-ACK 630, both STA7 592 and STA6 594 attempt to gain channel access with both attempting to send a non-RTA packet, 634, 648 respectively. So when transmitter STA6 was transmitting an RTA packet, it used the immediate retransmission scheme, however, when it transmits a non-RTA packet, it switches back to use the CSMA/CA scheme. So both STA7 592 and STA6 594 perform backoff 632a, 632b (CW set to n slots) and in this instance STA7 gains access and transmits a first non-RTA retransmission 634, and STA6 sensing channel busy sets CCA busy state 635. After G1 (SIFS) delay 638 receiver STA5 596 sends ACK 640. STA6 594 then starts to contend for the channel with backoff 642, but both STA7 and STA6 sense the channel is now busy due to transmissions from other stations, and both enter CCA busy state 644a, 644b, after which STA6 contends with backoff 646 followed by sending its initial non-RTA transmission 648.

4.6.2. Multi-User Mode

This section describes applying the disclosed technology to multi-user transmissions. It should be appreciated that applying the technology to multi-user transmissions is more complicated than single user transmissions for a number of reasons including the following. Multi-user transmissions support simultaneous transmissions for multiple users on uplink and downlink. One multi-user transmission packet can contain both RTA and non-RTA traffic. The uplink multi-user transmission, e.g., in IEEE 802.11ax, is triggered by the receiver STA (i.e., AP). Accordingly, the disclosed protocol is configured to handle the conditions that arise from the fact that the channel bandwidth allocation is flexible and adjusted dynamically.

The disclosed technology includes the following features to be compliant with multi-user transmission and leverages the benefits of multi-user transmission. The retransmission scheme is chosen by the traffic types (e.g., RTA or non-RTA) carried by the multi-user retransmission packet. This decision is made based on the feedback from the notification.

A multi-user transmission packet is able to carry both RTA and non-RTA traffic for multiple users. The multi-user transmission packet is an RTA packet when it carries RTA traffic. The non-RTA traffic carried by an RTA multi-user transmission packet also follows the immediate retransmission scheme. When retransmitting multi-user transmission packets, the AP is able to reassign separate resource blocks to gain more diversity effect. The disclosed technology can be applied to any types of multi-user transmissions, including OFDMA and MIMO.

4.6.2.1. Multi-User Downlink Mode

In a multi-user downlink scenario, the AP is the transmitter and the STAs associated with that AP are the receivers.

4.6.2.1.1. Flowchart of Transmitting Packets in MU Downlink Mode

Figure 39A:
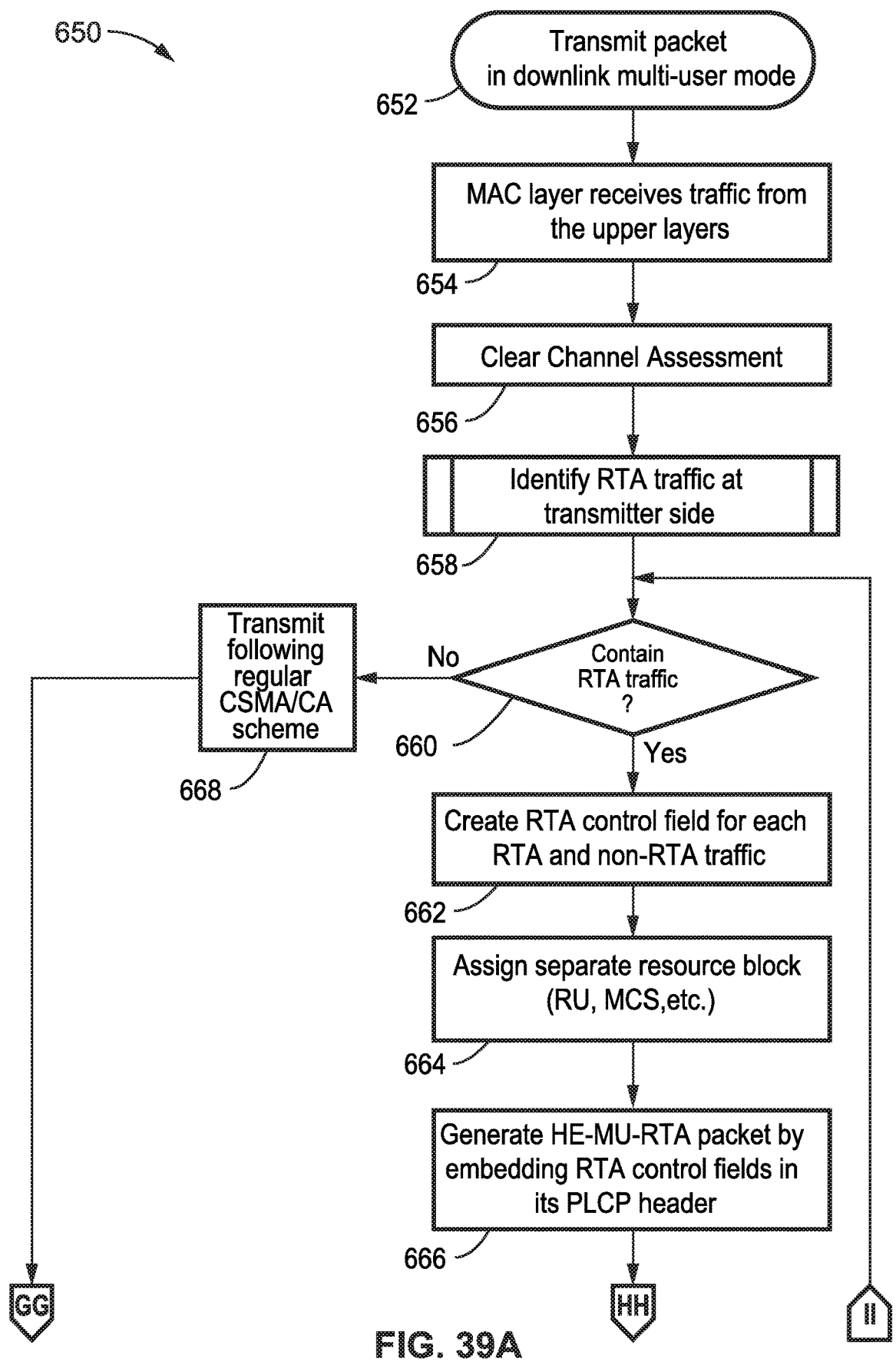
FIG. 39A and FIG. 39B is a flow diagram for transmitting RTA and non-RTA packets in multi-user (MU) downlink mode according to at least one embodiment of the present disclosure.
Figure 39B:
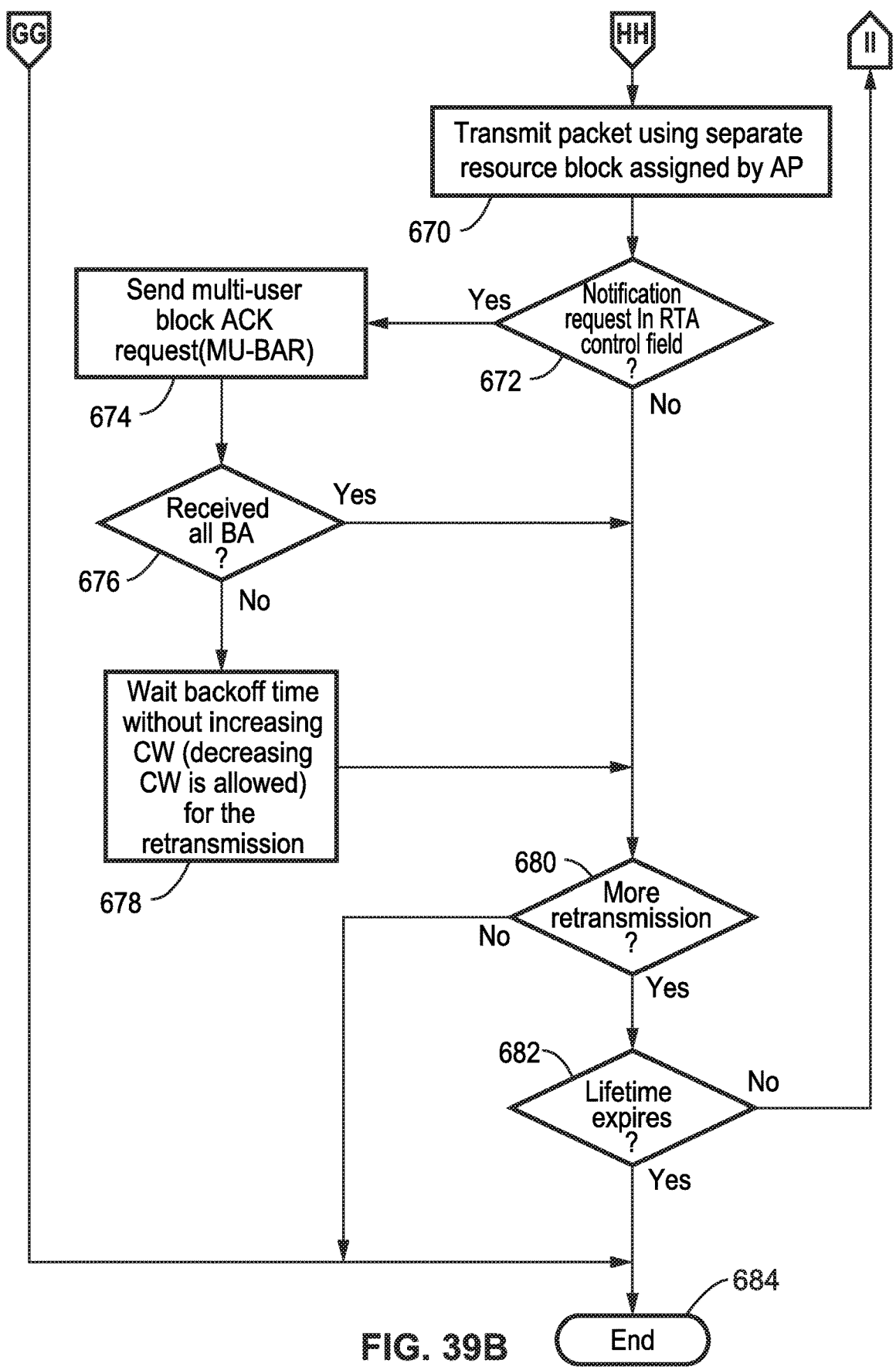

FIG. 39A and FIG. 39B illustrates an example embodiment 650 for transmitting RTA and non-RTA packets in MU downlink mode and explains the details of actions that a transmitter STA takes when the immediate retransmission scheme is applied to multi-user downlink transmissions.

When the AP intends to transmit packets in multi-user downlink mode 652 in FIG. 39A, its MAC layer first receives 654 the traffic from the upper layers. The AP then performs (runs) a clear channel assessment (CCA) 656 to gain channel access for its transmission. The MAC layer of the AP can identify 658 the RTA traffic and non-RTA traffic by comparing the header information from the upper layers with the RTA session records created by the prior negotiation, (as was described in FIG. 20). A decision is made 660 by the AP whether the upcoming packets will contain RTA traffic in the upcoming multi-user transmission.

If the upcoming multi-user transmission carries only non-RTA traffic, then execution moves to block 668 and the AP uses the regular CSMA/CA scheme for packet transmission and retransmission and the process ends 684 in FIG. 39B.

If it is determined at block 660 in FIG. 39A that some of the traffic in the upcoming multi-user transmission is RTA, then execution moves to block 662 with the STA creating the RTA control field for each RTA and non-RTA element of the traffic. When the AP creates the RTA control field for non-RTA traffic, it indicates that it is non-RTA in the traffic type field of the RTA control field. Next, the AP assigns 664 a separate resource block, such as Resource Unit (RU), Modulation and Coding Scheme (MCS), and so forth, to each traffic in the upcoming multi-user transmission. Then, the AP generates 666 a multi-user transmission packet using the HE-MU-RTA packet format (shown in FIG. 28). The RTA control fields and the separate resource block allocation information are embedded in the PCLP header of the HE-MU-RTA packet. The data frame of the packet can be encoded using HARQ.

The AP uses the allocated resource block in the PLCP header of the HE-MU-RTA packet to transmit the packet 670 in FIG. 39B in multi-user mode. Each RTA and non-RTA packet is carried by the data frame field in the HE-MU-RTA packet and transmitted using the allocated separate resource block.

In at least one embodiment, after the AP finishes transmitting the multi-user transmission packet, it can wait 672 for the notification according to the notification request field in the RTA control field of the packet. If a notification request is performed, such as by setting the notification request field to "1", then the AP expects to receive the notification (e.g., BA) from the receivers and execution reaches block 674 in which the AP sends a MU-BAR for the notification request from the receivers.

If the AP is waiting 676 for a notification (e.g., BA) but does not receive it before timeout, then execution reaches block 678 where it retransmits the packets by contending for channel access. In this case, the contention window does not increase, but is allowed to decrease.

If the AP receives the notification as determined at block 676, it checks 680 whether retransmission is needed. The retransmission is needed when the more retransmission field in the RTA control is set to "1" or the BA reports that the packet is not received correctly. If retransmissions are not needed, then the process ends 684. Otherwise, if retransmission is needed, a check is made 682 on the lifetime of the traffic carried by the packet. If the lifetime has expired then the RTA traffic is dropped with the process ending 684. Otherwise, for traffic whose lifetime has not expired, rescheduling is performed for retransmission, depicted with execution moving back to block 660 in FIG. 39A. The non-RTA traffic will be included in the retransmission if the number of its retransmissions does not exceed the retry limit. At block 660 the AP checks whether the retransmission carries the RTA traffic, and another multi-user transmission will be scheduled and so on.

Figure 40A:
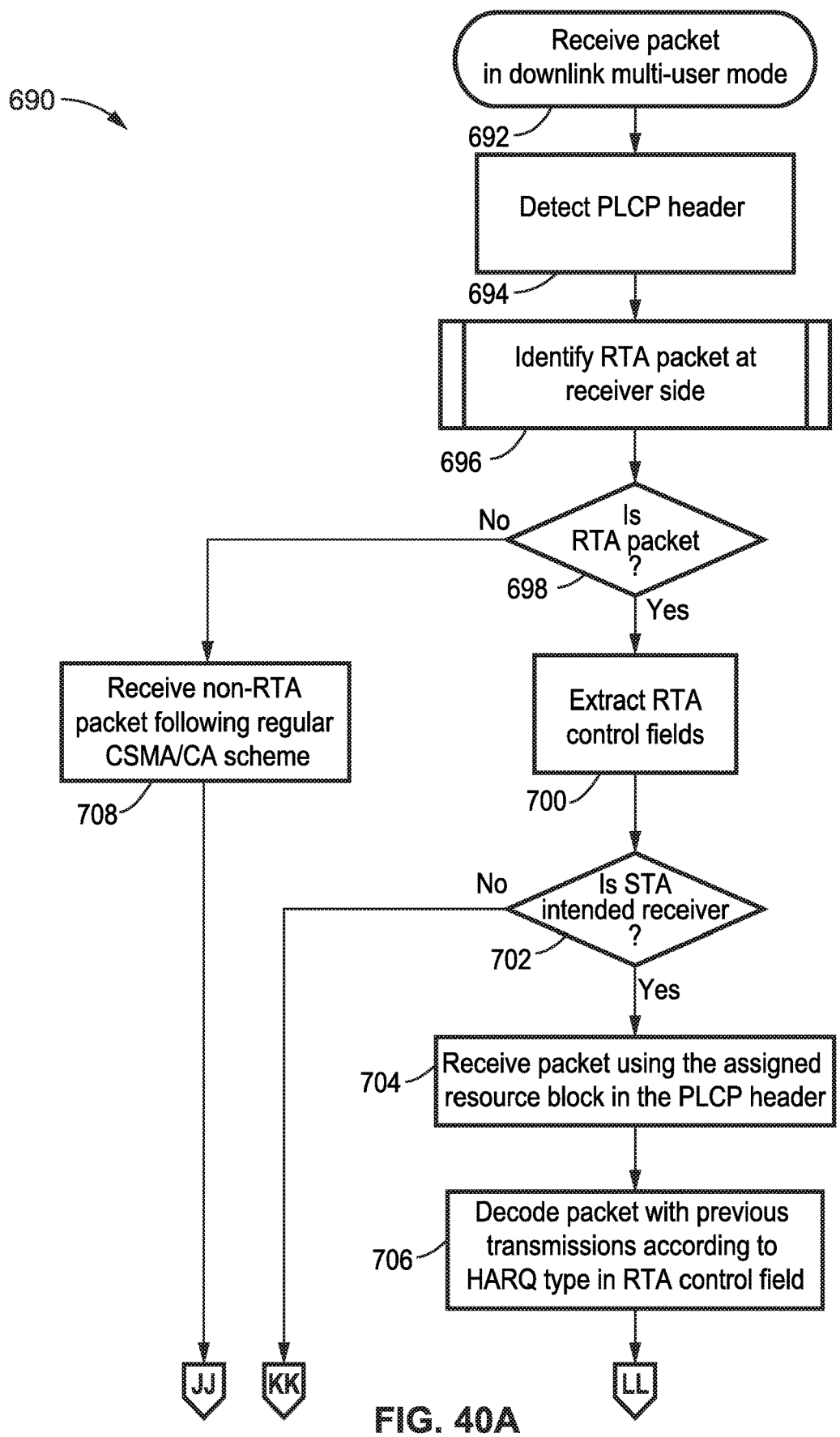
FIG. 40A and FIG. 40B is a flow diagram for receiving RTA and non-RTA packets in multi-user (MU) downlink mode according to at least one embodiment of the present disclosure.
Figure 40B:
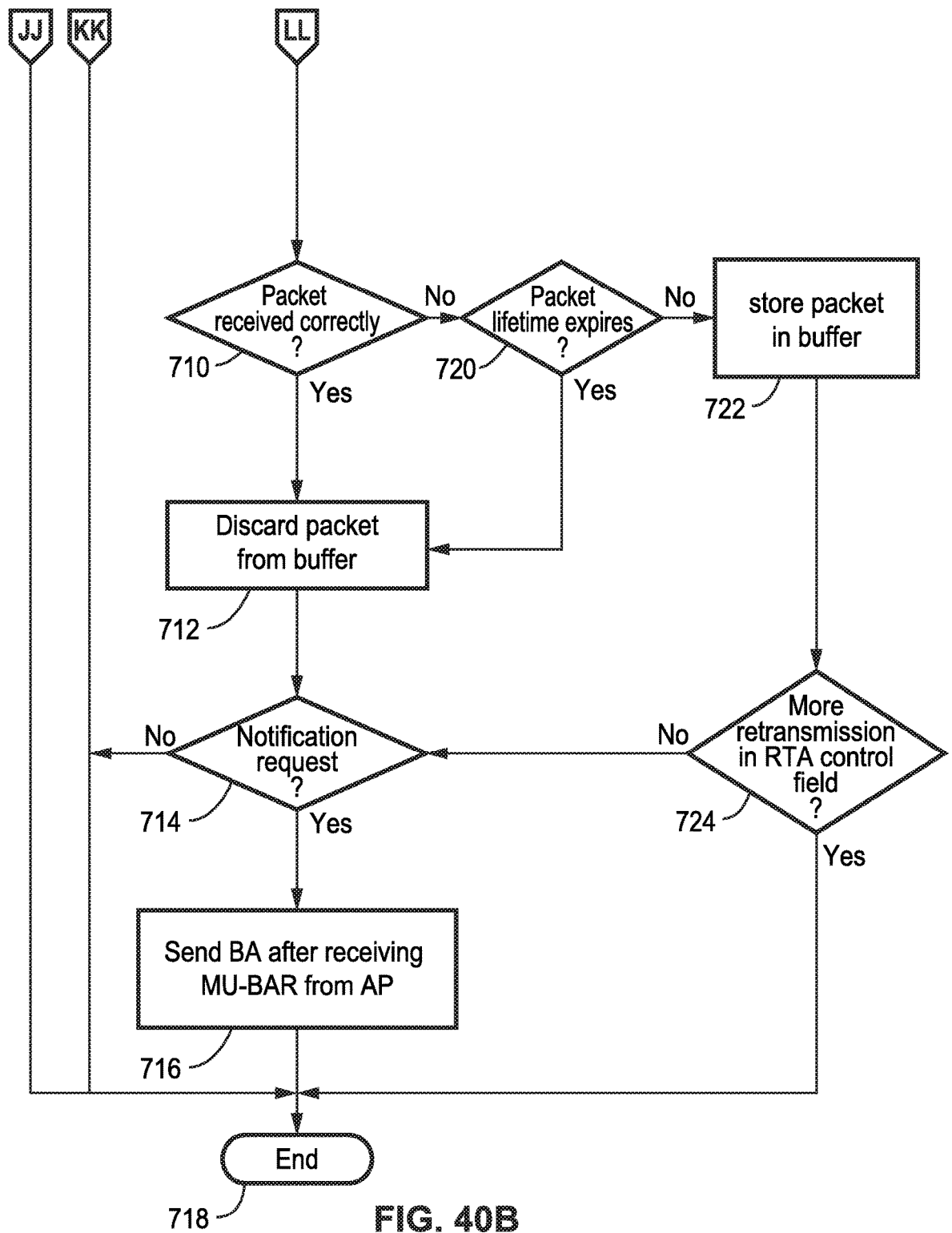

FIG. 40A and FIG. 40B illustrates an example embodiment 690 for receiving RTA and non-RTA packet in MU downlink mode, which describes the details of how the STA receives RTA and non-RTA packets in multi-user downlink mode. When the receiver STA receives a packet in multi-user downlink mode 692, it first detects 694 the PLCP header of the packet at the PHY layer. The receiver STA parses the PLCP header and determines 696 whether the RTA control fields are included in the PLCP header. Then, a check 698 is made at the receiver STA whether the packet is RTA or non-RTA (described in regard to FIG. 23).

If the RTA control fields are not in the PLCP header, then the multi-user packet does not contain RTA traffic and execution moves to block 708, with the receiver STA configured to receive the packet following the regular CSMA/CA scheme and execution ends 718 in FIG. 40B.

Otherwise, if RTA control fields are detected in the PLCP header, then the multi-user packet has been determined 698 to contain RTA traffic and the receiver STA parses 700 the RTA control fields and finds any RTA control fields belonging to it. In response to a comparison with the source and destination addresses, the STA determines 702 whether an RTA control field belongs to it and whether it is the intended receiver of the packet. If no RTA control field belongs to the receiver STA, then the receiver STA is not the intended receiver and it drops the packet, with the process ending 718 in FIG. 40B.

Otherwise if at least one RTA control field belongs to the receiver STA, then the receiver STA is the intended receiver and execution reaches block 704. All the RTA control information is then extracted from this RTA control field. It continues to receive 704 the packet using the separate resource block allocated in the PLCP header. Once the receiver STA receives the whole packet, it decodes 706 the packet with its previous transmissions (if they exist in the buffer) according to the HARQ type field in the RTA control field. The HARQ can also be disabled according to the information in the HARQ type field.

Execution reaches decision block 710 in FIG. 40B with a determination made if the packet is received with no error. If received without errors, then the receiver STA discards 712 all the received signals of that packet from the buffer since the HARQ decoding is no longer needed. Then, the receiver STA checks 714 the notification request field in the RTA control field.

Otherwise, if at decision block 710 it was found that the packet was received with error, then the receiver STA checks 720 the packet lifetime. If the packet lifetime is expired, then execution moves to block 712 with the current received packet transmission being discarded from the buffer as well as any previous transmissions of that packet. Otherwise, if the packet lifetime is not expired, then execution reaches block 722 and the station stores the received signal of the current packet transmission in the buffer and checks 724 the more retransmission field in the RTA control field. If there are to be more retransmissions, then the current transmission ends 718 and the receiver STA should be ready for receiving the next transmission of this packet.

However, if at block 724 it is determined that there are no more retransmissions following, then at block 714 the receiver STA checks the notification request field in the RTA control field. If the indication bit of that field is set to "0", then the notification is not requested, and the process ends 718. Otherwise, the receiver STA send a block ACK (BA) 716 after receiving MU-BAR from the AP and the process ends 718.

4.6.2.1.2. Multiple Examples of Mixed RTA and non-RTA Traffic

This section illustrates three examples of mixed RTA and non-RTA traffic transmissions using multi-user downlink OFDMA. In these examples, one multi-user transmission packet contains both RTA traffic and non-RTA traffic. However, the retransmission schedule can be different based on the RTA control field information in the multi-user transmission packet.

All these examples are based on the example network topology depicted by way of example and not limitation in FIG. 17. The multi-user transmission packet that contains RTA traffic can utilize the HE-MU-RTA packet format as shown in FIG. 28. The multi-user transmission packet that only contains non-RTA traffic can utilize the regular HE-MU packet format as shown in FIG. 7, while all the other packets can use the regular packet format.

Figure 41:
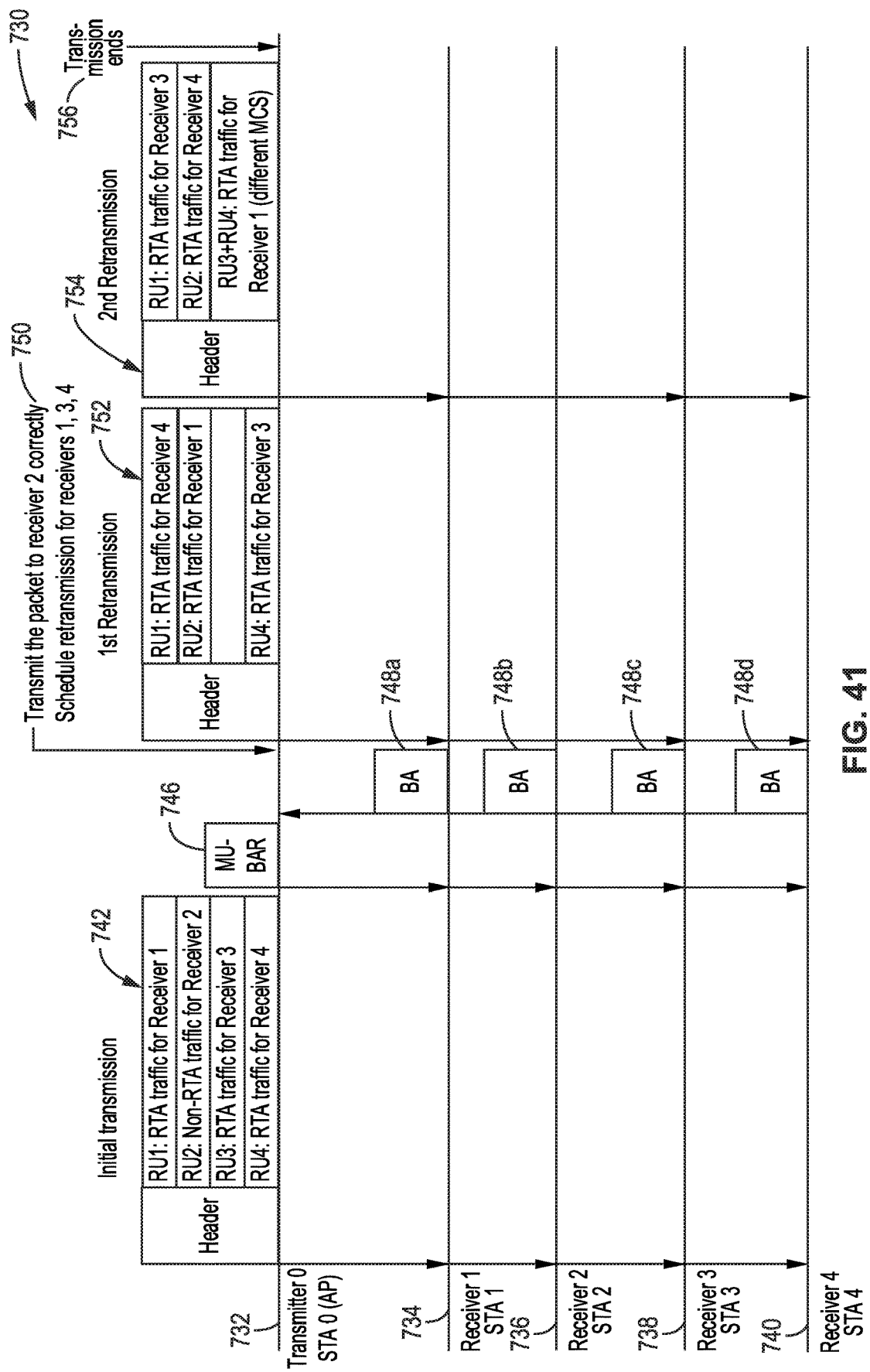
FIG. 41 is a communication sequence diagram for RTA packet retransmissions in multi-user (MU) downlink OFDMA according to at least one embodiment of the present disclosure.

FIG. 41 illustrates an example embodiment 730 of a retransmission scheme for RTA packet in MU downlink OFDMA, demonstrating that the immediate retransmission scheme is applied when retransmission of the packet is required for the RTA traffic in multi-user downlink mode. The figure depicts communications between a first transmitter STA0 (AP) 732, receiver STA1 734, receiver STA2 736, receiver STA3 738, and receiver STA4 740.

The initial transmission 742 is transmitted by AP 732 to its STAs (non-AP), including the stations shown in the figure. This process follows the logic of the flowchart in FIG. 39A and FIG. 39B. The multi-user transmission packet can use HE-MU-RTA packet format shown as in FIG. 28. The PLCP header of the HE-MU-RTA packet contains the separate resource block allocation information and the RTA control field information.

As shown in the figure of the initial transmission 742, the resource units (RUs) 1, 3, 4 are being utilized for transmitting RTA traffic and RU 2 is used for transmitting non-RTA traffic. The receiver STAs detect the RTA control fields in the PLCP header of the HE-MU-RTA packet. Then, the receiver STAs receiving the traffic use the allocated resource blocks indicated in the PLCP header and decode them following the HARQ type in the RTA control field. After finishing the HE-MU-RTA packet transmission, the AP transmits the multi-user BAR 746 and the receiver STAs send BA 748*a*, 748*b*, 748*c* and 748*d* respectively, to report the correctness of the initial transmission. From these Block Acknowledgments (BAs) STA0 732 determines 750 that the packet to STA2 was correctly received, while retransmission must be scheduled for receiver 1, 3 and 4.

As explained in regard to block 680 of FIG. 39B, according to the BA received from the receivers, the AP recognizes that the RTA packets for receivers 1, 3, and 4 need to be retransmitted. Referring again to FIG. 41, the AP of STA0 732 checks the lifetime of the packet for each RTA traffic, and retransmits the packet immediately without channel contention. In this instance the transmitter AP retransmits twice without waiting for the notification. This follows the logic of flowchart blocks 672, 680, and 682 in FIG. 39B by setting the more retransmission field in the RTA control field to "1" in the first retransmission 752 seen in FIG. 41 and "0" in the second retransmission 754 before transmission ends 756. The notification fields in the two retransmissions are set to "0" so that there is no MU-BAR and BA exchange between the AP and the receiver STAs.

For each retransmission, the transmitter AP assigns separate resource blocks to gain more diversity. Each retransmission assigns different RUs to the users. Also, as shown in the second retransmission, the MCS can be adjusted during the retransmission. The first retransmission is shown with RU1 containing RTA traffic for Receiver 4, RU2 with RTA traffic for Receiver 1 and RU4 with RTA traffic for Receiver 3. The second retransmission is exemplified with RU1 containing RTA traffic for Receiver 3, RU2 with RTA traffic for Receiver 4 and RU3 and RU4 with RTA traffic for Receiver 1 with a different MCS.

Figure 42:
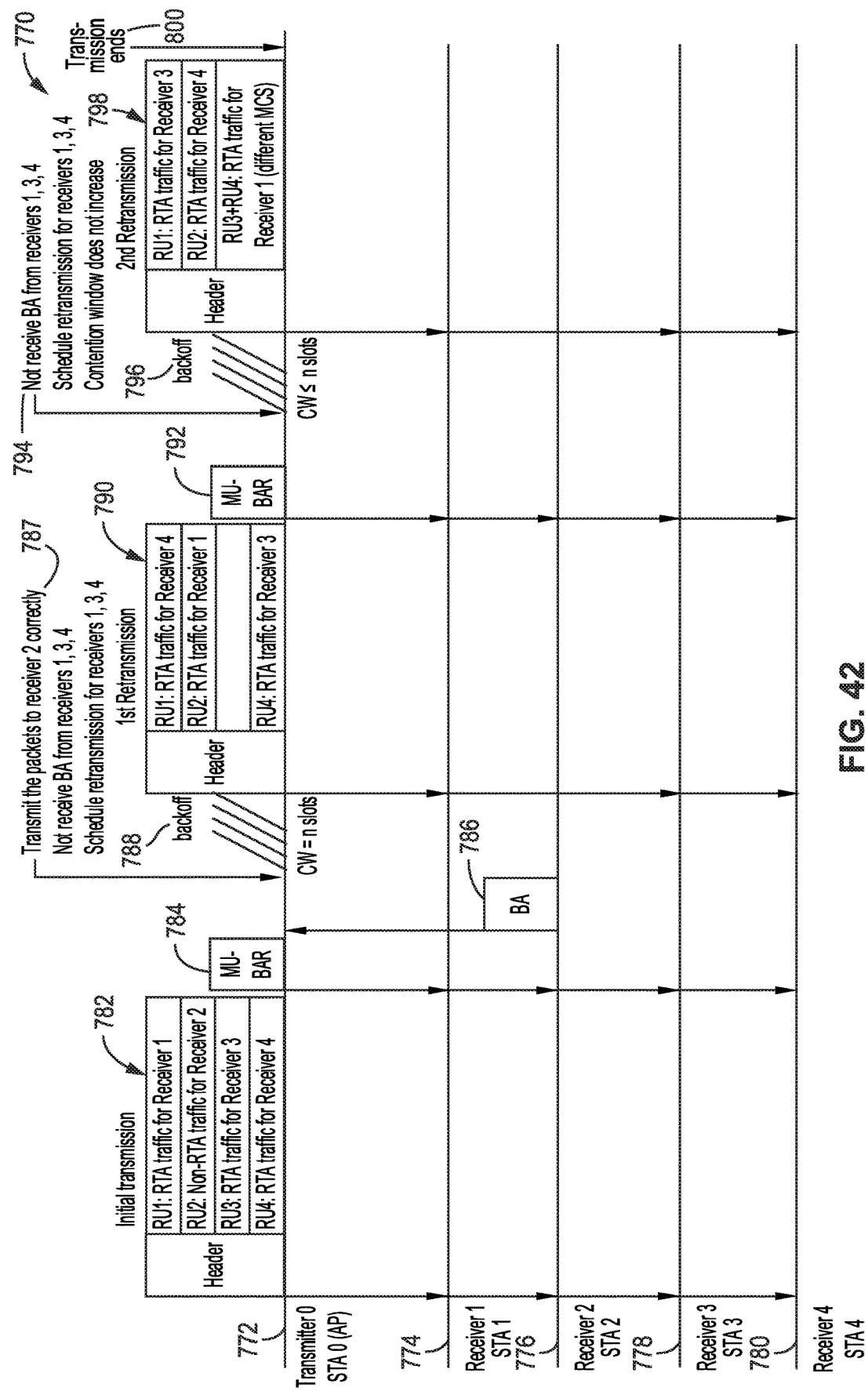
FIG. 42 is a communication sequence diagram for MU-BAR failing in multi-user (MU) downlink OFDMA according to at least one embodiment of the present disclosure.

FIG. 42 illustrates an example embodiment 770 of handling MU-BAR failures in downlink multi-user OFDMA, demonstrating that the AP has to re-contend for the channel to perform RTA packet retransmissions when the exchange of MU-BAR and BA between the AP and the receiver STAs fail in multi-user downlink mode. Similar to the previous figure, FIG. 42 depicts communications between a first transmitter STA0 (AP) 772, receiver STA1 774, receiver STA2 776, receiver STA3 778, and receiver STA4 780.

The initial transmission 782 is transmitted by the AP STA0 772 to its STAs (non-AP). This process follows the logic of flowchart blocks 672, 674, 676, and 678 in FIG. 39B. The AP transmits the multi-user transmission packet using HE-MU-RTA packet format shown as in FIG. 28. The PLCP header of the HE-MU-RTA packet contains the channel resource block allocation and RTA control field information. As shown by way of example and not limitation in previous FIG. 41, the RUs 1, 3, 4 are shown used for transmitting RTA traffic and RU 2 is used for transmitting non-RTA traffic. The receivers detect the RTA control fields in the PLCP header of the HE-MU-RTA packet, receive the packet use the allocated resource blocks indicated in the PLCP header, and decode them following the HARQ type in the RTA control field. After finishing the HE-MU-RTA packet transmission, the AP transmits the MU-BAR 784 in FIG. 42, but only receives the BA 786 from Receiver 2 778.

After awaiting for the BAs, STA0 determines 787 that BAs were not received from receivers 1, 3 and 4, while according to the BA received from receiver 2 its non-RTA traffic is transmitted correctly but the other RTA traffic was not. In response, the AP needs to schedule retransmission for the RTA traffic. According to the description of block 676 in FIG. 39B, the AP in the FIG. 42 example must again contend (re-contend) for channel access by waiting a backoff time 788 with CW set for n slots, and accesses the channel for a first retransmission 790 followed by MU-BAR 792.

After finishing the first retransmission, STA0 determines 794 that the same communication failures occurred as in the initial transmission. This time, the contention window for the backoff time does not increase, although it is allowed to reduce the contention window for RTA packet retransmission. STA0 772 contends for the channel with a backoff 796 in which CW is equal to or less than n and accesses the channel to send the second retransmission 798. The transmission ends 800 after this second retransmission since the notification is not requested and no more retransmissions are scheduled.

Figure 43:
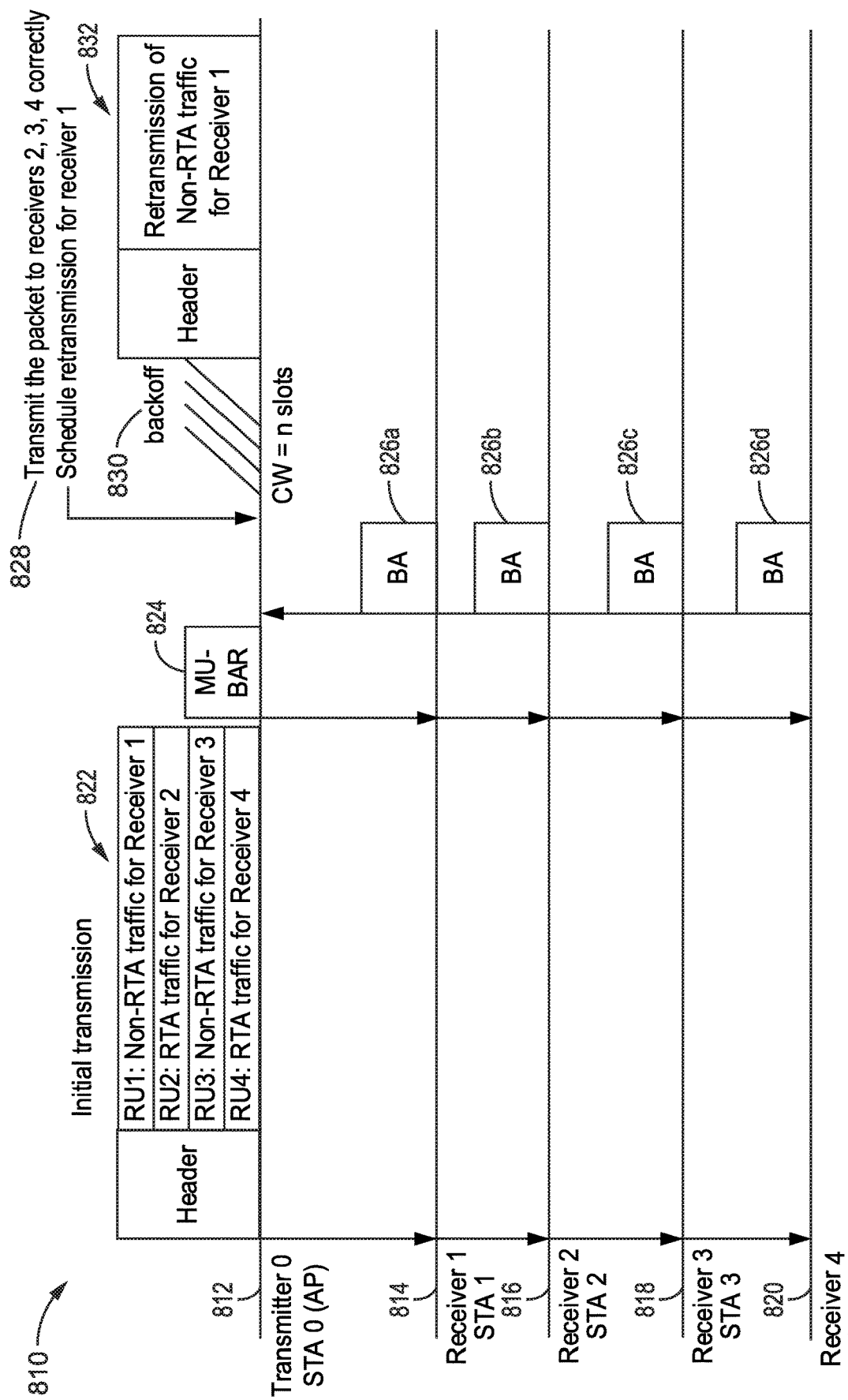
FIG. 43 is a communication sequence diagram for no immediate retransmission for non-RTA packets in multi-user (MU) downlink OFDMA according to at least one embodiment of the present disclosure.

FIG. 43 illustrates an example embodiment 810 of no immediate retransmission for non-RTA packet in MU downlink OFDMA. Similar to the previous figure, FIG. 43 depicts communications between a first transmitter STA0 (AP) 812, receiver STA1 814, receiver STA2 816, receiver STA3 818, and receiver STA4 820.

This figure demonstrates an example where the retransmission only contains non-RTA traffic. This scenario is described in blocks 660, 668 of FIG. 39A. Referring back to FIG. 43, the initial transmission 822 is transmitted by AP 812 to its STAs (non-AP), followed by an MU-BAR 824. As shown in the figure, the RUs 1, 3 are utilized for transmitting 822 non-RTA traffic and RUs 2, 4 are utilized for transmitting RTA traffic. According to the notifications coming back (i.e., BA) 826*a*, 826*b*, 826*c* and 826*d*, from the receivers, the AP recognizes 828 that all RTA traffic was received successfully. The non-RTA traffic for receiver 1, however, requires retransmission. According to block 668 in FIG. 39A, the AP in the example of FIG. 43 switches to use the CSMA/CA scheme and again contends for the channel with backoff time 830 and upon channel access proceeds into retransmitting 832 the non-RTA traffic for receiver 1 814.

4.6.2.2. Multi-User Uplink Mode

In multi-user uplink mode, the AP can receive packets from multiple STAs simultaneously. Specifically, the AP as the receiver in the uplink launches the transmission between the STAs and the AP by sending a trigger frame to all the transmitter STAs. The transmitter STAs transmit a packet after receiving the trigger frame.

4.6.2.2.1. Flowchart of Packet in MU Uplink Mode

Figure 44A:
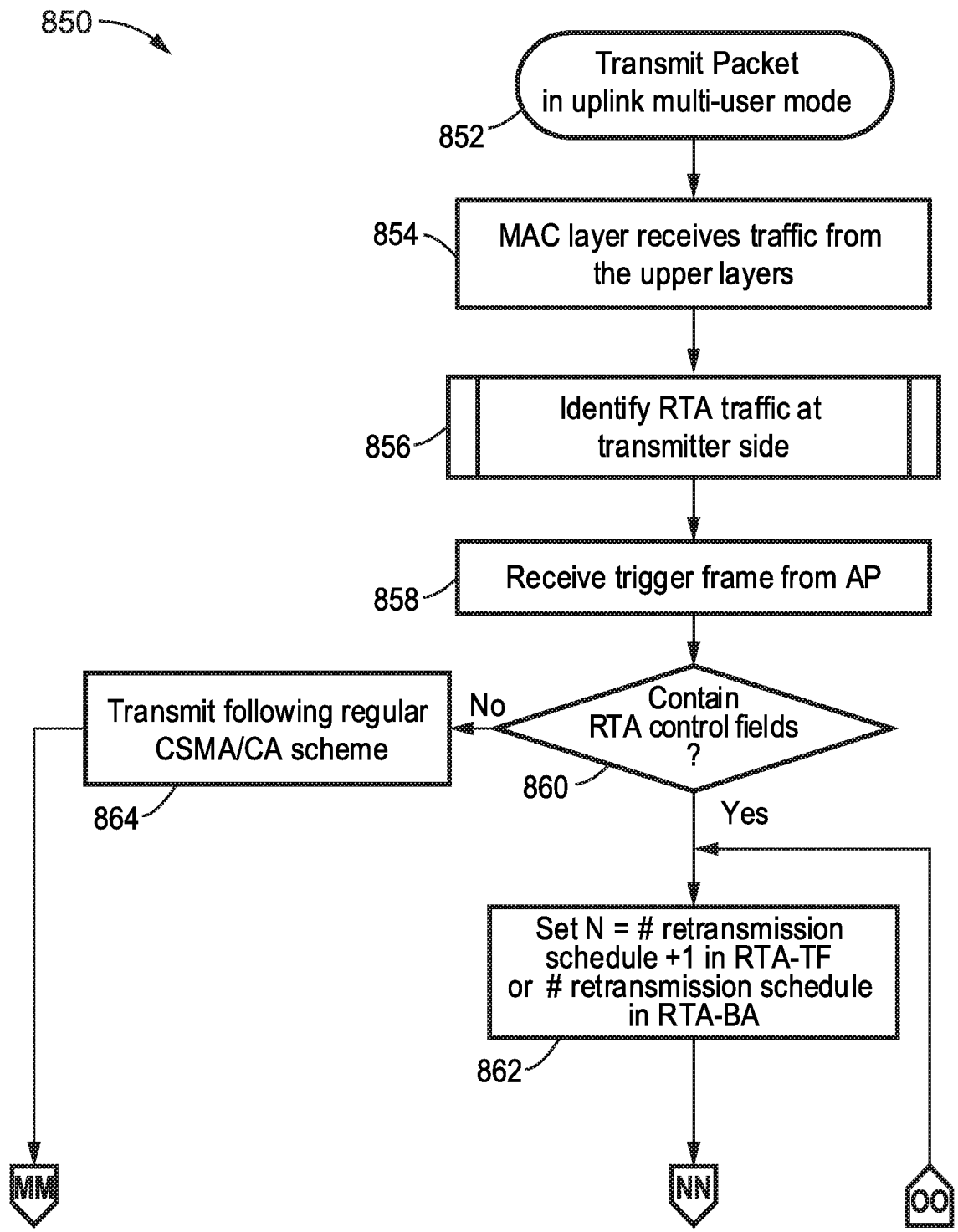
FIG. 44A and FIG. 44B is a flow diagram for transmitting RTA and non-RTA packets in multi-user (MU) uplink mode according to at least one embodiment of the present disclosure.
Figure 44B:
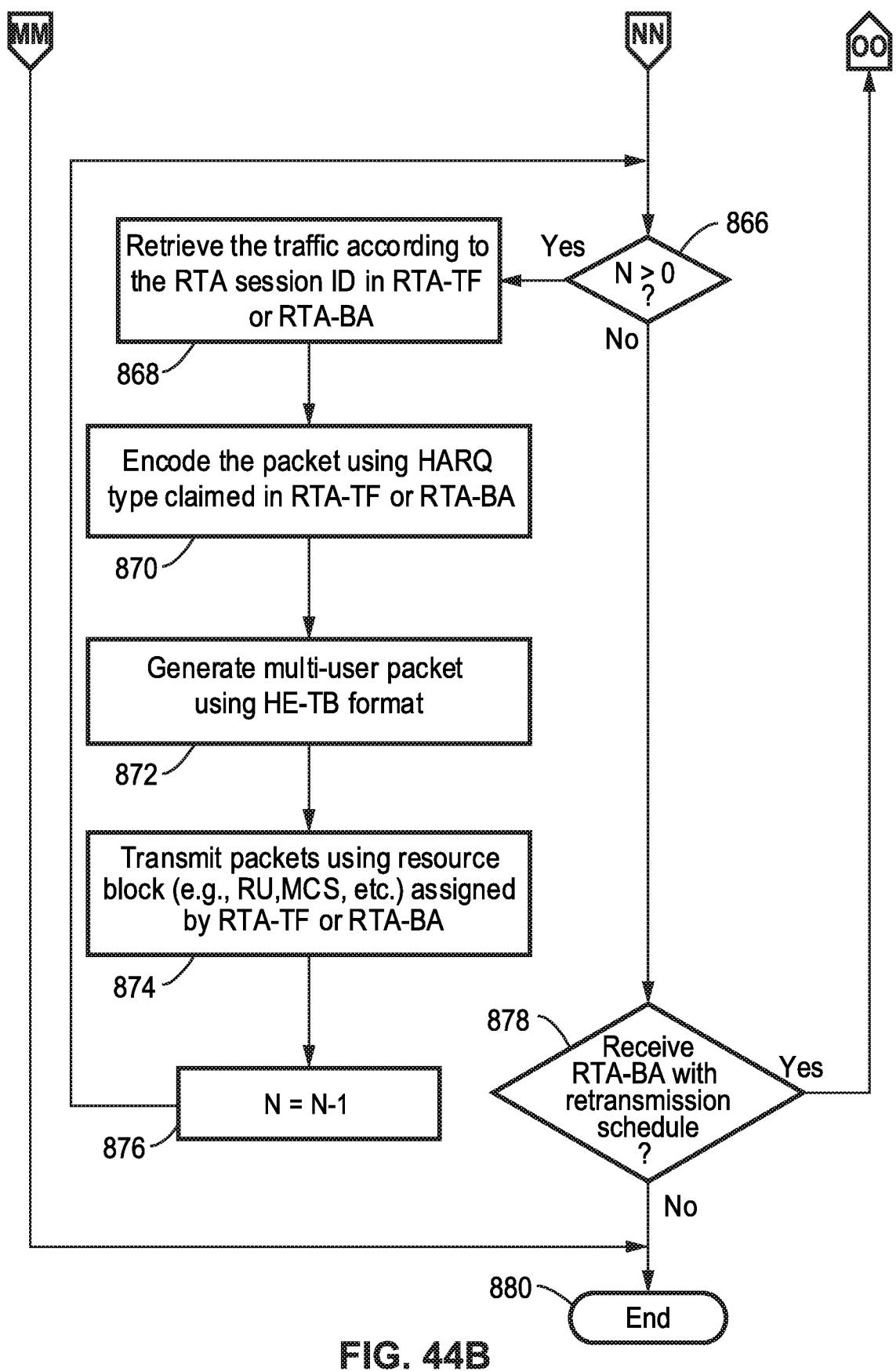

FIG. 44A and FIG. 44B illustrates an example embodiment 850 for transmitting RTA and non-RTA packets in MU uplink mode, showing the details of the actions that a transmitter STA takes when the immediate retransmission scheme is applied to multi-user uplink transmission.

When STAs transmit packets in multi-user uplink mode 852, the MAC layers of those STAs first receive 854 the traffic from the upper layers. As described in FIG. 20, the MAC layer of the transmitter STA can identify 856 the RTA and non-RTA traffic by comparing the header information from the upper layers with the RTA session records created by the prior negotiation, with this identification of RTA traffic seen in block 858 at the transmitter side.

Before the STAs transmit these packets, they receive a trigger frame from the AP 858. A check is performed 860 on whether the trigger frame contains any RTA control fields. If the trigger frame does not contain any RTA control fields, the trigger frame is a regular trigger frame as shown in FIG. 9, the transmitter STAs transmits 864 in FIG. 44 the packet following the regular CSMA/CA scheme and execution reaches process end 880 in FIG. 44B. If the trigger frame contains the RTA control fields as determined at block 860, then the multi-user transmission contains RTA traffic and the trigger frame is in RTA-TF format as was previously shown in FIG. 29.

The transmitter STA then extracts the RTA control field information for the initial transmission. If there is the RTA retransmission schedule field following the RTA control fields, then multiple retransmissions are scheduled by the AP. The total number of the retransmissions is set 862, denoted by N as being equal to the number of retransmissions in the RTA retransmission field plus one, (i.e., the initial transmission).

Then the transmitter STAs transmit the packet multiple times following the initial transmission and the retransmission schedule provided in the RTA-TF. In this portion of the process a check is made 866, to determine if more transmissions are needed (e.g., N still greater than 0). In the case of more transmissions remaining, execution reaches block 868 and according to the RTA-TF, the transmitter STAs retrieve the traffic that is to be transmitted. If the traffic is RTA, the transmitter STA retrieves the traffic from the RTA session whose RTA session ID is indicated in the RTA-TF. Then, the transmitter STA uses 870 the HARQ type claimed in the RTA-TF to encode the packet. The multi-user packet uses the regular HE-TB format as was described in FIG. 8 to generate 872 in FIG. 44B the MU packet using the HE-TB format. The RTA traffic inside the HE-TB packet carries the traffic of RTA sessions that are claimed in the RTA-TF. The transmitter STAs transmits 874 the HE-TB packets using the separate resource block assigned by RTA-TF. The retransmission of the packets utilize the same type of information embedded in the RTA retransmission schedule field in the RTA-TF to finish the multiple transmissions, and decrement 876 the retransmission counter before returning to block 866 to determine if another retransmission should be performed.

After the transmitter STAs finish all the transmissions and retransmissions scheduled by the RTA-TF, they may receive RTA-BA packet from the AP. So if the check at block 866 indicates that there are no more retransmissions, then execution reaches block 878 which determines if RTA-BA was received with an RTA retransmission schedule field. If RTA-BA was received with a retransmission schedule then execution moves to block 862 of FIG. 44A, so that the transmitter STAs can retransmit the packet following the retransmission schedule in the RTA-BA at blocks 868, 870 and 872. Since there is no initial transmission information in the RTA-BA packet, the number of retransmissions N is equal to the number of retransmissions in the RTA retransmission field. If the number of retransmission needed has reached zero as determined at block 866, and yet no RTA-BA was received with a retransmission schedule as determined at block 878, then the process ends 880.

Figure 45A:
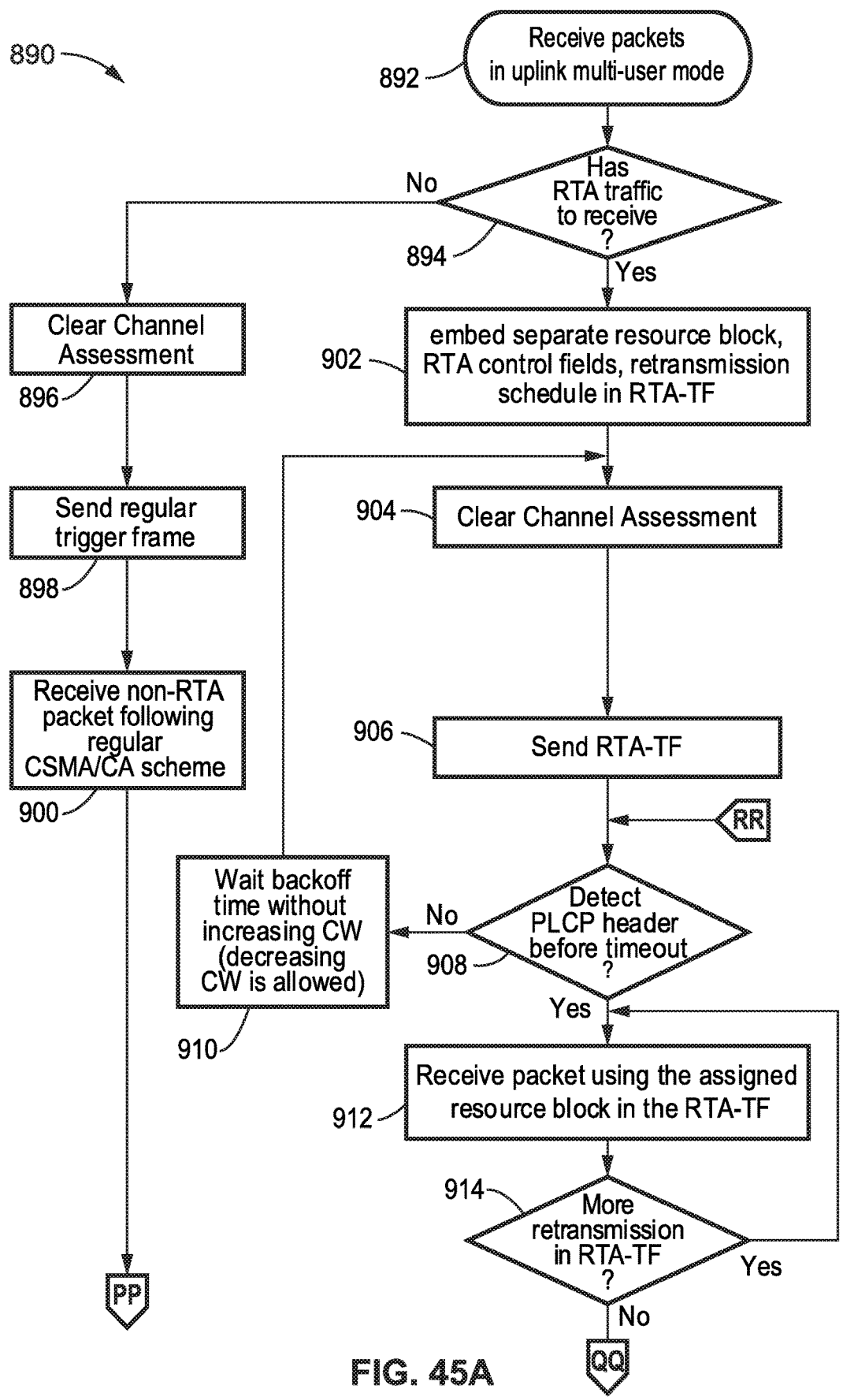
FIG. 45A and FIG. 45B is a flow diagram for receiving RTA and non-RTA packets in multi-user (MU) uplink mode according to at least one embodiment of the present disclosure.
Figure 45B:
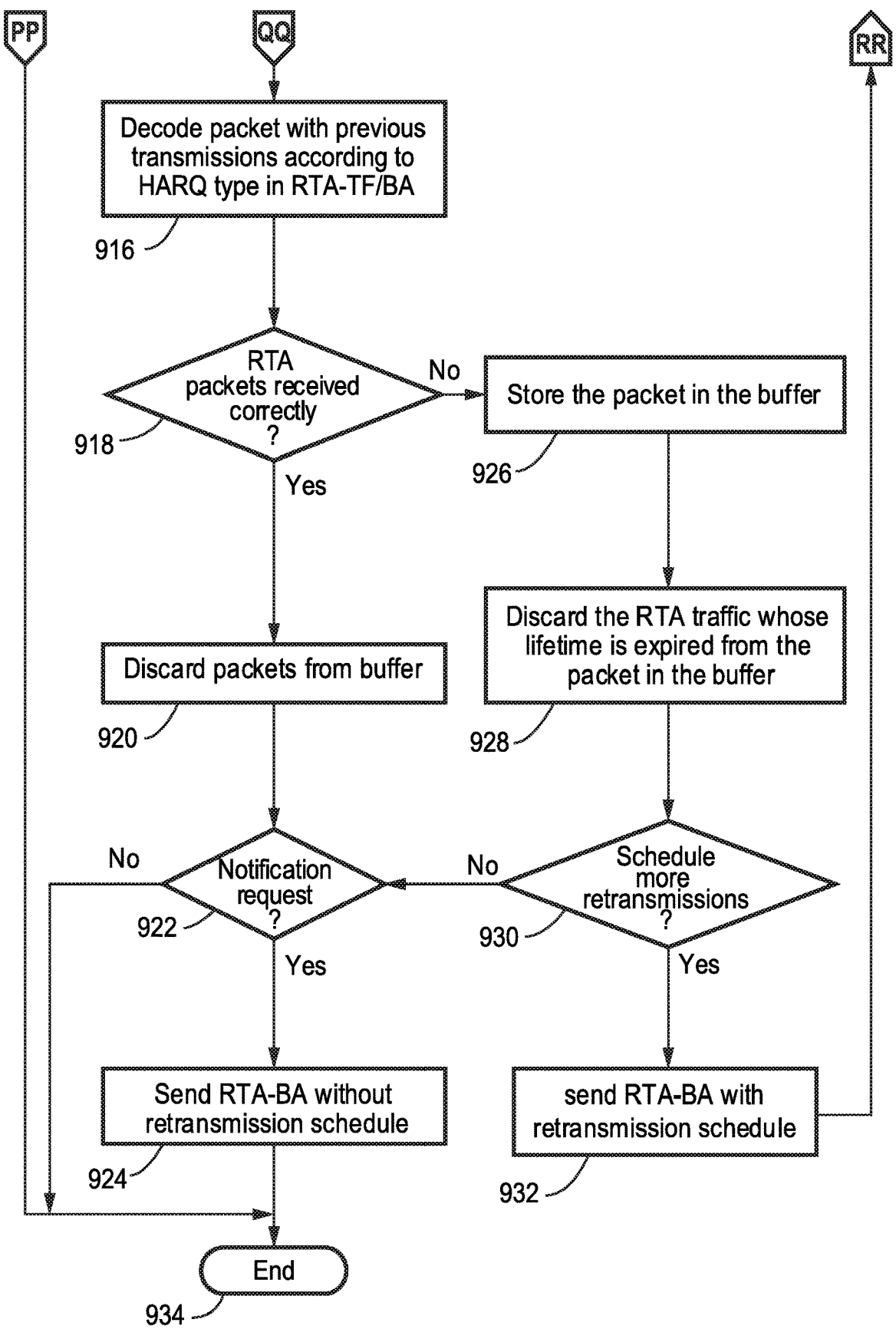

FIG. 45A and FIG. 45B illustrates an example embodiment 890 for receiving RTA and non-RTA packets in MU uplink mode, which describes the details of how the AP receives multi-user packets carrying RTA and non-RTA traffic in uplink mode. When the AP decides to receive packets in multi-user uplink mode 892, it checks 894 the RTA session records created by the prior negotiation.

According to the prior negotiation records, the AP determines 894 whether it should receive some traffic for the RTA sessions.

If there is no RTA traffic to receive, then block 896 is reached and the AP performs a clear channel assessment to gain channel access, sends the regular trigger frame 898, and receives 900 the packet carrying non-RTA traffic following the CSMA/CA scheme before the process ends 934 of FIG. 45B.

If check 894 in FIG. 45A determines that the AP has RTA traffic to receive, then at block 902 it embeds the separate resource block allocation information, the RTA control fields, and the retransmission schedule in the RTA-TF packet. The AP then assesses 904 the channel condition and sends 906 the RTA-TF packet to the transmitter STAs. If the AP does not detect 908 the PLCP header of the multi-user transmission packet from the transmitter STAs before timeout, then the RTA-TF transmission fails as seen at block 910 and the AP has to wait a backoff time and execution moves to block 904 where it re-contends for channel access and retransmits the RTA-TF packet. In block 910 is should be noted that the contention window for the backoff time would not increase although it can be reduced.

Otherwise, if at block 908 the AP detects the multi-user uplink transmission starts before timeout, then it receives 912 the traffic using the allocated separate resource block in the RTA-TF packet. The AP would continue receiving the packets at block 912 insofar as the check at block 914 indicates there are more retransmissions in RTA-TF.

After the AP receives all the transmission and retransmissions of the packet from the transmitter STAs, then execution moves from the loop of block 912, 914 to block 916 in FIG. 45B, where it starts to decode the packets using the type of HARQ indicated in the RTA-TF packet. A check 918 determines if the AP receives all the RTA packets correctly. If it received all the packets correctly, then execution reaches block where it discards 920 the received signal of that packet from the buffer and checks 922 the notification request field in the last retransmission schedule embedded in the RTA-TF packet. If there is no notification request as determined at block 922, then the process ends 934. Otherwise, the STA sends 924 RTA-BA without a retransmission schedule, before ending 934.

Returning to check 918 if not all of the packets were received correctly, then execution reaches block 926 and the AP stores the received signal of the packet in the buffer and removes 928 the parts of the RTA traffic whose lifetime is expired from the packet in the buffer. The AP also determines 930 whether to schedule more retransmissions for those packets in the buffer. If more retransmissions are needed, the AP sends 932 RTA-BA packet with retransmission schedule embedded in it to all the transmitter STAs and execution moves back to block 908 in FIG. 45A where it can start to receive the retransmissions. If it is determined at block 930 that there are no more retransmissions scheduled, then execution reaches block 922 where the AP checks the notification request field in the last retransmission schedule embedded in the RTA-TF packet.

When the AP checks 922 the notification request field in the last retransmission schedule embedded in the RTA-TF packet, the transmission ends 934 if the notification request field is set to "0"; otherwise, the AP sends 924 the RTA-BA packet to the transmitter STAs without an embedded retransmission schedule.

4.6.2.2.2. Examples of Mixed RTA/Non-RTA for MU Uplink OFDMA

By way of example and not limitation, this section describes three examples of mixed RTA and non-RTA traffic transmission using multi-user uplink OFDMA. In these examples, it should be noted that one multi-user transmission packet may contain both RTA traffic and non-RTA traffic, and are based on the network topology example seen in FIG. 17. The multi-user transmission packet uses the regular HE-TB packet format as shown in FIG. 8. The retransmission schedule could be transmitted by the receiver AP to the transmitter STAs using RTA-TF packet as shown in FIG. 29 or RTA-BA packet as shown in FIG. 31.

Figure 46:
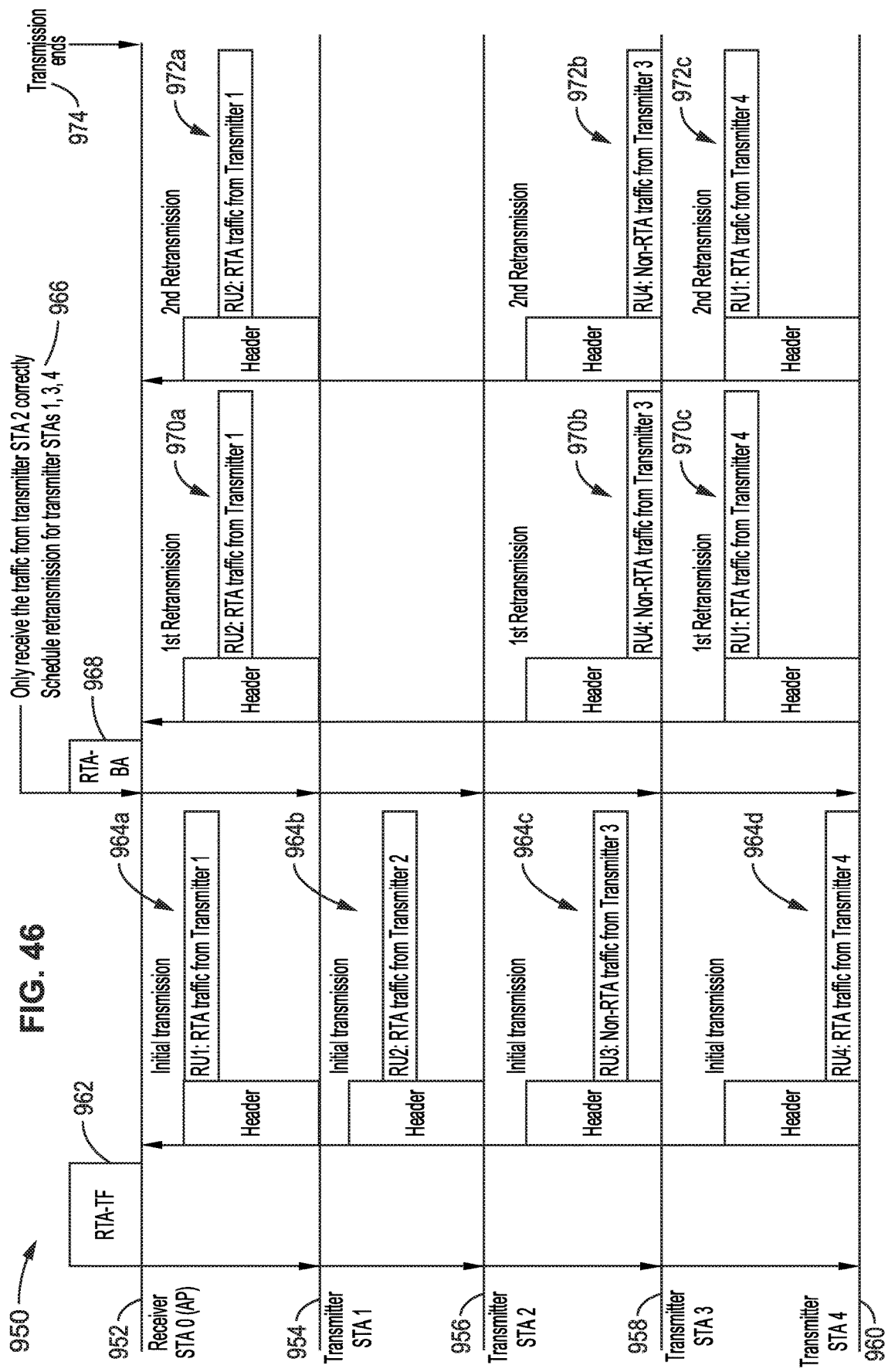
FIG. 46 is a communication sequence diagram for immediate retransmission for RTA packets in multi-user (MU) uplink OFDMA according to at least one embodiment of the present disclosure.

FIG. 46 illustrates an example embodiment 950 of an immediate retransmission scheme for RTA traffic in MU uplink OFDMA, as an example of how the immediate retransmission is scheduled in multi-user uplink scenario using OFDMA. The figure depicts communications between a first transmitter STA0 (AP) 952, receiver STA1 954, receiver STA2 956, receiver STA3 958, and receiver STA4 960.

According to previously described FIG. 45A and FIG. 45B, this example occurs when the AP has RTA traffic to receive 894, sends 906 RTA-TF packet to the transmitter STAs, receives the packet from the transmitter STAs 912, and sends 932 the RTA-BA packet with retransmission schedule to retransmit the packet.

Referring again to FIG. 46, the AP determines from RTA session records created by the prior negotiation, that is has RTA traffic to receive. It transmits 962 an RTA-TF packet to trigger the initial transmission. The RTA-TF contains the transmission and retransmission schedule information, along with RTA session identification information, such as including RTA session ID.

The transmitter STAs receive the RTA-TF packet from the AP, and determine according to the traffic type information and RTA session ID information in RTA-TF, whether to transmit packets carrying RTA traffic or non-RTA traffic. The RTA traffic is from the RTA session whose session ID is embedded in the RTA-TF packet. The transmitter STAs also determine which resource block they should use to transmit packets. In the example, the transmitter STAs 1, 2, and 4 use RU 1, 2, and 4 to transmit RTA traffic, respectively, while transmitter STA 3 transmits non-RTA traffic using RU 3. These initial transmissions 964a, 964b, 964c and 964d, to the AP are shown with their headers. The multi-user transmission packet uses the HE-TB packet format.

After the initial transmission finishes, the AP determines 966 that it received the RTA traffic from transmitter 2 correctly but the traffic from the other transmitters fail, whereby the traffic sent by transmitter STAs 1, 4 are RTA and the traffic sent by transmitter STA 3 is non-RTA. Since there is RTA traffic to retransmit, the AP sends an RTA-BA packet 968 with a retransmission schedule. In this example case, two retransmissions are scheduled in the RTA-BA, although the programming can be set to any desired number of retransmissions. The resource blocks for each retransmission are re-assigned by the AP to gain more diversity. The transmitter STAs receive the RTA-BA.

Retransmissions are then performed by STA1 954, STA3 958 and STA4 960 according to the retransmission schedule embedded in the RTA-BA packet, the transmitter STAs retransmit the packet twice using the logic seen in blocks 866, 870, 872, 874 and 876 in FIG. 44B. Referring again to FIG. 46 first retransmissions 970a, 970b, and 970c are seen followed by second retransmissions 972a, 972b and 972c, and transmission ends 974.

The AP receives the first and second retransmissions following the retransmission schedule in the RTA-BA packet, which is shown in 912, 914 in FIG. 45A. The AP decodes the packet using the packet signal received from the three transmissions of FIG. 46 according to the HARQ type indicated in the RTA-BA. The transmission ends 974 since no notification is requested.

Figure 47:
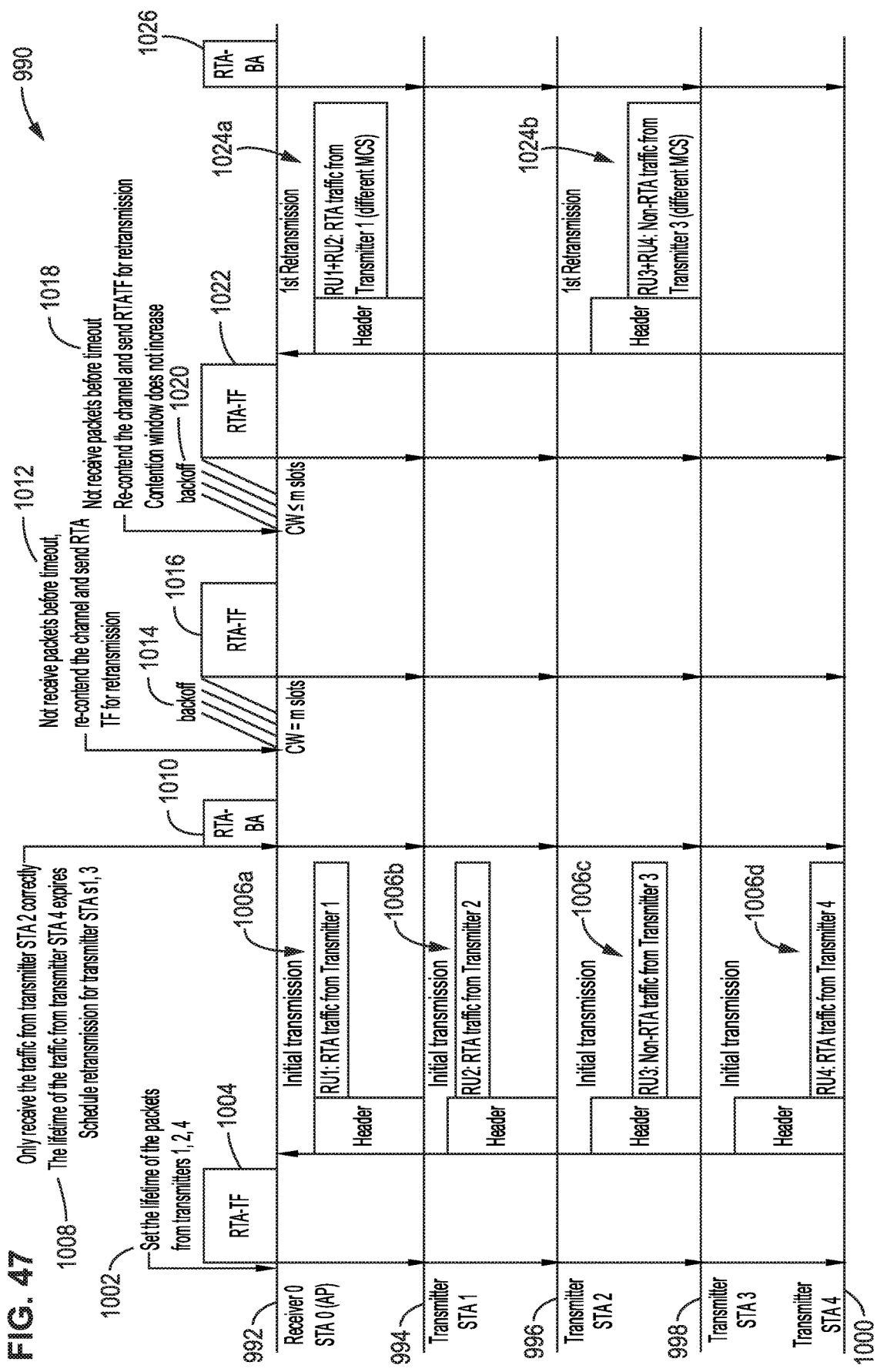
FIG. 47 is a communication sequence diagram showing RTA-TF and RTF-BA failures in multi-user (MU) uplink OFDMA according to at least one embodiment of the present disclosure.

FIG. 47 illustrates an example embodiment 990 of handling RTA-TF and RTA-BA failures in MU uplink OFDMA, thus illustrating how the AP reacts when the RTA-TF or RTA-BA packet is not transmitted successfully in multi-user uplink mode using OFDMA. The figure depicts communications between a first receiver STA0 (AP) 992, and a set of transmitters including transmitter STA1 994, transmitter STA2 996, transmitter STA3 998, and transmitter STA4 1000.

This scenario follows blocks 908, 910 in the flowchart of FIG. 45A. When the RTA-TF or RTA-BA packet is not transmitted successfully, the AP has to re-contend for the channel and re-send the RTA-TF packet.

The AP sets 1002 the lifetime of the RTA packets from transmitters 1, 2 and 4. According to the RTA session records created by the prior negotiation, the AP has RTA traffic to receive, and its transmits an RTA-TF packet 1004 to trigger initial transmissions 1006a, 1006b, 1006c and 1006d. The RTA-TF contains the transmission and retransmission schedule information. The RTA session information, such as RTA session ID, is also embedded in the schedule.

The transmitter STAs receive the RTA-TF packet from the AP. According to the traffic type information and the RTA session identifying information in the RTA-TF, the transmitter STAs determine whether to transmit RTA traffic or non-RTA traffic. The RTA traffic is from the RTA session whose session ID is embedded in the RTA-TF packet. The RTA-TF also informs the transmitter STAs which resource block they should use to transmit the traffic. In the example, the transmitter STAs 1, 2, and 4 use RU 1, 2, and 4 to transmit RTA traffic, respectively. The transmitter STA 3 transmits non-RTA traffic using RU 3. The multi-user transmission packet uses the HE-TB packet format.

After the initial transmission finishes, the AP determines 1008 that is has received RTA traffic from transmitter 2 correctly but the traffic from the other transmitters failed. The failed transmissions include RTA traffic transmitted from STA1 994 and STA4 1000, and the non-RTA traffic transmitted by transmitter STA3 998. Meanwhile, the lifetime of the traffic from transmitter STA 4 expires, the receiver AP discards that traffic from the packet in the buffer and no retransmissions are scheduled for that traffic. Since there are still RTA traffic to be retransmitted, the AP sends a RTA-BA packet 1010 containing a retransmission schedule.

However, the AP determines 1012 that it has not received packets from the transmitter STAs after sending RTA-BA packet, and has to re-contend for the channel, and wait a backoff time 1014 (CW is set for m slots). After the AP re-gains channel access, it sends the RTA-TF packet 1016 again to the transmitter STAs.

The AP determines 1018 that it still has not received packets after retransmitting the RTA-TF, whereby the AP re-contends for the channel without increasing the contention window (CW is set for less than or equal to m slots) for the backoff time 1020. The AP re-assigns the separate resource block and embeds that information in the RTA-TF packet which it retransmits 1022. This time, the transmitter STAs receives the RTA-TF and send first retransmissions of the packets 1024a, 1024b using the separate resource block re-assigned in the RTA-TF packet. The AP receives the packets from the transmitter STAs successfully, and sends an RTA-BA packet 1026 without a retransmission schedule to inform the transmitter STAs that the transmission succeeded.

FIG. 48 illustrates an example embodiment 1030 of a retransmission scheme for non-RTA packet in MU uplink OFDMA, showing an example to explain how the multi-user transmission packet is retransmitted in uplink multi-user mode of OFDMA systems when only non-RTA traffic is required to retransmit. The figure depicts communications between a first receiver STA0 (AP) 1032, and a set of transmitters including transmitter STA1 1034, transmitter STA2 1036, transmitter STA3 1038, and transmitter STA4 1040.

As shown in blocks 894, 896, 898 and 900 of FIG. 45A the AP launches a multi-user uplink transmission following the regular CSMA/CA scheme.

According to the RTA session records created by the prior negotiation, the AP has RTA traffic to receive, so in FIG. 48 it is seen that transmitting an RTA-TF packet 1042 to trigger initial transmissions. The RTA-TF contains the transmission and retransmission schedule information, including an embedded RTA session ID.

The transmitter STAs receive the RTA-TF packet from the AP and decode its information. According to the information in RTA-TF, the transmitter STAs determine whether to transmit packets carrying RTA traffic or non-RTA traffic. The RTA traffic is the data generated by the RTA session whose session ID is embedded in the RTA-TF packet. These STAs also identify which resource block they should use to transmit packets. In the example, transmitter STA2 1036 and STA4 1040 use RU 2 and RU 4 to transmit packet carrying RTA traffic, respectively, while transmitter STA1 1034 and STA3 1038 transmits packet carrying non-RTA traffic using RU 1 and RU 3, respectively. The multi-user transmission packet uses the HE-TB packet format.

After the initial transmissions 1043a, 1043b, 1043c and 1043d finish, the AP determines 1044 that it has received traffic from transmitters of STA2 and STA4 correctly but the traffic from the other transmitters failed. The traffic transmitted by transmitter STA2 and STA4 are RTA, while the traffic transmitted by transmitter STA1 and STA3 are non-RTA. Since no RTA traffic needs to be retransmitted, the AP sends an RTA-BA packet 1046 without a retransmission schedule. If the AP needs to schedule retransmission for the non-RTA traffic, it re-contends for the channel with backoff time 1048 (CW is set to n slots) and upon accessing the channel sends the regular trigger frame 1050 for retransmitting the non-RTA traffic.

Transmitter STA1 and STA3 receive the trigger frame and retransmit the packet carrying non-RTA traffic, as first retransmissions 1052a, 1052b. The AP receives the non-RTA packets and sends BA 1054 back to report the correctness of the received packet.

5. General Scope of Embodiments

The enhancements described in the presented technology can be readily implemented within various wireless communication station circuits. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions)

stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with the operation and control of wireless communication stations, in particular in regard to executing communication protocols. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating with at least one other wireless local area network (WLAN) station in its reception area; (b) a processor coupled to said wireless communication circuit within a station configured for operating on the WLAN; and (c) a non-transitory memory storing instructions executable by the processor; (d) wherein said instructions, when executed by the processor, perform one or more steps comprising: (d)(i) operating said wireless communication circuit as a WLAN station configured to support communicating real-time application (RTA) packets that are sensitive to communication delays as well as non-real time packets; (d)(ii) distinguishing real-time application (RTA) packets from non-real-time application (non-RTA) packets by prior negotiation, or packet header information, or a combination of prior negotiation and packet header information; (d)(iii) performing retransmissions for non-real time application (non-RTA) packets using carrier sense multiple access/collision avoidance (CSMA/CA); and (d)(iv) performing retransmissions for at least a portion of real time application (RTA) packets in response to bypassing a process of contending for channel access, and/or without waiting for notifications back from a receiver before channel access.

2. An apparatus for wireless communication in a network, the apparatus comprising: (a) a wireless communication circuit configured for wirelessly communicating with at least one other wireless local area network (WLAN) station in its reception area; (b) a processor coupled to said wireless communication circuit within a station configured for operating on the WLAN; and (c) a non-transitory memory storing instructions executable by the processor; (d) wherein said instructions, when executed by the processor, perform one or more steps comprising: (d)(i) operating said wireless communication circuit as a WLAN station configured to support communicating real-time application (RTA) packets that are sensitive to communication delays as well as non-real time packets; (d)(ii) transmitting a packet to a receiver and receiving notifications back from the receiver on packet success or packet error; (d)(iii) distinguishing real-time application (RTA) packets from non-real-time application (non-RTA) packets by prior negotiation, or packet header information, or a combination of prior negotiation and packet header information; (d)(iv) performing retransmissions for non-real time application (non-RTA) packets using carrier sense multiple access/collision avoidance (CSMA/CA); (d)(v) performing retransmissions for at least a portion of real time application (RTA) packets in response to bypassing a process of contending for channel access, and/or without waiting for notifications back from a receiver before channel access; and (d)(vi) terminating retransmissions of a real-time application (RTA) packet when the packet lifetime has expired.

3. A method of performing wireless communication, comprising: (a) operating a wireless communication circuit as a WLAN station configured to support communicating real-time application (RTA) packets that are sensitive to communication delays as well as non-real time packets; (b) distinguishing real-time application (RTA) packets from non-real-time application (non-RTA) packets by prior negotiation, or packet header information, or a combination of prior negotiation and packet header information; (c) performing retransmissions for non-real time application (non-RTA) packets using carrier sense multiple access/collision avoidance (CSMA/CA); and (d) performing retransmissions for at least a portion of real time application (RTA) packets in response to bypassing a process of contending for channel access, and/or without waiting for notifications back from a receiver before channel access.

4. A method of performing wireless communication, comprising: (a) identifying RTA packet and non-RTA packets in wireless stations (STAs); (b) taking timeliness of RTA traffic into consideration, with RTA packet having a specified lifetime for transmission; scheduling the retransmission of the RTA packet based on the lifetime of the RTA packet; (c) separating the retransmission scheme for RTA packets from non-RTA packets, while non-RTA packet can still be transmitted using any desired scheme, including the regular retransmission scheme defined in CSMA/CA; (d) defining an immediate retransmission scheme for RTA traffic to minimizing or eliminating channel contention time, whereby RTA packet delay reduced; and (e) wherein said method is compatible with OFDMA systems, and by operating the resource unit allocation with other adaptive machines, including rate control, the transmission gains more diversity effect to improve the packet delivery rate.

5. The apparatus or method of any preceding embodiment, wherein said instructions, when executed by the processor, perform one or more steps comprising receiving notifications back from a receiver on packet success or packet error.

6. The apparatus or method of any preceding embodiment, when executed by the processor, perform said bypassing the process of contending for channel access in response to immediately retransmitting the real time application (RTA) packet without contention upon receiving a notification from a receiver of the real time application (RTA) packet.

7. The apparatus or method of any preceding embodiment, wherein station is operating as an access point (AP) on the network; and wherein said instructions, when executed by the processor, perform one or more steps comprising assigning subsets of subcarriers to multiple individual users.

8. The apparatus or method of any preceding embodiment, wherein said instructions, when executed by the processor, perform said assigning subsets of subcarriers by utilizing orthogonal frequency-division multiple access (OFDMA).

9. The apparatus or method of any preceding embodiment, wherein said instructions, when executed by the processor, perform orthogonal frequency-division multiple access (OFDMA) and embed retransmission scheduling information into notifications.

10. The apparatus or method of any preceding embodiment, wherein said instructions, when executed by the processor, performing orthogonal frequency-division multiple access (OFDMA) utilizes separate resource blocks as assigned by an AP.

11. The apparatus or method of any preceding embodiment, wherein said instructions, when executed by the processor, perform one or more steps comprising terminating retransmissions of a real-time application (RTA) packet when the packet lifetime has expired.

12. The apparatus or method of any preceding embodiment, wherein said notifications comprise an acknowledgement (ACK) indicating the packet was received correctly, and a negative acknowledgment (NACK) indicating the packet was received with error.

13. The apparatus or method of any preceding embodiment, wherein said instructions, when executed by the processor, perform one or more steps comprising transmitting a real-time application (RTA) packet multiple times without waiting for notifications back from the receiver.

14. The apparatus or method of any preceding embodiment, wherein said instructions, when executed by the processor, perform one or more steps comprising scheduling retransmission of a real-time application (RTA) packet after initial transmission of said RTA packet.

15. The apparatus or method of any preceding embodiment, wherein said instructions, when executed by the processor, perform steps further comprising retransmitting a real-time application (RTA) packet using a lower bit rate modulation and coding scheme (MCS) than when initial transmitted.

16. The apparatus or method of any preceding embodiment, wherein said instructions, when executed by the processor, perform steps further comprising performing retransmissions for a second portion of real time application (RTA) packets in response to performing collision avoidance without increasing contention time window length.

17. The apparatus or method of any preceding embodiment, wherein said instructions, when executed by the processor, perform said bypassing the process of contending for channel access in response to immediately retransmitting the real time application (RTA) packet without contention upon receiving a notification from a receiver of the real time application (RTA) packet error.

18. The apparatus or method of any preceding embodiment, wherein station is operating as an access point (AP) on the network; and wherein said instructions, when executed by the processor, perform one or more steps comprising assigning subsets of subcarriers to multiple individual users.

19. The apparatus of claim 16, wherein said instructions, when executed by the processor, perform said assigning subsets of subcarriers by utilizing orthogonal frequency-division multiple access (OFDMA).

20. The apparatus or method of any preceding embodiment, wherein said instructions, when executed by the processor, perform orthogonal frequency-division multiple access (OFDMA) and embeds retransmission scheduling information into notifications.

21. The apparatus or method of any preceding embodiment, wherein said instructions, when executed by the processor, performing orthogonal frequency-division multiple access (OFDMA) utilizes separate resource blocks as assigned by an AP.

22. The apparatus or method of any preceding embodiment, wherein said notifications comprise an acknowledgement (ACK) indicating the packet was received correctly, and a negative acknowledgment (NACK) indicating the packet was received with error.

23. The apparatus or method of any preceding embodiment, wherein said instructions, when executed by the processor, perform one or more steps comprising transmitting a real-time application (RTA) packet multiple times without waiting for notifications back from the receiver.

24. The apparatus or method of any preceding embodiment, wherein said instructions, when executed by the processor, perform one or more steps comprising scheduling retransmission of a real-time application (RTA) packet after initial transmission of said RTA packet.

25. The apparatus or method of any preceding embodiment, wherein said instructions, when executed by the processor, perform steps further comprising retransmitting a real-time application (RTA) packet using a lower bit rate modulation and coding scheme (MCS) than when initial transmitted.

26. The apparatus or method of any preceding embodiment, wherein said instructions, when executed by the processor, perform steps further comprising performing retransmissions for a second portion of real time application (RTA) packets in response to performing collision avoidance without increasing contention time window length.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Layers | Header Information for Identifying RTA Traffic at the Transmitter Side |
| --- | --- |
| | Header information |
| APP | RTA session id, RTA session name, signature |
| Transport | TCP/UDP port numbers |
| Network | IP address of source & destination, type of service |

What is claimed is:

1. An apparatus for wireless communication in a network, the apparatus comprising:
   (a) a wireless communication circuit configured for wirelessly communicating with at least one other wireless local area network (WLAN) station (STA) in its reception area;
   (b) a processor coupled to said wireless communication circuit within a station configured for operating on the WLAN; and
   (c) a non-transitory memory storing instructions executable by the processor;

(d) wherein said instructions, when executed by the processor, perform one or more steps of an immediate retransmission scheme under carrier sense multiple access/collision avoidance (CSMA/CA), comprising:
   (i) operating said wireless communication circuit as a WLAN station configured to support communicating real-time application (RTA) packets that are sensitive to communication delays as well as communicating non-real time packets, wherein both real-time application (RTA) packets and non-real-time application (non-RTA) packets are communicated from an application layer to a medium access control (MAC) layer of the STA;
   (ii) distinguishing real-time application (RTA) packets from non-real-time application (non-RTA) packets by prior negotiation, or packet header information, or a combination of prior negotiation and packet header information;
   (iii) performing a negotiation with another STA operating as a receiver to establish a connection before transmitting RTA traffic, wherein during the negotiation, said STA operating as the transmitter and the other STA operating as the receiver, record the RTA session with the RTA session identifying information that can be used for identifying the RTA traffic at the MAC layer of the transmitter and the RTA packet at the MAC layer of the receiver for use in distinguishing between RTA packets and non-RTA packets;
   (iv) performing initial transmissions of RTA and non-RTA packets after contending for channel access;
   (v) performing retransmissions for non-real time application (non-RTA) packets using a regular retransmission scheme of carrier sense multiple access/collision avoidance (CSMA/CA) which does not take communication timeliness into consideration and retransmits the packet until either it is received or until retransmissions exceed the retry limit; and
   (vi) performing retransmissions for at least a portion of real time application (RTA) packets in response to bypassing a process of contending for channel access, and/or without waiting for notifications back from a receiver before channel access, wherein during said retransmissions RTA packets containing header fields with RTA session identifying information are transmitted so that the included RTA session identifying information allows the receiver side to distinguish at its MAC layer between an RTA packet and a non-RTA packet.

2. The apparatus of claim 1, wherein said instructions, when executed by the processor, perform one or more steps comprising receiving notifications back from a receiver on packet success or packet error.

3. The apparatus of claim 2, wherein said instructions, when executed by the processor, perform said bypassing the process of contending for channel access in response to immediately retransmitting the real time application (RTA) packet without contending for channel access upon receiving a notification from a receiver of the real time application (RTA) packet.

4. The apparatus of claim 2:
   wherein station is operating as an access point (AP) on the network; and
   wherein said instructions, when executed by the processor, perform one or more steps comprising assigning subsets of subcarriers to multiple individual users.

5. The apparatus of claim 4, wherein said instructions, when executed by the processor, perform said assigning subsets of subcarriers by utilizing orthogonal frequency-division multiple access (OFDMA).

6. The apparatus of claim 5, wherein said instructions, when executed by the processor, perform orthogonal frequency-division multiple access (OFDMA) and embed retransmission scheduling information into notifications.

7. The apparatus of claim 4, wherein said instructions, when executed by the processor, performing orthogonal frequency-division multiple access (OFDMA) utilizes separate resource blocks as assigned by an AP.

8. The apparatus of claim 1, wherein said instructions, when executed by the processor, perform one or more steps comprising terminating retransmissions of a real-time application (RTA) packet when the packet lifetime has expired.

9. The apparatus of claim 1, wherein said notifications comprise an acknowledgement (ACK) indicating the packet was received correctly, and a negative acknowledgment (NACK) indicating the packet was received with error.

10. The apparatus of claim 1, wherein said instructions, when executed by the processor, perform one or more steps comprising transmitting a real-time application (RTA) packet multiple times without waiting for notifications back from the receiver.

11. The apparatus of claim 1, wherein said instructions, when executed by the processor, perform one or more steps comprising scheduling retransmission of a real-time application (RTA) packet after initial transmission of said RTA packet.

12. The apparatus of claim 1, wherein said instructions, when executed by the processor, perform steps further comprising retransmitting a real-time application (RTA) packet using a lower bit rate modulation and coding scheme (MCS) than when initial transmitted.

13. The apparatus of claim 1, wherein said instructions, when executed by the processor, perform steps further comprising performing retransmissions for a second portion of real time application (RTA) packets in response to performing collision avoidance without increasing contention time window length.

14. An apparatus for wireless communication in a network, the apparatus comprising:
   (a) a wireless communication circuit configured for wirelessly communicating with at least one other wireless local area network (WLAN) station (STA) in its reception area;
   (b) a processor coupled to said wireless communication circuit within a station configured for operating on the WLAN; and
   (c) a non-transitory memory storing instructions executable by the processor;
   (d) wherein said instructions, when executed by the processor, perform one or more steps of an immediate retransmission scheme under carrier sense multiple access/collision avoidance (CSMA/CA), comprising:
      (i) operating said wireless communication circuit as a WLAN station configured to support communicating real-time application (RTA) packets that are sensitive to communication delays as well as communicating non-real time packets, wherein both real-time application (RTA) packets and non-real-time application (non-RTA) packets are communicated from an application layer to a medium access control (MAC) layer of the STA;
      (ii) transmitting a packet to a receiver and receiving notifications back from the receiver on packet success or packet error;

(iii) distinguishing real-time application (RTA) packets from non-real-time application (non-RTA) packets by prior negotiation, or packet header information, or a combination of prior negotiation and packet header information;

(iv) performing a negotiation with another STA operating as a receiver to establish a connection before transmitting RTA traffic, wherein during the negotiation, said STA operating as the transmitter and the other STA operating as the receiver, record the RTA session with the RTA session identifying information that can be used for identifying the RTA traffic at the MAC layer of the transmitter and the RTA packet at the MAC layer of the receiver for use in distinguishing between RTA packets and non-RTA packets;

(v) performing initial transmissions of RTA and non-RTA packets after contending for channel access;

(vi) performing retransmissions for non-real time application (non-RTA) packets using a regular retransmission scheme of carrier sense multiple access/collision avoidance (CSMA/CA) which does not take communication timeliness into consideration and retransmits the packet until either it is received or until retransmissions exceed the retry limit;

(vii) performing retransmissions for at least a portion of real time application (RTA) packets in response to bypassing a process of contending for channel access, and/or without waiting for notifications back from a receiver before channel access, wherein during said retransmissions RTA packets containing header fields with RTA session identifying information are transmitted so that the included RTA session identifying information allows the receiver side to distinguish at its MAC layer between an RTA packet and a non-RTA packet; and (viii) terminating retransmissions of a real-time application (RTA) packet when the packet lifetime has expired.

15. The apparatus of claim 14, wherein said instructions, when executed by the processor, perform said bypassing the process of contending for channel access in response to immediately retransmitting the real time application (RTA) packet without contention upon receiving a notification from a receiver of the real time application (RTA) packet error.

16. The apparatus of claim 15:
wherein station is operating as an access point (AP) on the network; and
wherein said instructions, when executed by the processor, perform one or more steps comprising assigning subsets of subcarriers to multiple individual users.

17. The apparatus of claim 16, wherein said instructions, when executed by the processor, perform said assigning subsets of subcarriers by utilizing orthogonal frequency-division multiple access (OFDMA).

18. The apparatus of claim 17, wherein said instructions, when executed by the processor, perform orthogonal frequency-division multiple access (OFDMA) and embeds retransmission scheduling information into notifications.

19. The apparatus of claim 16, wherein said instructions, when executed by the processor, performing orthogonal frequency-division multiple access (OFDMA) utilizes separate resource blocks as assigned by an AP.

20. The apparatus of claim 14, wherein said notifications comprise an acknowledgement (ACK) indicating the packet was received correctly, and a negative acknowledgment (NACK) indicating the packet was received with error.

21. The apparatus of claim 14, wherein said instructions, when executed by the processor, perform one or more steps comprising transmitting a real-time application (RTA) packet multiple times without waiting for notifications back from the receiver.

22. The apparatus of claim 14, wherein said instructions, when executed by the processor, perform one or more steps comprising scheduling retransmission of a real-time application (RTA) packet after initial transmission of said RTA packet.

23. The apparatus of claim 14, wherein said instructions, when executed by the processor, perform steps further comprising retransmitting a real-time application (RTA) packet using a lower bit rate modulation and coding scheme (MCS) than when initial transmitted.

24. The apparatus of claim 14, wherein said instructions, when executed by the processor, perform steps further comprising performing retransmissions for a second portion of real time application (RTA) packets in response to performing collision avoidance without increasing contention time window length.

25. A method of performing wireless communication, comprising:

(a) operating a wireless communication circuit as a WLAN station configured to support communicating real-time application (RTA) packets that are sensitive to communication delays as well as non-real time packets, which provides an immediate retransmission scheme under carrier sense multiple access/collision avoidance (CSMA/CA), wherein both real-time application (RTA) packets and non-real-time application (non-RTA) packets are communicated from an application layer to a medium access control (MAC) layer of the STA;

(b) distinguishing real-time application (RTA) packets from non-real-time application (non-RTA) packets by prior negotiation, or packet header information, or a combination of prior negotiation and packet header information;

(c) performing a negotiation with another STA operating as a receiver to establish a connection before transmitting RTA traffic, wherein during the negotiation, said STA operating as the transmitter and the other STA operating as the receiver, record the RTA session with the RTA session identifying information that can be used for identifying the RTA traffic at the MAC layer of the transmitter and the RTA packet at the MAC layer of the receiver for use in distinguishing between RTA packets and non-RTA packets;

(d) performing initial transmissions of RTA and non-RTA packets after contending for channel access;

(e) performing retransmissions for non-real time application (non-RTA) packets using a regular retransmission scheme of carrier sense multiple access/collision avoidance (CSMA/CA) which does not take communication timeliness into consideration and retransmits the packet until either it is received or until retransmissions exceed the retry limit; and (f) performing retransmissions for at least a portion of real time application (RTA) packets in response to bypassing a process of contending for channel access, and/or without waiting for notifications back from a receiver before channel access, wherein during said retransmissions RTA packets containing header fields with RTA session identifying information are transmitted so that the included RTA session identifying information allows the receiver side to distinguish at its MAC layer between an RTA packet and a non-RTA packet.

\* \* \* \* \*